US012174302B2

United States Patent
Garin et al.

(10) Patent No.: US 12,174,302 B2
(45) Date of Patent: Dec. 24, 2024

(54) MATCHING FOR GNSS SIGNALS

(71) Applicant: oneNav, Inc., Palo Alto, CA (US)

(72) Inventors: Lionel Garin, Palo Alto, CA (US); Mahdi Maaref, Mountain View, CA (US); Nagaraj Shivaramaiah, Fremont, CA (US); Paul McBurney, Palo Alto, CA (US); Mark Moeglein, Ashland, OR (US); Norman Krasner, Redwood City, CA (US)

(73) Assignee: oneNav, Inc., Sunnyvale, CA (US)

( * ) Notice: Subject to any disclaimer, the term of this patent is extended or adjusted under 35 U.S.C. 154(b) by 460 days.

(21) Appl. No.: 17/230,014

(22) Filed: Apr. 14, 2021

(65) Prior Publication Data
US 2021/0325548 A1    Oct. 21, 2021

Related U.S. Application Data

(60) Provisional application No. 62/705,725, filed on Jul. 13, 2020, provisional application No. 62/704,417, (Continued)

(51) Int. Cl.
*G01S 19/42* (2010.01)
*G01S 5/02* (2010.01)
(Continued)

(52) U.S. Cl.
CPC ........ *G01S 19/428* (2013.01); *G01S 5/02521* (2020.05); *G01S 5/02528* (2020.05); *G01S 19/32* (2013.01); *G01S 19/40* (2013.01)

(58) Field of Classification Search
CPC ........ G01S 19/09; G01S 19/40; G01S 19/428; G01S 5/02521; G01S 5/02528
See application file for complete search history.

(56) References Cited

U.S. PATENT DOCUMENTS 6,282,426 B1 * 8/2001 Wang .................... G01S 5/0036
342/453
9,562,770 B2   2/2017 Garin
(Continued)

FOREIGN PATENT DOCUMENTS

KR    101063084 B1 *  9/2011

OTHER PUBLICATIONS

P.S. Maybeck, Stochastic models, estimation, and control, vol. 1, p. 1-16, 289-306, 341-362 (Year: 1979).*
(Continued)

*Primary Examiner* — Bernarr E Gregory
*Assistant Examiner* — Fred H Mull
(74) *Attorney, Agent, or Firm* — WOMBLE BOND DICKINSON (US) LLP

(57) ABSTRACT

This disclosure describes methods, systems and machine readable media that can provide position solutions using, for example, pattern matching with GNSS signals in urban canyons. In one method, based upon an approximate location in an urban canyon and a set of 3D data about building structures in the urban canyon, an expected signal reception data can be generated for both line of sight and non-line of sight GNSS signals from GNSS satellites, or other sources of GNSS signals, at each point in a set of points in a grid (or other model) in the vicinity of the approximate location). This expected signal reception data can be matched to a received set of GNSS signals that have been received by a GNSS receiver, and the result of the matching can produce an adjustment to the approximate location that is used in the position solution of the GNSS receiver.

32 Claims, 41 Drawing Sheets

Related U.S. Application Data filed on May 8, 2020, provisional application No. 63/010,673, filed on Apr. 15, 2020.

(51) Int. Cl.
   G01S 19/32 (2010.01)
   G01S 19/40 (2010.01)

(56) References Cited

U.S. PATENT DOCUMENTS

| | | | |
|---|---|---|---|
| 2007/0201537 A1* | 8/2007 | De Wilde | H04L 27/06 375/147 |
| 2013/0013187 A1 | 1/2013 | Garin | |
| 2015/0032370 A1 | 1/2015 | Garin | |
| 2016/0146945 A1 | 5/2016 | Kamijo et al. | |
| 2016/0249316 A1 | 8/2016 | Kudekar et al. | |
| 2016/0290805 A1 | 10/2016 | Irish et al. | |
| 2017/0067999 A1 | 3/2017 | Chhokra et al. | |
| 2017/0131409 A1 | 5/2017 | Irish et al. | |
| 2019/0257953 A1 | 8/2019 | Lennen | |
| 2020/0278455 A1* | 9/2020 | Harel | G01S 19/42 |

OTHER PUBLICATIONS

S.H. Byun et al., Development and application of GPS signal multipath simulator, Radio Science, vol. 37(6), p. 10-1 to 10-23 (Year: 2002).*

S. Zhang et al., GNSS Multipath Detection in Urban Environment Using 3D Building Model, 2018 IEEE/ION Position, Location and Navigation Symposium (PLANS), p. 1053-1058 (Year: 2018).*

PCT International Search Report and Written Opinion of the International Searching Authority for PCT/US21/27433, mailed Aug. 3, 2021, 16 pages.

Bruckstein, et al., "The Resolution of Overlapping Echoes," IEEE Trans. Signal Processing, vol. ASSP-33, No. 6, Dec. 1985, pp. 1357-1367.

R. Roy and T. Kailath, "ESPRIT-estimation of signal parameters via rotational invariance techniques," Acoustics, Speech and Signal Processing, IEEE Transactions on, vol. 37, No. 7, pp. 984-995, 1989.

H.K. Hwang, et al., "Direction of Arrival Estimation using a Root-MUSIC Algorithm", Proceedings of the International MultiConference of Engineers and Computer Scientists 2008 vol. II IMECS 2008, Mar. 19-21, 2008, Hong Kong.

H.K. Hwang, et cl., Direction of Arrival Estimation Using Polynomial Roots Intersection for Multi-Dimensional Estimation (PRIME), Proceedings of the International MultiConference of Engineers and Computer Scientists 2008 vol. II IMECS 2008, Mar. 19-21, 2008, Hong Kong.

Extended European Search Report from related EP Patent Application No. 21787614.3, mailed on Apr. 11, 2024 (9 pages).

Xu, Haosheng et al. "GNSS Shadow Matching based on Intelligent LOS/NLOS Classifier", The 16th IAIN World Congress 2018 (Dec. 2018), Chiba, Japan, 7 pages.

* cited by examiner

SINGLE BAND TRACKING POINT SELECTION

PRIORITY TABLE FOR A-CHANNEL TRACKING
1. PHASE A+DELTAA
2. VIRTUAL+DELTAV
3. VIRTUAL
4. CODE A

PRECISE DELTA POSITION DETERMINATION AND PSTATE UPDATE

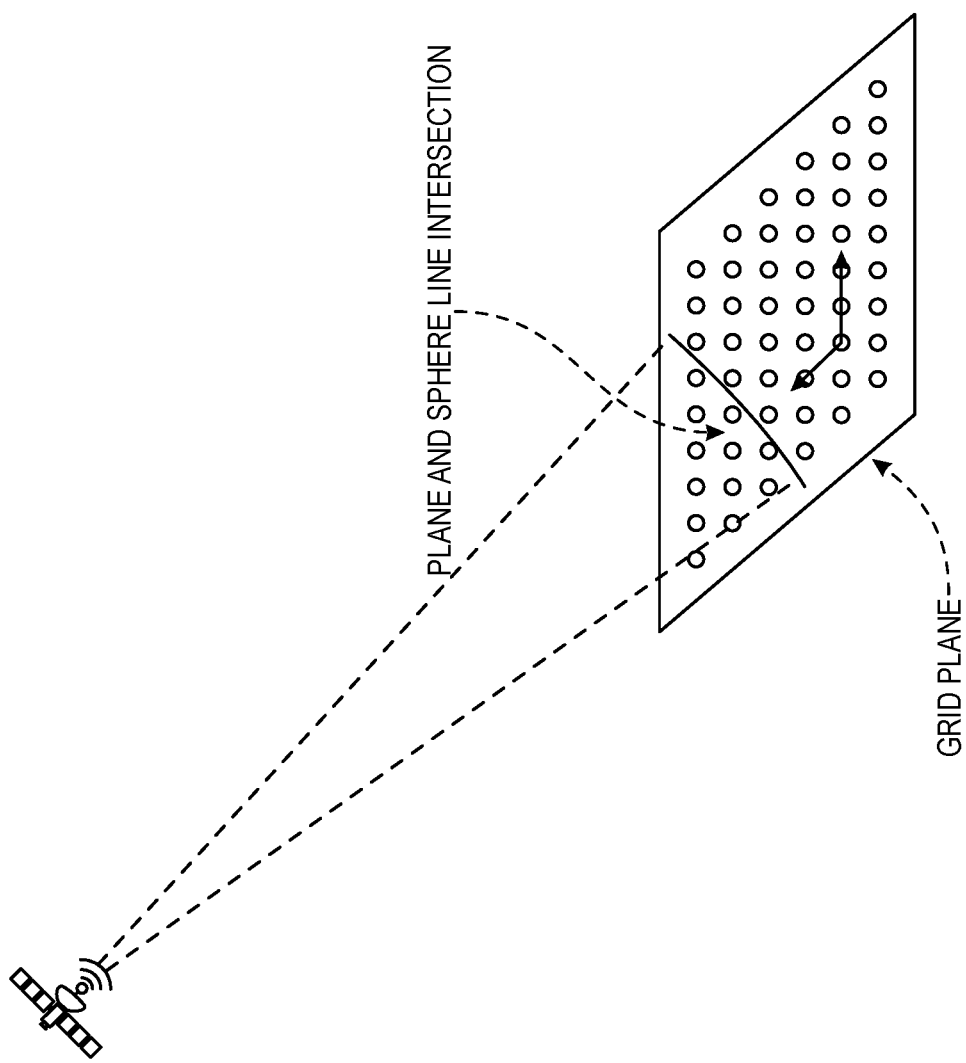

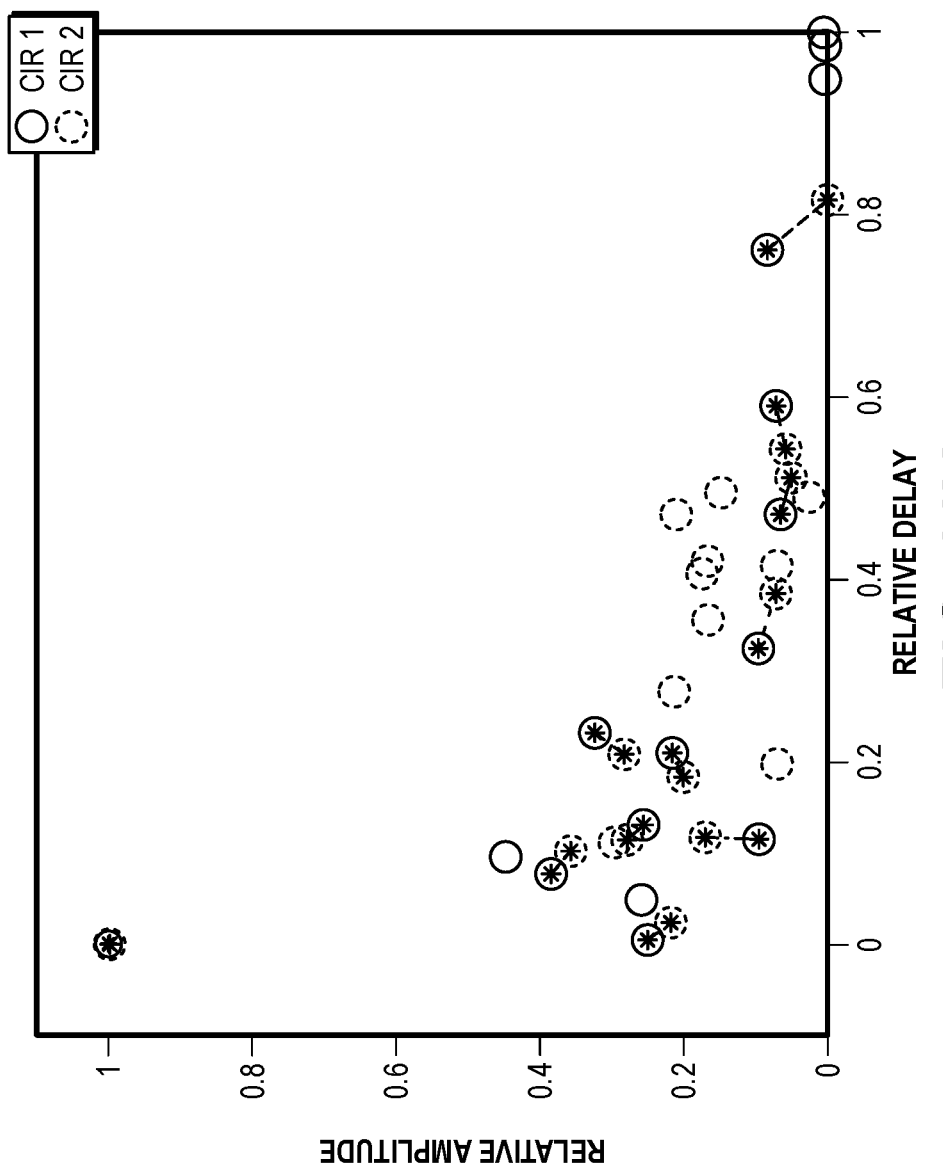

MATCHING FOR GNSS SIGNALS

This application claims the benefit of and priority to the following US provisional patent applications: U.S. provisional patent application No. 63/010,673, filed Apr. 15, 2020; U.S. provisional patent application No. 62/704,417, filed May 8, 2020; and U.S. provisional patent application No. 62/705,725, filed Jul. 13, 2020; and all of these provisional applications are incorporated herein by reference.

BACKGROUND

This disclosure relates to navigation systems, such as GNSS receivers that receive GNSS signals from GNSS satellites and use those signals to determine their position.

Urban canyons present problems for GNSS receivers because the tall buildings which line the streets of cities often block direct, line of sight signals from reaching the GNSS receiver. Moreover, reflected GNSS signals, that are reflected off the buildings, can require further processing in the GNSS receiver to distinguish between line of sight (LOS) signals and non-line of sight (NLOS) signals. As a result, position location in urban canyons can be inaccurate. This inaccuracy can result in situations in which a driver of a taxi service (e.g., Uber) is directed to the wrong side of the street by the GNSS receiver of the potential passenger.

This problem has been studied and some solutions have been proposed, including the solution described in U.S. Pat. No. 9,562,770 (inventor: Lionel J. Garin). This disclosure provides further solutions.

SUMMARY OF THE DESCRIPTION

The embodiments described herein provide solutions that can be used in the context of urban canyons by using data from both LOS and NLOS signals from each channel, where a channel is a GNSS signal from a particular satellite (SV), such as the E5a signal from a particular SV in the Galileo constellation of SVs. The E5b signal from the same particular SV is another (separate) channel.

In one embodiment, a device (such as a smartphone containing a GNSS receiver) can perform a method that includes the following operations: determining an approximate location of a GNSS receiver; determining a set of GNSS satellites (SV) in view of the approximate location; receiving a set of data describing expected SV signal reception data for the SVs in view, the set of data including, for each point in a model of points near the approximate location, the expected SV signal reception data for each SV in view at each point in the model, the expected SV signals including both line of sight and non-line of sight signals from each SV in the set of SVs in view, and wherein the set of data describing expected SV signal reception is based on three dimensional (3D) data about structures in the vicinity of the approximate location; receiving, at the GNSS receiver, GNSS signals in at least one of the L5 band ("GNSS L5 signals") and the L1 band and determining signal environment data for the received GNSS L5 signals or GNSS signals in the L1 band, the signal environment data including data for both line of sight and non-line of sight signals for each SV transmitting the GNSS L5 signals or the GNSS L1 signals; comparing the determined signal environment data to the expected SV signal reception data at each point in the model; and determining from the comparing an adjusted approximate location on the model of points based on a match between the determined signal environment data and the expected SV signal reception data. In one embodiment, the GNSS signal environment data comprises information about an LOS signal and a plurality of non-LOS signals in an E5a band for a first SV and information about an LOS signal and a plurality of non-LOS signals in the E5b band for the first SV (the same SV), and wherein the comparing comprises a pattern matching between the expected SV signal reception data at each point in the model of points and the GNSS signal environment data. The use of a plurality of non-LOS signals for each channel can reduce ambiguity when attempting to match patterns in the pattern matching operation.

In one embodiment, one or more server systems can perform a method that includes the following operations: receiving an approximate location from a GNSS receiver; determining a set of GNSS satellites (SVs) currently in view of the approximate location; storing, in one or more storage systems in a network, three dimensional (3D) data in association with location data, the three dimensional data describing structures in the vicinity of the received approximate location; determining, in one or more server systems in the network, a set of data describing expected SV signal reception data based on the 3D data in the vicinity of the received approximate location using ray tracing between the set of GNSS SVs currently in view and the model of points near the approximate location, the expected SV signals in the expected SV signal reception data including both line of sight and non-line of sight signals from each of the set of SVs currently in view; transmitting, from the network to the GNSS receiver, the set of data describing expected SV signal reception data based on the 3D data.

The embodiments described herein can range from those in which the device containing the GNSS receiver can be referred to as a thin client (relying on the servers to do most or all of the computations) to those in which the GNSS receiver performs all of the operations. For example, in one embodiment, a GNSS receiver may perform all of the operations (such as the operations shown in FIG. 3) by downloading the 3D database (DB) and performing the determination of the expected SV signal reception data based on the 3D data in the DB. In another embodiment, the GNSS receiver may perform a limited set of those operations and rely on the one or more server systems to calculate the final position of the GNSS receiver. Further information about these different embodiments is provided below.

Another aspect of these embodiments can use virtual tracking points for code phase measurements to adjust or steer tracking points for GNSS signals such as non-line of sight GNSS signals in order to enhance sensitivity to increase the signals that can be compared to an expected signal environment. One example according to this aspect can include the following operations: receiving GNSS signals from a plurality of GNSS satellites (SVs); determining code phase measurements from the received GNSS signals; determining accumulated delta range (ADR) measurements of carrier phase for at least a subset of the received GNSS signals; determining an initial position solution from the code phase measurements based on at least a first set of GNSS signals received from a first set of GNSS SVs in the plurality of GNSS SVs; generating a set of one or more virtual tracking points for code phase measurements on a second set of one or more GNSS signals from a second set of one or more GNSS SVs in the plurality of GNSS SVs or the first set of GNSS SVs, the set of one or more virtual tracking points derived from the ADR measurements; and steering a set of the one or more tracking points for code phase measurements for each GNSS signal in the second set of one or more GNSS signals, the steering based on the generated set of one or more virtual tracking points. In one embodiment, the GNSS receiver has not maintained a phase lock on the code phase measurements of the second set of one or more GNSS signals (e.g., NLOS signals).

In one embodiment, the steering provides additional impulses, in a channel impulse response model, for non-line-of-sight (NLOS) GNSS signals in the second set of one or more GNSS signals (and these additional impulses in the channel impulse response model are used in pattern matching at points in a model of points around an estimated location of the GNSS receiver), and the steering comprises moving a virtual tracking point for code phase measurements on a GNSS signal in the second set of one or more GNSS signals. In one embodiment, the first set of GNSS signals includes one or more line-of-sight (LOS) GNSS signals and the second set of one or more GNSS signals includes one or more NLOS GNSS signals. In one embodiment, a method used by a GNSS system according to this steering aspect can include the further operation of verifying a quality of the ADR measurements, wherein the verifying comprises confirming at least one tracking point, for code phase measurements of at least one of the first set of GNSS signals, is based on a LOS GNSS signal; this confirming can include examining the correlation vectors used for the code phase measurements on the LOS GNSS signal. In one embodiment the confirming can include receiving a cloud provided prediction of the at least one tracking point. In one embodiment, the confirming comprises: comparing change of position values derived from the ADR measurements, over time, on the first set of GNSS signals. In one embodiment, the verifying comprises: determining a consistency, over time, of changes in position along a trajectory of the GNSS receiver based on the ADR measurements. In one embodiment, the verifying comprises: maintaining state information that comprises position information over time and clock bias information over time and rates of change of both, and the state information is derived from the ADR measurements and not from code phase measurements.

In one embodiment of this steering aspect, the set of one or more virtual tracking points is based on carrier phase measurements and is not based on code phase measurements. In one embodiment, a virtual tracking point in the set of one or more virtual tracking points is provided by a GNSS signal in a first frequency band from a first GNSS SV and is used as the tracking point for a GNSS signal in a second frequency band from the first GNSS SV. In one embodiment, a GNSS receiver can use the steering when using pattern matching in a second mode but not a first mode in which pseudorange measurements, without pattern matching measurements, are used to determine position solutions; in the second mode the GNSS receiver uses both pseudorange and pattern matching measurements to determine position solutions, and in the second mode a measurement engine of the GNSS receiver generates measurements, including pseudorange measurements at a second rate which is greater than a first rate at which pseudorange measurements are generated when the GNSS is operating in the first mode. In one embodiment, a GNSS receiver or other GNSS system can generate, over time, the set of virtual tracking points at a first rate from a set of ADR measurements, the first rate exceeding a second rate at which code phase measurements, or position solutions based on code phase measurements, are generated; the first rate can be adaptively changed over time based on a number of pattern matching measurements being used to compute position solutions, such that the first rate is increased as the number of pattern matching measurements increase. In one embodiment, the first rate can be at least twice the second rate.

Another aspect of this disclosure relates to the use of superresolution algorithms to generate a channel impulse response for a GNSS signal or set of GNSS signals. A method according to one embodiment that uses a superresolution algorithm can include the following operations: receiving in a GNSS receiver a GNSS signal from a GNSS satellite; processing the received GNSS signal to create a set of snapshots of data, wherein each snapshot is a vector of signal samples; constructing a modified covariance matrix for each of a plurality of snapshots in the set of snapshots and combining a plurality of constructed and modified covariance matrices into an overall modified covariance matrix; and processing the overall modified covariance matrix to determine times of arrival of GNSS signals and delayed versions of those signals to provide a channel model for use in matching the channel model to pattern matching assistance data. There are numerous variations of this method that can use a superresolution algorithm. The superresolution algorithm can be any algorithm that constructs a covariance matrix for each of a multiplicity of snapshots of GNSS signal data (that has been received, digitized and stored) and the combines such covariance matrices into an overall covariance matrix; and then the overall covariance matrix is processed to determine times of arrival of both the GNSS signals and delayed versions of those signals (such as NLOS GNSS signals). In one embodiment, an overall covariance matrix can be computed for each of two different frequency bands in which a GNSS satellite transmits, and these two overall covariance matrices can be combined into one overall covariance matrix before computing times of arrival of the GNSS signals. In one embodiment, a method can construct a covariance matrix for each of a plurality of GNSS snapshots and construct a covariance matrix for the complex conjugate of each of the plurality of GNSS snapshots and then compute an average of these two covariance matrices. In another embodiment, a method can compute a modified covariance matrix from two successive frames in which a column vector of data from one frame is multiplied by the conjugated row vector corresponding to the next frame.

Another aspect of this disclosure relates to reprocessing of stored correlation vectors. In one embodiment of this aspect, a method of reprocessing of stored correlation vectors can include the following operations: receiving GNSS signals from a plurality of GNSS SVs; storing a plurality of complex correlation vectors that have been recently computed and used for position solutions; determining accumulated delta range (ADR) measurements of carrier phase for at least a subset of the received GNSS signals; generating a set of one or more virtual tracking points for code phase measurements of a first set of one or more or GNSS signals from the plurality of GNSS SVs; determining that the GNSS receiver cannot maintain a position solution based on the ADR measurements; and reprocessing the stored plurality of complex correlation vectors to adjust the virtual tracking points in response to determining that the GNSS receiver cannot maintain a position solution.

Another aspect of this disclosure involves the use of a linear polarized antenna (instead of a circular polarized antenna) to receive GNSS signals for use in pattern matching operations. In an embodiment according to this aspect, a linear polarized antenna (or an antenna with minimal polarization) is used to receive the GNSS signals in order to minimize polarization based distortions on the measured channel responses (or measured correlation vectors). This linear antenna can be used (instead of circular polarized antennas) in smartphones and also in vehicles (e.g, cars, trucks, etc.) to receive GNSS signals. In one embodiment, this linear antenna can be a dipole antenna or a patch antenna that has linear polarization and no circular polarization. In one embodiment, a GNSS receiver can generate a channel response or correlation vectors from signals received through a linear antenna and then process the channel response or correlation vectors with pattern matching operations described herein. The linear antenna can provide signals with less attenuation than circular polarized signals when performing pattern matching operations, and thus pattern matching operations are improved when a linear antenna is used.

The aspects and embodiments described herein can include non-transitory machine readable media that can store executable computer program instructions that when executed cause one or more data processing systems to perform the methods described herein when the computer program instructions are executed. The instructions can be stored in non-transitory machine readable media such as in dynamic random access memory (DRAM) which is volatile memory or in nonvolatile memory, such as flash memory or other forms of memory. The aspects and embodiments described herein can also include GNSS receivers that implement any one of the methods described herein, and these GNSS receivers can be part of a device such as a smartphone or tablet computer or a vehicle (such as an automobile).

The above summary does not include an exhaustive list of all embodiments and aspects in this disclosure. All systems, media, and methods can be practiced from all suitable combinations of the various aspects and embodiments summarized above and also those disclosed in the detailed description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
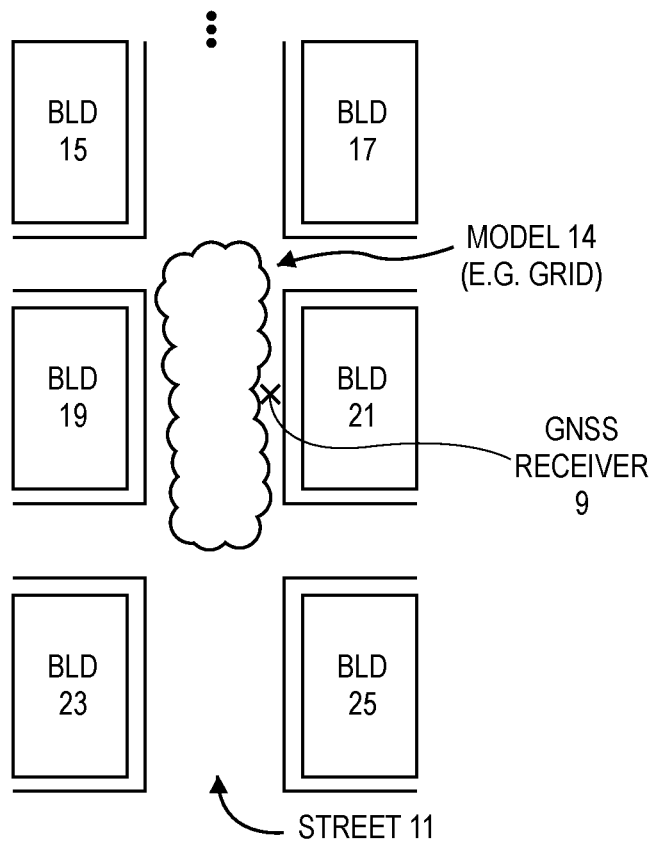
FIG. 1 shows a bird's eye view of an example of an urban canyon, with streets and buildings (Bld), and shows a pedestrian holding a smartphone that contains a GNSS receiver.

An example of an urban canyon is shown in FIG. 1 which shows a bird's eye view of the urban canyon. In this example, there is a street 11 (and other streets shown as the intersections) and buildings (Bld) 15, 17, 19, 21, 23 and 25. The buildings line the street 11 and will block signals from GNSS satellites such as SVs in the Galileo constellation and other GNSS constellations and other potential sources of GNSS-like signals from terrestrial signal sources. Taller buildings tend to block more signals than shorter buildings. In the example shown in FIG. 1, a pedestrian is near a sidewalk and is holding a GNSS receiver 9; the GNSS receiver 9 can be part of a device such as a smartphone or a tablet computer or other consumer electronic devices that are known in the art. A model 14 of points is shown overlaid on the urban canyon. This model 14 can be, for example, a Cartesian grid of points that is used as described herein to derive a set of expected SV signal reception data that is used as assistance data to improve the position determination operations resulting in improved positions being provided by, for example, the GNSS receiver 9. These improved positions can avoid the wrong side of the street problem described above.

Figure 2:
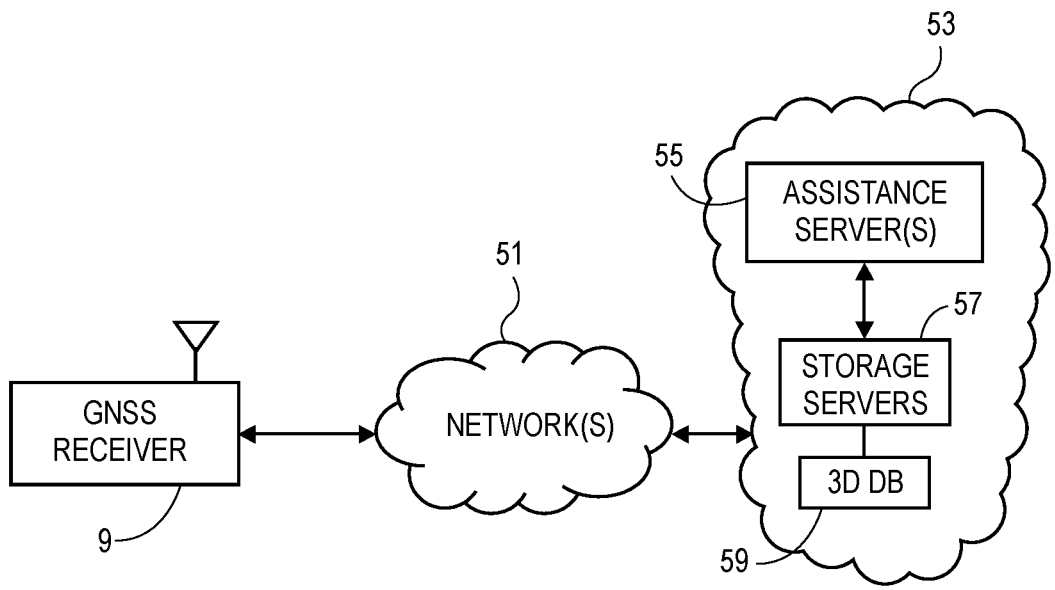
FIG. 2 shows an example of a system of devices that are coupled through one or more networks, and the system includes one or more GNSS receivers (with one shown) and one or more server systems that can provide assistance data for the purpose of correcting the location of the GNSS receiver.

FIG. 2 shows an example of a system of devices which can be used to perform the one or more embodiments described herein. The system can include one or more GNSS receivers, such as the GNSS receiver 9 and a set of one or more servers that can provide assistance data, or even more such as assistance data plus location determination services, depending on the particular implementation of an embodiment. The GNSS receiver 9 can be referred to as a client device that operates with the one or more servers in the server system 53 through a connection such as the network 51. The client device can do all operations, such as the operations shown in FIG. 3 or only some of the operations in which case one or more servers provide those operations including at least assistance data such as a set of expected SV signal reception data for satellites in view of the GNSS receiver 9. The GNSS receiver 9 can be a conventional GPS or GNSS receiver; alternatively, it can be any one of the GNSS receivers described in U.S. patent application Ser. No. 17/068,659, filed on Oct. 12, 2020 by Paul Conflitti, et. al. and issued as U.S. Pat. No. 11,686,855 on Jun. 27, 2023, and U.S. provisional patent application No. 62/915,510, filed on Oct. 15, 2019 by Paul Conflitti, et. al., and these patent applications are hereby incorporated herein by reference. The network 51 can be one or more networks such as public or private networks or the Internet and can include one or more cellular telephone networks. Thus, the network 51 can be a combination of wireless networks and wired networks, although when the GNSS receiver 9 is part of the smart phone or other wireless device, the network 51 will normally include a wireless portion. It will also be appreciated that the server system 53 can include one or more networks within the server system to allow communication between the one or more servers and the rest of the system. The server system 53 can include one or more servers that are operatively coupled to the network 51. These servers can include assistance server 55 which can be one or more servers, one or more storage servers 57 and a storage system 59. The assistance server 55 can perform one or more of the methods described herein, such as the method shown in FIG. 5A or the method shown in FIG. 5B. The assistance server 55 can communicate with storage servers 57 to retrieve three dimensional (3D) data (from storage system 59) about building structures, where this data is associated with location information about the location of the buildings. The three dimensional data about the building structures can include data about the height and width of the building in order to determine how and where the structure of the building can block signals from GNSS satellites. The existence of such databases is known, and some are even publicly available and can therefore be used with ray tracing techniques that are known in the art to determine, based on the height and width of the building, whether the building will block GNSS signals from GNSS SVs at any given time based upon ephemeris data for the GNSS SVs. As is known in the art, the one or more assistance servers 55 can determine satellites in view of an approximate location at a particular time based upon the ephemeris data for the satellites. In one embodiment, the ephemeris data can be so-called almanac data or other forms of data that can specify the position of the satellites in the sky at a particular point in time for a given location, such as an approximate location. The assistance server 55 can receive an approximate location and time from the GNSS receiver 9 (or from another source known in the art that can provide an approximate location such as cell towers in communication with a transceiver coupled to the GNSS receiver), and then use that approximate location and time to determine the positions in the sky for the satellites in view for that approximate location and time. Using known ray tracing techniques, the assistance server 55 can then generate data that represents a set of expected SV signal reception data for both line of sight and non-line of sight receipt of GNSS signals for each GNSS SV that is in view of the GNSS receiver 9. A description of a method according to one embodiment will now be provided by referring to FIG. 3.

Figure 3:
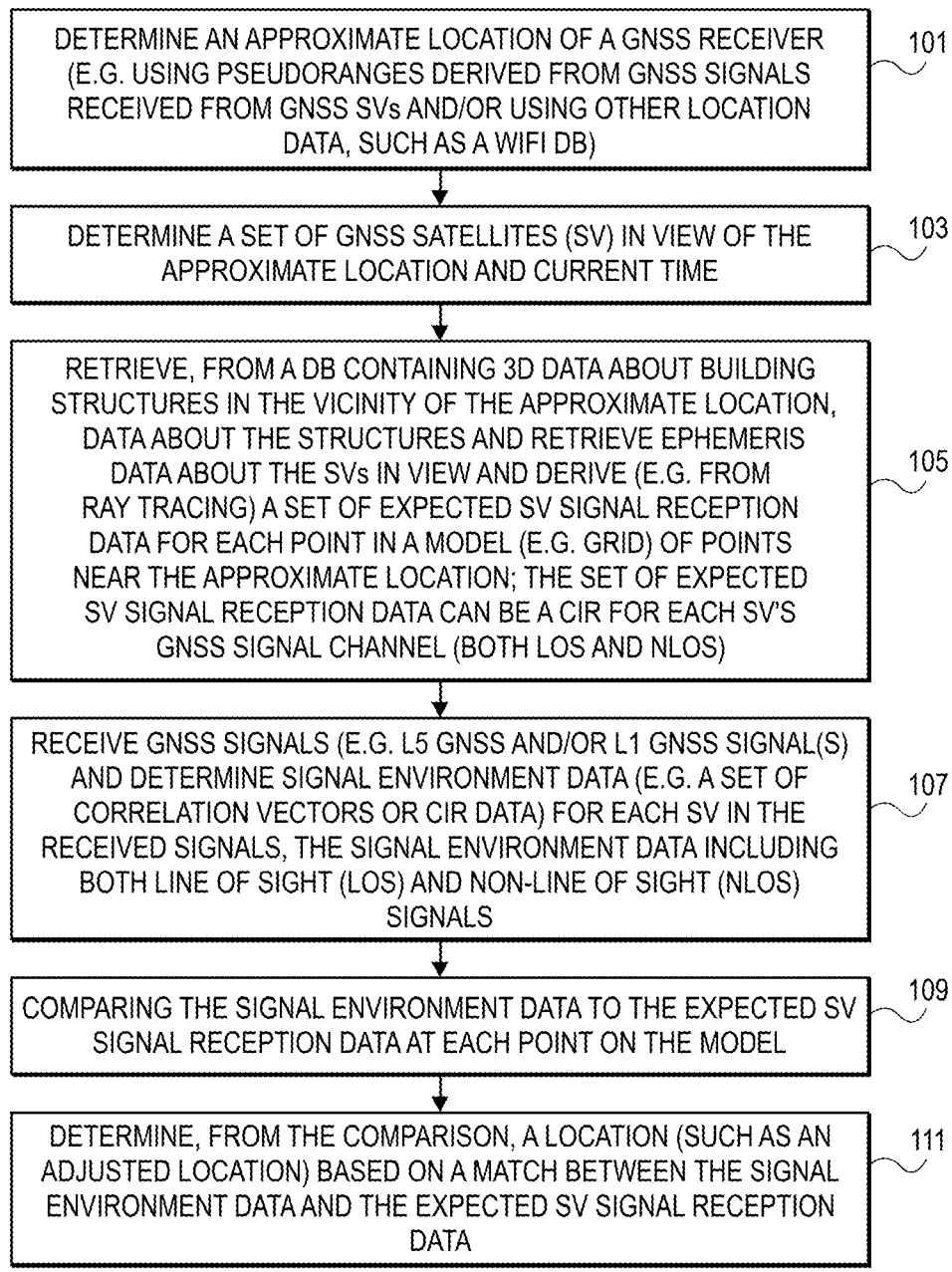
FIG. 3 is a flowchart that shows a method that can be performed by one or more devices.

The method shown in FIG. 3 can begin in operation 101. In operation 101, a GNSS receiver can determine its approximate location. For example, the receiver can, using conventional correlators or other techniques known in the art, derive pseudoranges from the received GNSS signals, and these pseudoranges can be used with ephemeris data about the satellites in view to determine an approximate location of the GNSS receiver; alternatively or in addition, the receiver may make use of other location data, such as location data which can be available from one or more databases about the position of Wi-Fi access points, cell phone towers in communication with the system containing the GNSS receiver, etc. In operation 103, a set of GNSS SVs that are in view of the GNSS receiver at the approximate location and current time is determined. The determination of this set of satellites can be part of operation 101 when the receiver determines its approximate location. In operation 105, a device can retrieve, from a database containing three dimensional data about building structures in the vicinity of the approximate location, data about the structures and retrieve ephemeris data about the satellites in view and derive, such as from ray tracing, a set of expected SV signal reception data for each point in a model, such as a grid, of points near the approximate location. The set of expected SV signal reception data can be a channel response or channel impulse response (CIR) for each SV's GNSS signal channel and includes both line of sight and non-line of sight signals in that signal channel. In another embodiment, the set of expected SV signal reception data can be a set of correlation vectors (CorrVec). It is possible to transform between the CIR domain and the CorrVec domain as described in the attached appendix. In operation 107, the GNSS receiver can receive GNSS signals (such as L5 GNSS signals and/or L1 GNSS signals) and determine signal environment data. In one embodiment, the signal environment data determined by the GNSS receiver (such as GNSS receiver 9) can be in the form of a set of correlation vectors or CIR data. In one embodiment, the signal environment data is determined for each SV from which GNSS signals have been received, and the signal environment data includes both line of sight and non-line of sight GNSS signals for each SV. Then in operation 109, a system or device compares the signal environment data determined in operation 107 to the expected SV signal reception data at each point on the model (such as a grid). Then in operation 111, one or more devices determines, from the comparison in operation 109, a location of the GNSS receiver, where the location may be an adjusted location based on a match between the signal environment data in the expected SV signal reception data. In one embodiment, the pattern matching operation can take advantage of different GNSS signals from different satellites in different constellations that are co-located (in elevation and azimuth) from the perspective of the GNSS receiver (e.g., they have nearly the same elevation and azimuth, such as within 3 degrees of each other, from the perspective of the GNSS receiver). In this case, the CIRs from the two different satellites should be similar as their signals should experience nearly the same multipath patterns. For example, in one or both of operations 109 and 111, a processing system can compare the CIRs from such satellites that are nearly co-located as a consistency check; if the CIRs are not similar enough, the processing system can set a flag indicating a potential error in the measurements may exist and can decide to not use these CIRs in operation 111.

In one embodiment, the method shown in FIG. 3 may be performed entirely by a client device such as a smart phone device that includes a GNSS receiver while in another embodiment, the method shown in FIG. 3 can be performed by such a client device in combination with one or more server devices which can perform some of the operations that the client device does not perform. Various examples of these variations are provided in conjunction with the methods shown in FIGS. 4A, 4B, 5A, and 5B.

Figure 4A:
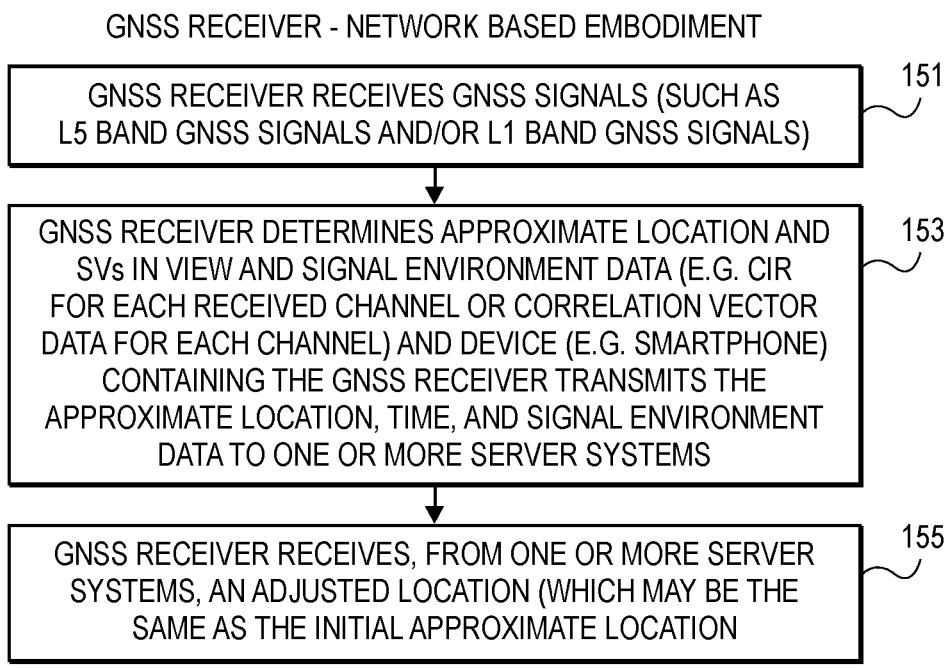
FIG. 4A is a flowchart that shows a method, according to one embodiment, that can be performed by a device (e.g., a smartphone) containing a GNSS receiver; in this embodiment shown in FIG. 4A, one or more server systems perform the location determination operations. The method shown in FIG. 4A can be performed concurrently with the method shown in FIG. 5A.

FIG. 4A shows an example of a method performed in a device containing a GNSS receiver that is used in an embodiment in which one or more components in the network (e.g., assistance server 55) provides the location after receiving data from the GNSS receiver. The method shown in FIG. 4A can be performed by the GNSS receiver and a complementary and concurrently performed method shown in FIG. 5A can be performed by a server system (or a set of server systems) which computes the final location for the GNSS receiver. In operation 151, the receiver receives GNSS signals, such as L5 band GNSS signals and/or L1 band GNSS signals. Then in operation 153, the GNSS receiver determines an approximate location for the receiver. The determination of the approximate location can be performed using conventional techniques using pseudoranges derived from correlations or other operations on the received GNSS signals or based upon a last recent position solution, etc.; the process of determining the approximate location will also determine the satellites in view of the receiver. The GNSS also determines signal environment data such as CIR data for each received channel or a set of correlation vectors or correlation vector data for each channel. Then the device containing the GNSS receiver transmits the approximate location, the time of capture of the GNSS signals and the signal environment data to one or more server systems, such as the one or more servers shown in the server system 53 in FIG. 2. The one or more server systems can then perform the operations shown in FIG. 5A which can ultimately provide a location for the GNSS receiver, which is shown in operation 155 in FIG. 4A. Referring back to FIG. 4A, the method shown in that figure can conclude in operation 155 in which the GNSS receiver receives, from the one or more server systems, an adjusted location of the receiver, which may be the same as the initial approximate location depending on the current surroundings and situation of the receiver.

Figure 4B:
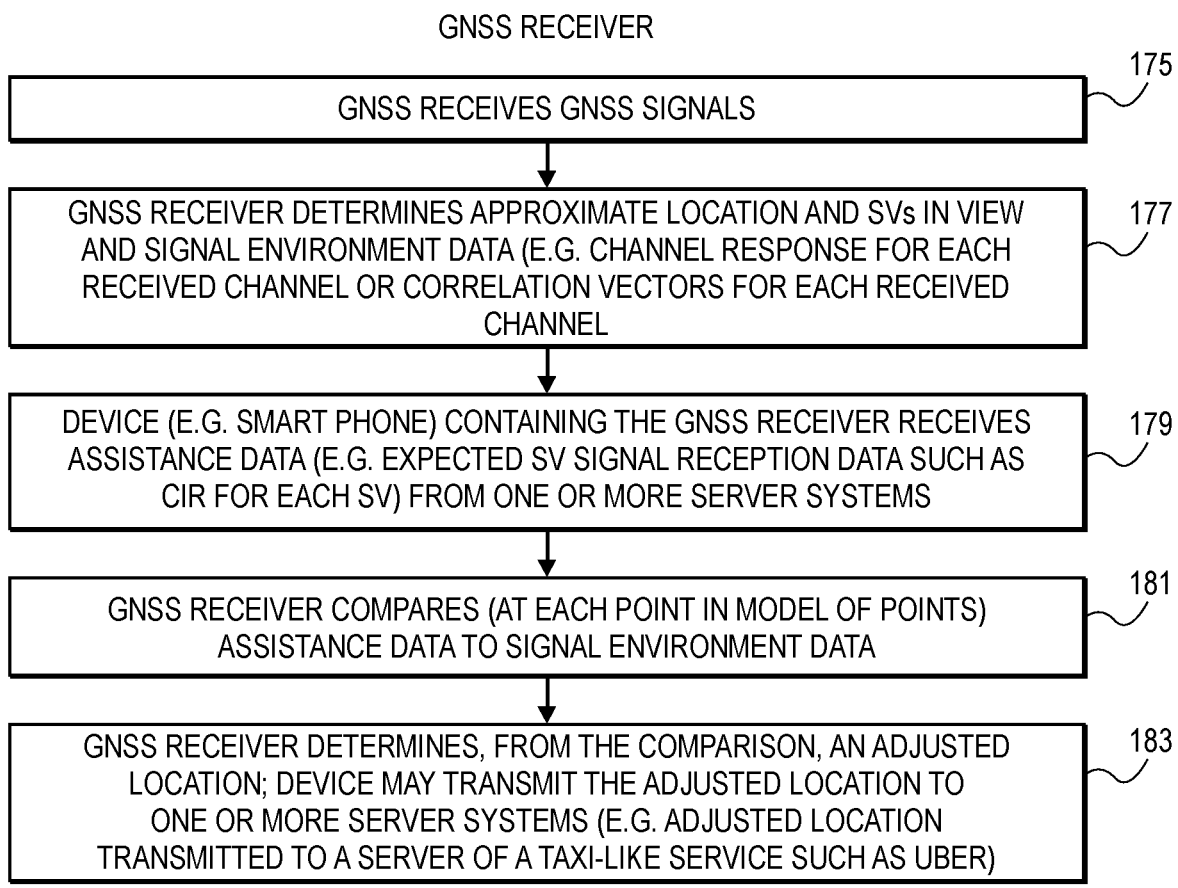
FIG. 4B is a flowchart that shows a method, according to another embodiment, that can be performed by a device (e.g., a smartphone) containing a GNSS receiver; in this embodiment shown in FIG. 4B, the GNSS receiver performs the location determination operations. The method shown in FIG. 4B can be performed concurrently with the method shown in FIG. 5B.

FIG. 4B shows an alternative method which can be performed by a GNSS receiver which uses less server assistance than the method shown in FIG. 4A. In the example shown in FIG. 4B, the GNSS will determine its own position by performing the comparison, such as a pattern matching operation between the assistance data received from the one or more server systems and the signal environment data which was determined by the GNSS receiver. Operation 175 can be the same as operation 151 shown in FIG. 4A. In operation 177 the GNSS receiver can determine its approximate location and SVs in view and the signal environment data (e.g., a channel response for each channel). In operation 179, the device, such as a smart phone, containing the GNSS receiver can receive assistance data from one or more server systems. This assistance data is based upon the approximate location and time provided by the GNSS receiver in operation 177. The assistance data can be an expected SV signal reception data such as CIR data for each SV in view of the receiver at the approximate location and time. This assistance data can include both line of sight and non-line of sight signal information for each SV channel as described elsewhere in this disclosure. Then in operation 181, the GNSS can compare (at each point in the model of points) the received assistance data to the signal environment data determined in operation 177. Then in operation 183, the receiver can determine, from the comparison operation 181, an adjusted location of the GNSS receiver. The device may then transmit the adjusted location to one or more server systems. For example, the adjusted location can be transmitted to a server of a taxi like service, such as Uber. The method shown in FIG. 4B can be used in conjunction with the method performed by a server system shown in FIG. 5B.

Figure 5A:
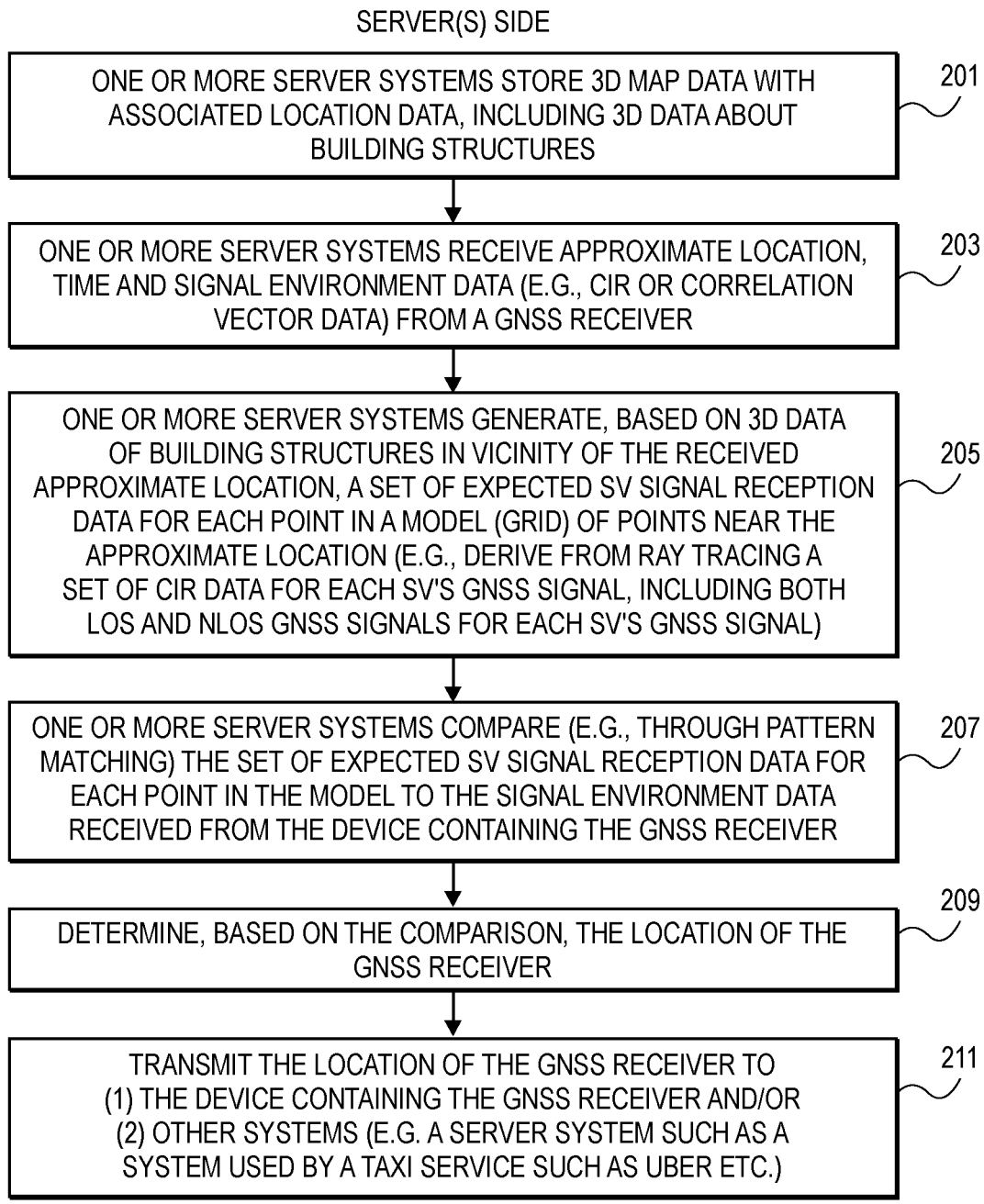
FIG. 5A is a flowchart that shows a method, according to one embodiment, that can be performed by one or more server systems to provide assistance data to assist in the determination of the location of a GNSS receiver; in this embodiment shown in FIG. 5A, the one or more server systems perform the location determination operations.

The method shown in FIG. 5A can be performed by one or more server systems that can provide the final location of the GNSS receiver, and these one or more server systems can be part of the server system 53 shown in FIG. 2. In operation 201, one or more server systems can store three-dimensional map data that is associated with location data, including three-dimensional data about building structures. This three-dimensional data can provide information about the height and width of buildings at particular locations such as locations along a street in an urban canyon. This three-dimensional data about the building structures can be used to derive expected SV signal reception data for points along the street in the urban canyon, such as points in a model of points near locations in the urban canyon. In operation 203, one or more server systems can receive an approximate location and time and signal environment data, such as CIR data or correlation vector data, from a GNSS receiver that has requested assistance to determine its location within, for example, an urban canyon. In operation 205, one or more server systems can generate, based on the three-dimensional data of building structures in the vicinity of the received approximate location, a set of expected SV signal reception data for each point in a model, such as a grid, of points near the approximate location. This set of expected SV signal reception data can be derived from known techniques using ray tracing. This set of expected SV signal reception data can include both line of sight and non-line of sight GNSS expected signals for each channel, such as each SV's GNSS signal. Then in operation 207, one or more server systems can compare the set of expected SV signal reception data for each point in the model of points to the signal environment data received from the device containing the GNSS receiver. In one embodiment, this comparison can be performed through a pattern matching operation, and various embodiments of pattern matching operations are described in further detail in the attached appendix. Then in operation 209, one or more servers can determine, based on the comparison operation 207, the location of the GNSS receiver which provided its information in operation 203 of this method. Then, the location of the receiver can be transmitted in operation 211 to one or more of (1) the device containing the GNSS receiver and/or (2) other systems, such as a server system used by a taxi service such as Uber, etc.

Figure 5B:
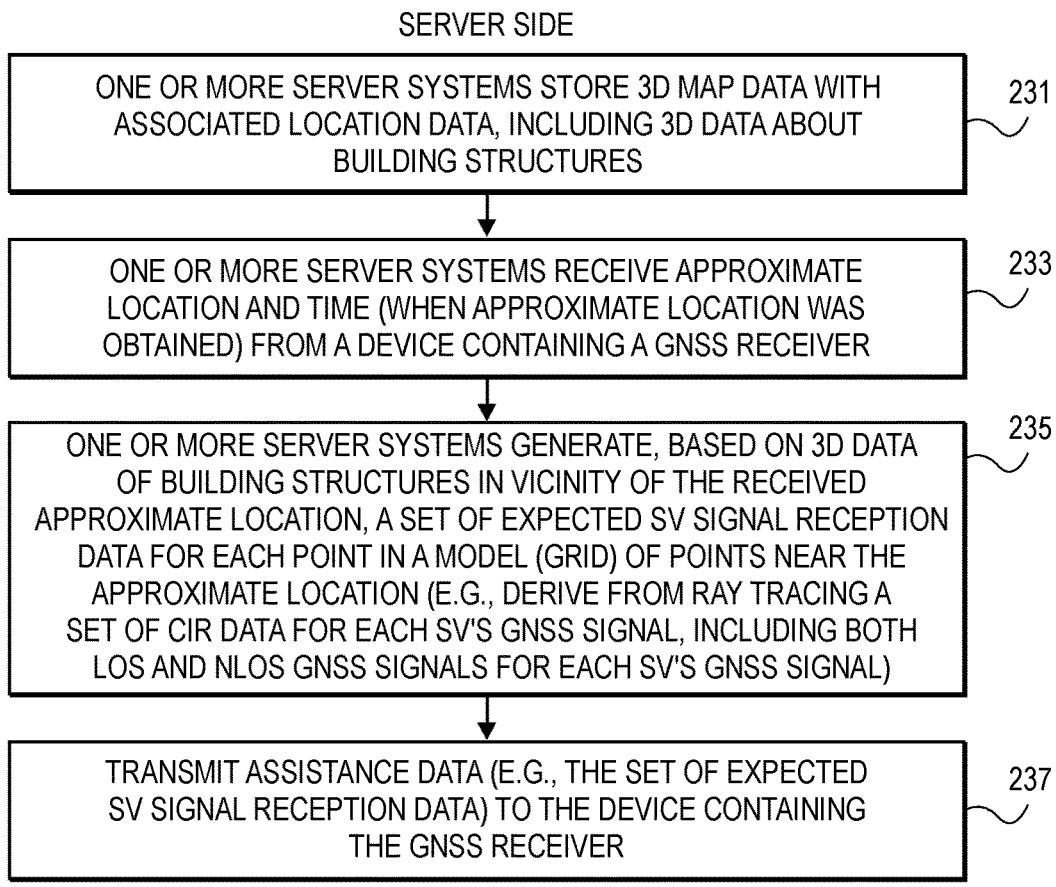
FIG. 5B is a flowchart that shows a method, according to one embodiment, that can be performed by one or more server systems to provide assistance data to assist in the determination of the location of a GNSS receiver; in this embodiment shown in FIG. 5B, the GNSS receiver performs the location determination operations.

The method shown in FIG. 5B is a method that can be performed by one or more servers to provide assistance data, but this method relies upon the client device such as the GNSS receiver that requested assistance to compute the final position information. Operation 231 can be the same as operation 201 shown in FIG. 5A. In operation 233, one or more server systems can receive approximate location and time information from a device containing a GNSS receiver. Then the one or more systems can perform operation 235 which can be the same as operation 205 in FIG. 5A. Then in operation 237, one or more servers can transmit the assistance data to the device containing the GNSS receiver, and this assistance data can be the set of expected SV signal reception data described herein. The method shown in FIG. 5B can be performed concurrently and in conjunction with the method shown in FIG. 4B which is performed by a client device such as a GNSS receiver.

Figure 6:
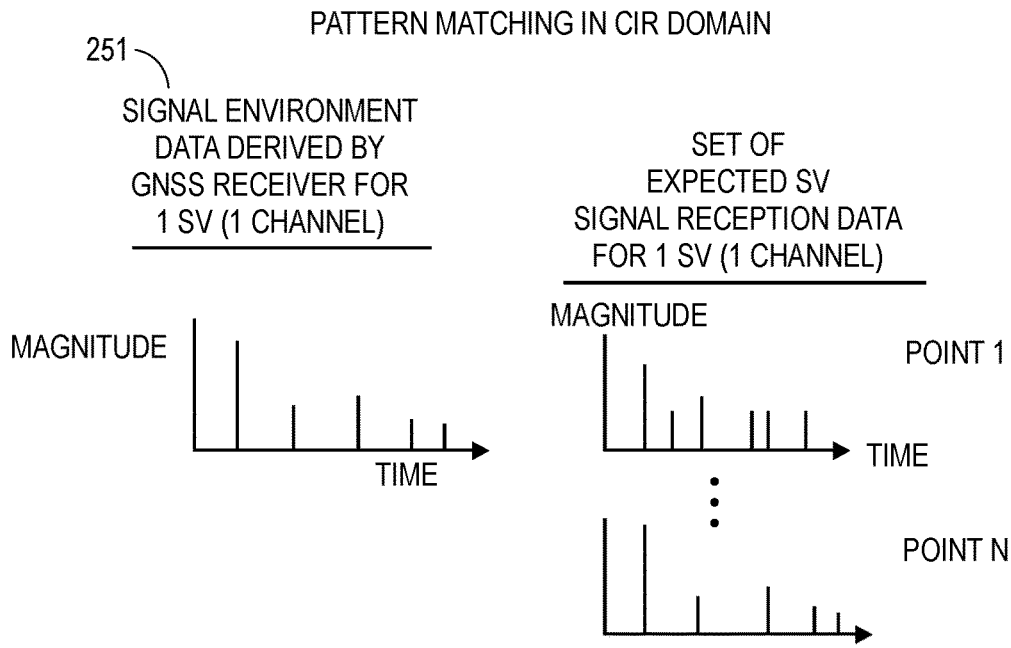
FIG. 6 shows an example of a pattern matching operation in the channel impulse response (CIR) domain.

FIG. 6 shows an example of a pattern matching operation in the CIR domain. It will be appreciated that the pattern matching operation can also be used in the correlation vector domain. As shown in FIG. 6, the pattern matching operation is performed by comparing signal environment data, such as signal environment data 251 which is derived by a GNSS receiver for one satellite's GNSS signal (one channel), such as the E5a GNSS signal from a particular SV in the Galileo constellation. The data for this one channel includes both received line of sight signal and non-line of sight signals. In one embodiment, up to 30 such signals for one channel can be included in the channel response or CIR data in the signal environment data for that particular channel. In one embodiment, a system may use the E5a signal from a particular SV as one channel and also use the E5b signal from the same particular SV as another channel when performing pattern matching; the use of these two channels from the same SV can enhance the pattern matching operations as described below in connection with the use of superresolution methods. The signal environment data for a particular channel (received at the GNSS receiver) is compared against the set of expected SV signal reception data for that same channel, which expected SV signal reception data was provided by the one or more servers (assistance server 55) in one embodiment. The comparison is performed for each point in the model (e.g. grid) of points such that the signal environment data 251 is matched against the corresponding data for each point. As can be seen from operation FIG. 6, there are N points which are compared against the signal environment data 251, and it would appear that the best match may be point N as shown in FIG. 6. Further details with respect to embodiments for pattern matching are provided in the appendix which is attached hereto.

Figure 7:
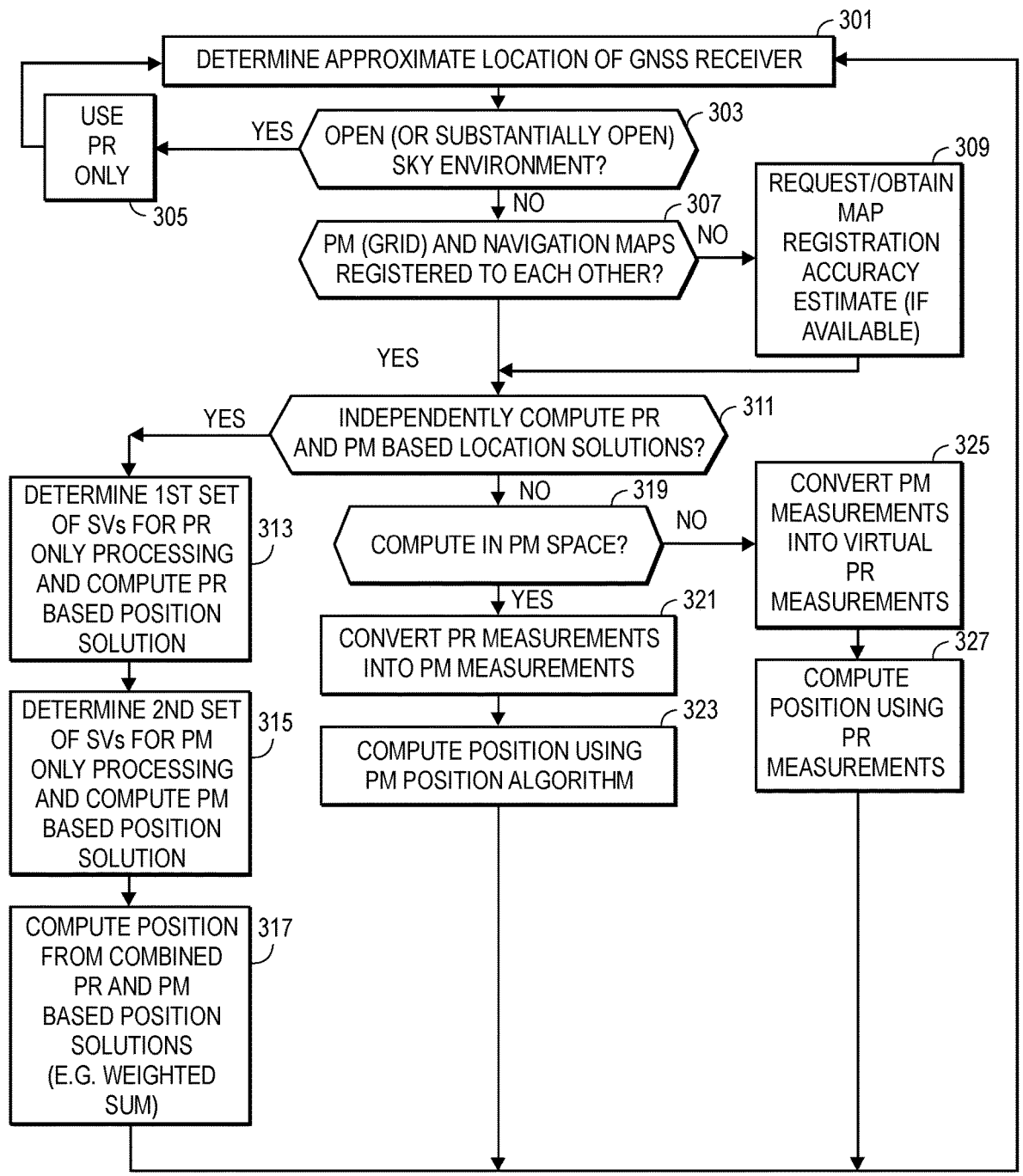
FIG. 7 is a flowchart that shows a set of one or more methods than can be used to switch between pseudorange based position solutions and position solutions based on pattern matching using pattern matching assistance data.

Another aspect of this disclosure relates to how position solutions from pattern matching operations, such as the operations shown in FIG. 3, 4A, 4B, 5A or 5B, can be combined with or used with pseudorange measurements to derive position solutions from the combination of pattern matching measurements and pseudorange measurements. Another aspect of this disclosure relates to determining when to use pattern matching measurements (either with or without pseudorange measurements) and when to not use pattern matching measurements. FIG. 7 shows an example of a set of one or more methods that can be used to determine when to switch between use of pseudorange (PR) measurements and use of both PR and pattern matching (PM) measurements and also how those measurements can be combined. The method can begin in operation 301 by determining an approximate location of a GNSS receiver. The approximate location can be obtained from any one of the known sources for approximate locations, such as a prior, recent (e.g., within last 30 seconds) position solution or a location derived from a sector serviced by a cellular telephone radio tower (also referred to as a cellular telephone basestation) or a location derived from a database of locations of known WiFi access points, etc. In operation 303, the GNSS receiver can determine, based upon its approximate location, whether it is located in an open sky environment (such as a flat prairie with open fields and no building structures within several hundred feet of the approximate location) or in a substantially open sky environment. In one embodiment, a GNSS receiver can provide its approximate location to an assistance server (in a network coupled to the device containing the GNSS receiver), and the assistance server can provide, as a response to the approximate location, a classification of the signal environment of the approximate location; the classification can include: open sky or substantially open sky or suburban or urban. In another embodiment, the device containing the GNSS receiver can include a representation of a map that provides the classifications of the signal environment as a function of the location or approximate location. If operation 303 determines that the GNSS receiver is in an open sky (or substantially open sky) environment, then it will use operation 305 to determine position using only PR measurements; PM measurements will not be used during operation 305. As time passes, the GNSS receiver can repeat the process of determining the signal environment by reverting back to operation 301 as shown in FIG. 7.

If operation 303 determines that the GNSS receiver is not in an open sky environment, then processing can proceed to operation 307; in operation 307, the GNSS receiver can determine whether the grid or model used for pattern matching is registered with the coordinate system used by the navigation engine in the GNSS receiver. The coordinate system of the grid or model used for pattern matching may be different than the coordinate system used by the navigation engine (such as a Kalman filter based navigation engine) in the GNSS receiver (or other system) that computes the position solution, and the difference can be reconciled by a registration error or registration accuracy estimate. If the navigation maps and the grid or model are registered (e.g., they may use the same coordinate system), then processing can proceed from operation 307 to 311 without performing operation 309. On the other hand, if they are not registered (e.g., as determined in operation 307), then the device containing the GNSS receiver can request or obtain map registration accuracy estimate information in operation 309. This map registration accuracy estimate information can then be used by the navigation engine (e.g., in the navigation engine in the GNSS receiver or an instance of a navigation engine in the infrastructure that will compute the location of the GNSS receiver) when using both PR measurements and PM measurements in the rest of the method shown in FIG. 7. The use of the accuracy estimate information can be used as a bias measurement to attempt to align the two different coordinate systems so that the two sets of measurements will be compatibly aligned (in effect creating a transformation between the two coordinate systems).

In operation 311, the GNSS receiver can determine whether or not to independently compute PR and PM based position solutions using separate sets of GNSS signals from different sets of GNSS SVs. In one embodiment, the independent computation of two different position solutions from two different sets of GNSS signals may be appropriate in certain circumstances. If in operation 311 the GNSS receiver decides to compute both PR and PM based position solutions, the GNSS receiver proceeds to perform operation 313. In operation 313, the GNSS receiver can determine a first set of satellites which will be used to process pseudoranges based on GNSS signals received from the first set of satellites. In one embodiment, these satellites in the first set will be used to compute PR based position solutions and some of their signals may also be used to compute PM based position solutions in operation 315. In operation 313, a PR based position solution is computed based on pseudoranges derived from GNSS signals received from a first set of GNSS satellites; in one embodiment, operation 313 can use known techniques to derive the pseudoranges from the received GNSS signals from the first set of GNSS satellites, and known techniques can be used to compute a position solution based on these derived pseudoranges, and this position solution can be referred to as a PR based position solution. Then in operation 315 a system, such as the GNSS receiver, can determine a second set of satellites which will be used to compute a PM based position solution. In one embodiment, these satellites in the second set will be used to compute PM based position solutions and some of their signals may also be used to compute PR based position solutions in operation 313. In operation 315, a system can then compute the PM based position solution using one or more of the methods described herein to compute a position solution on, for example, a grid that has been applied over the trajectory or path of the GNSS receiver. After operation 315, two position solutions will exist and can be combined, in operation 317, using some relative weights which represent the relative accuracy of each position solution. The relative weights used to combine the two position solutions (the PR based position solution and the PM based position solution) can be based upon estimates of the accuracy of each position solution, and techniques are known in the art for combining two position solutions based upon their estimated accuracies. In one embodiment, operation 311 can verify that each set of satellites (the first set and the second set of satellites) is sufficiently large (e.g., at least four satellites in each set) prior to beginning operations 313 and 315 so that the system can ensure that the approach of independently computing two positions (using 2 different sets of measurements) should work. If an independent computation approach will not work, processing can proceed to operation 319 as shown in FIG. 7.

If the system in operation 311 determines that independent computation of two positions will not be used, then processing can proceed to operation 319. In operation 319, the system can determine whether or not it will compute the position solution in the PM space. Computing the position solution in the PM space means that the PM measurements will be used to compute the position solution. Thus, if the system decides to compute in the PM space, in operation 321, the system converts PR measurements into PM measurements using techniques described in the attached appendix. Then in operation 323, the system computes a position solution using one or more of the PM position solution methods described herein. Then the system can revert back to operation 301 to continue providing position solutions using the method shown in FIG. 7. If in operation 319 the system determines that it will compute the position solution in the PR space, then in operation 325 PM measurements will be converted into PR measurements which can be referred to as virtual PR measurements; the conversion of PM measurements into virtual PR measurements is described further below in the attached appendix. Once all the measurements have been converted into the PR space, then in operation 327, a position solution can be calculated using the PR measurements. After operation 327, processing can revert back to operation 301 as shown in FIG. 7.

Reverting back to operation 301 over time allows the GNSS receiver to transition between different signal environments as it moves along a trajectory and hence switch between different modes of operation depending upon changes in the signal environment. For example, if the GNSS is initially in an open sky environment, processing as shown in FIG. 7 will remain in a loop that includes only operations 301, 303, and 305; as it moves out of an open sky environment and into a suburban environment, the GNSS receiver can transition into a loop of operations that include operations 301, 303, 307, 309, 311, 313, 315, and 317 one the hybrid approach is used in a suburban environment. As the GNSS receiver moves out of the suburban environment and into an urban environment, it can transition into a loop of operations that include operations 301, 303, 307, 309, 311, 319, 321, and 323.

While FIG. 7 depicts a system that is capable of using three approaches to provide position solutions, it will be appreciated that, in alternative embodiments, a system may provide only one of these three or two of these three in various different combinations. The three approaches may be referred to as (1) a hybrid approach which uses the two separate position solutions which are combined in operation 317; (2) a PM based approach (in operations 321 and 323); and (3) a PR based approach (in operations 325 and 327). Thus in an alternative embodiment, a system may use the hybrid approach and the PM based approach but does not use the PR based approach. In another alternative embodiment, a system may use the hybrid approach and the PR based approach but does not use the PM based approach. In yet another alternative embodiment, a system may use the PM based approach and the PR based approach but does not use the hybrid approach. In another alternative embodiment, a system may only use the PM based approach and not use the hybrid approach or the PR based approach. In one embodiment, the method shown in FIG. 7 can be performed almost entirely by a device containing the GNSS receiver, while in another embodiment, some of the operations shown in FIG. 7 can be performed by the device containing the GNSS receiver while one or more assistance servers (which are operably coupled to the device) can perform the remainder of the operations shown in FIG. 7. For example, in one embodiment, the GNSS receiver can compute its own position solution or set of position solutions while in another embodiment one or more assistance servers can compute one or more position solutions for the GNSS receiver and provide those position solutions to the GNSS receiver and potentially to other systems such as other mobile devices or other server systems in a network.

Another aspect of the embodiments described herein involves the use of systems and methods to improve sensitivity to increase the available number of impulses in a channel response of channel impulse response for one or more channels used in, for example, the pattern matching operations described herein. These sensitivity improvements can increase the number of impulses (such as increasing the number of NLOS impulses) so that the pattern matching operations can have enough data to operate properly and efficiently. NLOS GNSS signals can have poor signal to noise ratios and thus be difficult to detect. If only one NLOS signal can be detected in a channel response or CIR, it may be very difficult to perform pattern matching. Increasing the number of NLOS impulses can improve the pattern matching operation by reducing ambiguity in the matching operation (making it easier to correctly match patterns). These sensitivity improvements can be based on the use of confirmed LOS GNSS signals (from one or more GNSS SVs) that have been phase locked in the GNSS receiver to derive virtual tracking points for other GNSS signals (from other SVs) that are NLOS and not phase locked in the GNSS receiver. This can also be extended to the use of confirmed LOS GNSS signals from one band of GNSS signals (E5a) from a particular GNSS SV that have been phase locked to derive virtual tracking points for the GNSS signals in another band (e.g., E5b) from the same particular GNSS SV. This improved sensitivity can be achieved by using, in one embodiment, accumulated delta range (ADR) measurements of carrier phase for GNSS signals that are phase locked in the GNSS receiver. The virtual tracking points for other GNSS signals that are not phase locked can be derived from the ADR measurements so that the other GNSS signals can continue to be tracked, potentially coherently over time, to improve detectability and thus reveal the NLOS signals in the CIR for a given channel (a set of GNSS signals from a given SV in a given frequency banc). Further details about sensitivity improvements are provided in the attached appendix. This aspect of sensitivity improvements can be used with any of the other aspects and embodiments described herein.

Figure 8:
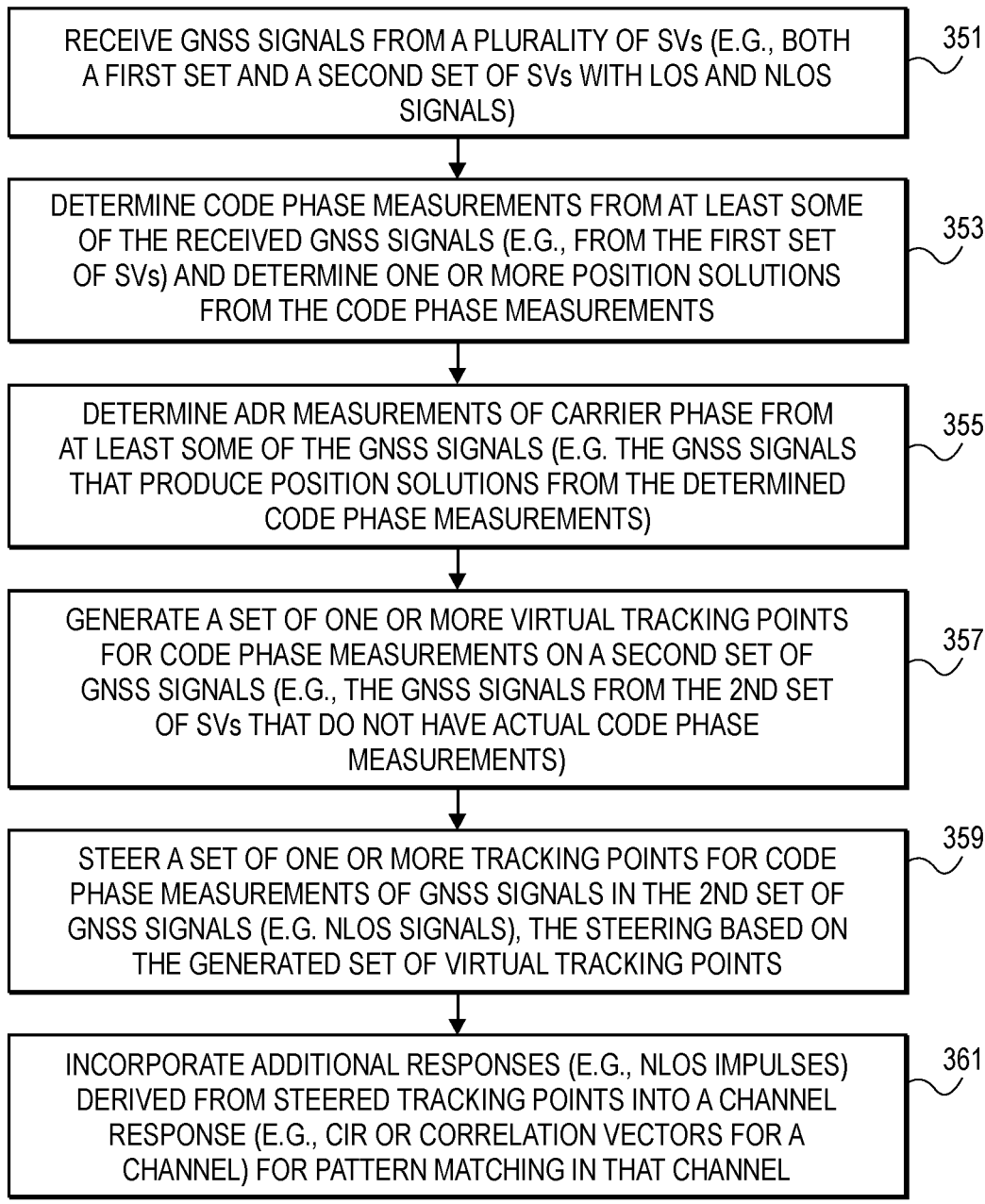
FIG. 8 shows a flowchart that illustrates a method for steering virtual tracking points to assist with pattern matching operations in one embodiment.

FIG. 8 shows an embodiment that can be used to improve sensitivity by, for example, increasing the number of responses in a channel response or impulses in a CIR that can be used in the one or more pattern matching embodiments described herein. In operation 351 in FIG. 8, a GNSS receiver can receive GNSS signal from a plurality of GNSS SVs; the plurality can include a first set of SVs that transmit signals, some of which are received as LOS signals, and a second set of SVs that transmit signals, at least some of which are received as NLOS signals. Then in operation 353, the GNSS receiver can determine code phase measurements from at least some of the received GNSS signals (e.g., the GNSS signals from the first set of SVs, some of which are received as LOS signals) and determine one or more position solutions from the code phase measurements (if possible). In operation 355, the GNSS receiver can determine accumulated delta range (ADR) measurements from at least a subset of received GNSS signals (such as at least some of the LOS GNSS signals from the first set of SVs); these ADR measurements are on the carrier phase of at least a subset of received GNSS signals. The GNSS receiver can then in operation 357 generate a set of one or more virtual tracking points for code phase measurements for SVs for which code phase measurements have not been determined (e.g., for those SVs in the second set of SVs that are not line of sight and hence their signals are not line of sight). The GNSS receiver can then, in operation 359, steer a set of one or more tracking points for code phase measurements for those SVs for which code phase measurements have not been determined, such as SVs in the second set of SVs (e.g., the GNSS receiver has not maintained a phase lock on those measurements). This steering can be based on the generated set of virtual tracking points that were generated in operation 357. This steering can include moving the virtual tracking points for code phase measurements on GNSS signals that lack code phase measurements (e.g., the GNSS receiver is unable to phase lock on code phase of such GNSS signals), and this steering can improve the sensitivity of the GNSS receiver by allowing it to capture more NLOS signals (and LOS signals) in a CIR or a set of correlation vectors which can improve the pattern matching operations described herein. These additional NLOS signals (and possibly additional LOS signals) can, in operation 361, be incorporated into a CIR or correlation vectors for use in pattern matching with an expected signal environment (such as the expected SV signal reception data in operation 105 in FIG. 3). These additional impulses from NLOS signals can improve the quality of CIRs and hence improve the position solutions derived from pattern matching. In one embodiment, the GNSS receiver can verify the quality of the ADR measurements by, for example, confirming that at least one tracking point for code phase measurements that were used in positions solutions (and a phase lock was maintained on those code phase measurements) is based on a LOS GNSS signal (rather than a NLOS GNSS signal); this confirmation can be through examination of the correlation vectors used for the code phase measurements or through the use of a machine learned model that can distinguish between LOS and NLOS GNSS signals. In one embodiment, the verifying can include maintaining state information that comprises position information over time and clock bias information over time and rates of change of both, and the state information is derived from the ADR measurements and not from code phase measurements. In one embodiment, the set of virtual tracking points can be generated at a first rate from a set of ADR measurements, with the first rate exceeding a second rate at which code phase measurements, or position solutions based on code phase measurements, are generated, and this first rate can be adaptively changed over time based on a number of pattern matching measurements being used to compute position solutions, such that the first rate is increased as the number of pattern matching measurements increase. In one embodiment, the first rate can be as much as twice the second rate or less than twice the second rate.

Figure 9:
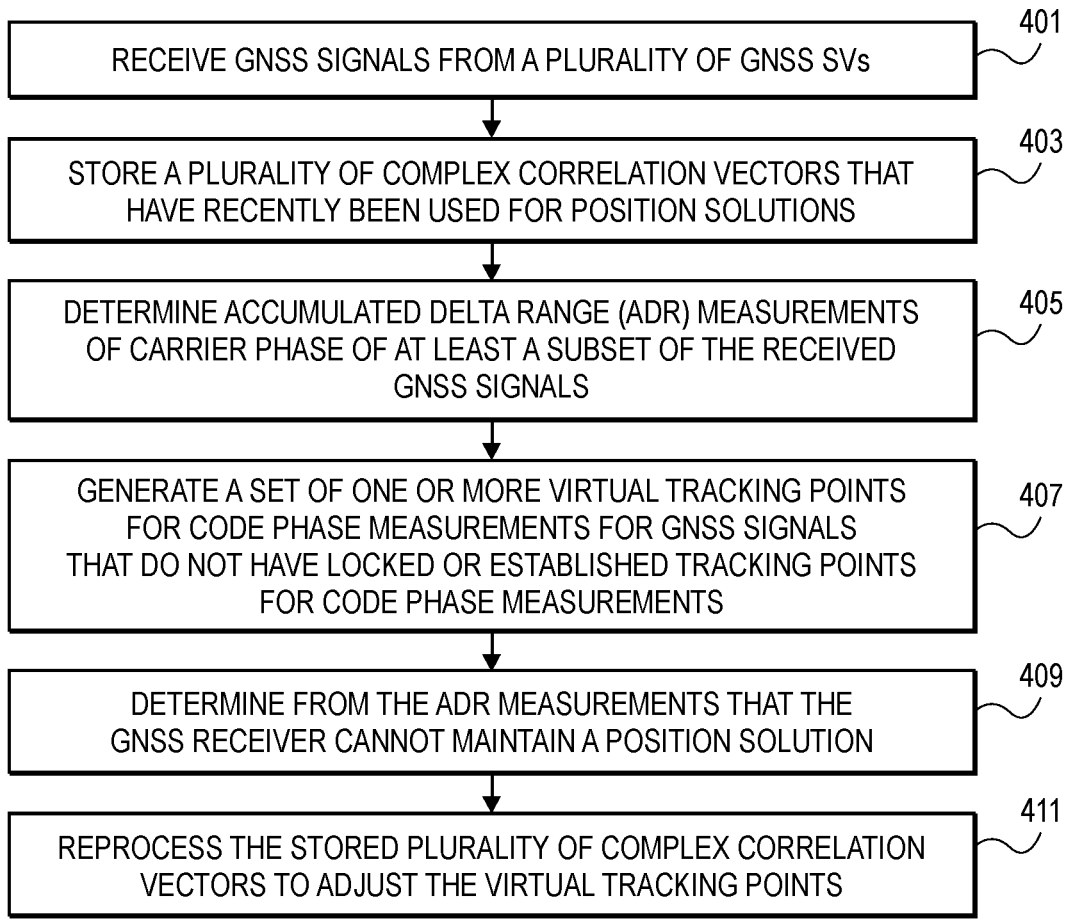
FIG. 9 is a flowchart that shows a method for reprocessing stored correlation vectors according to one embodiment.

FIG. 9 shows another aspect of this disclosure which can be used to adjust virtual tracking points and these adjusted virtual tracking points can assist in maintaining additional signals in a CIR. In this aspect, stored complex correlation vectors that have recently been used to compute position solutions are reprocessed when accumulated delta range (ADR) measurements of carrier phase indicate that a position solution cannot be maintained. These reprocessed complex correlation vectors can then provide the adjusted virtual tracking points going forward in time. The method shown in FIG. 9 can be used in conjunction with the method shown in FIG. 8 to increase sensitivity so that, for example, CIRs include a plurality of NLOS GNSS signals (thereby improving pattern matching operations). As described herein, the addition of weak signals in the CIR can improve pattern matching operations. In operation 401 in FIG. 9, a GNSS receiver can receive GNSS signals from a plurality of GNSS SVs. The GNSS receiver can then process those received GNSS signals to derive complex correlation vectors that can be used to produce position solutions, and these complex correlation vectors can be stored, in operation 403, in the GNSS receiver; in one embodiment, the GNSS receiver can use a buffer (e.g., a circular buffer) that stores a limited number of the most recent complex correlation vectors that were selected for use and used to compute position solutions (and discard correlation vectors that were not selected for use and were not used to compute position solutions). Concurrently with operation 403, the GNSS can determine, in operation 405, accumulated delta range measurements of carrier phase of at least a subset of the GNSS signals; the subset may be the set of GNSS signals that were used to create the correlation vectors that were used to compute position solutions. In operation 407, the GNSS receiver can, using the ADR measurements, generate a set of one or more virtual tracking points for code phase measurements of GNSS signals that do not have locked or established tracking points for code phase measurements. It is these virtual tracking points that will be adjusted later in this method. In operation 409, the GNSS receiver can determine, from the ADR measurements (e.g., they are no longer consistent over time) that the GNSS receiver may not be able to maintain a position solution. In response to the determination that the GNSS receiver may not be able to maintain a position solution, the GNSS receiver, in operation 411 can reprocess the stored complex correlation vectors (stored in operation 403) to create an adjusted set of virtual tracking points for those GNSS signals that have been using virtual tracking points. In one embodiment, the reprocessing can use an updated Doppler derived from a series, over time, of Doppler measurements for a GNSS signal to reprocess each correlation peak for the GNSS signal in the stored complex correlation vectors corresponding to the GNSS signal. In one embodiment, the updated Doppler can be a weighted average of the series, over time, of Doppler measurements. In one embodiment, the reprocessing can include one of: selecting an output with a highest correlation peak; or interpolating between the two highest peaks in the stored complex correlation vectors. In another embodiment, the reprocessing can use other updated values, such as updated ionosphere corrections, etc.

Another aspect of this disclosure involves the use of superresolution methods or algorithms to extract LOS and NLOS GNSS signals for one or more channels (where each channel is a frequency band of GNSS signals from a particular GNSS SV). These methods or algorithms can be used to generate a channel impulse response (CIR) for each received channel and each such CIR can be matched to pattern match assistance data received from an assistance server (or calculated locally by a client device containing the GNSS receiver). The superresolution methods or algorithms can include the use of MUSIC (Multiple Signal Classification) or root MUSIC methods or algorithms that are known in the art. The pattern match assistance data can include CIR data for every channel expected to be visible to the GNSS receiver (either at its computed position or an estimated or approximate position such as an estimated location prior to a position solution). The methods or algorithms can use modified covariance matrices to construct a combination of such covariance matrices and then process them to yield the CIR for each channel. Further information about such use of superresolution methods and algorithms is provided in the attached appendix. These superresolution methods and algorithms can be used in a client device that includes the GNSS receiver or in one or more assistance servers that are operatively coupled to the client device or in a combination of a client device and one or more assistance servers.

Figure 10A:
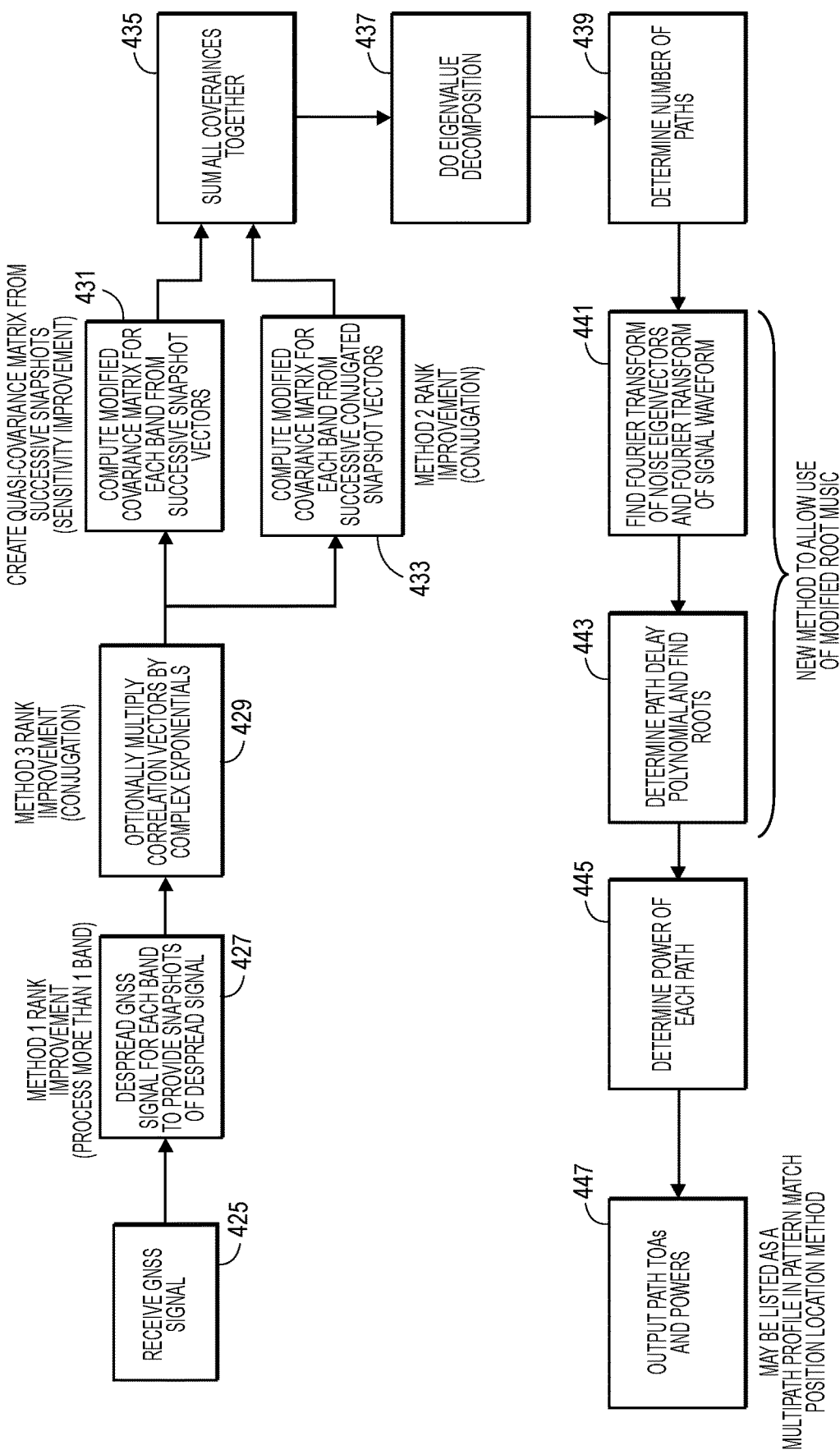
FIG. 10A is a flowchart that shows various methods of using embodiments of superresolution algorithms to generate channel responses (such as TOAs and signal envelope); and these generated channel responses can be used with one or more pattern matching embodiments described herein.
Figure 10B:
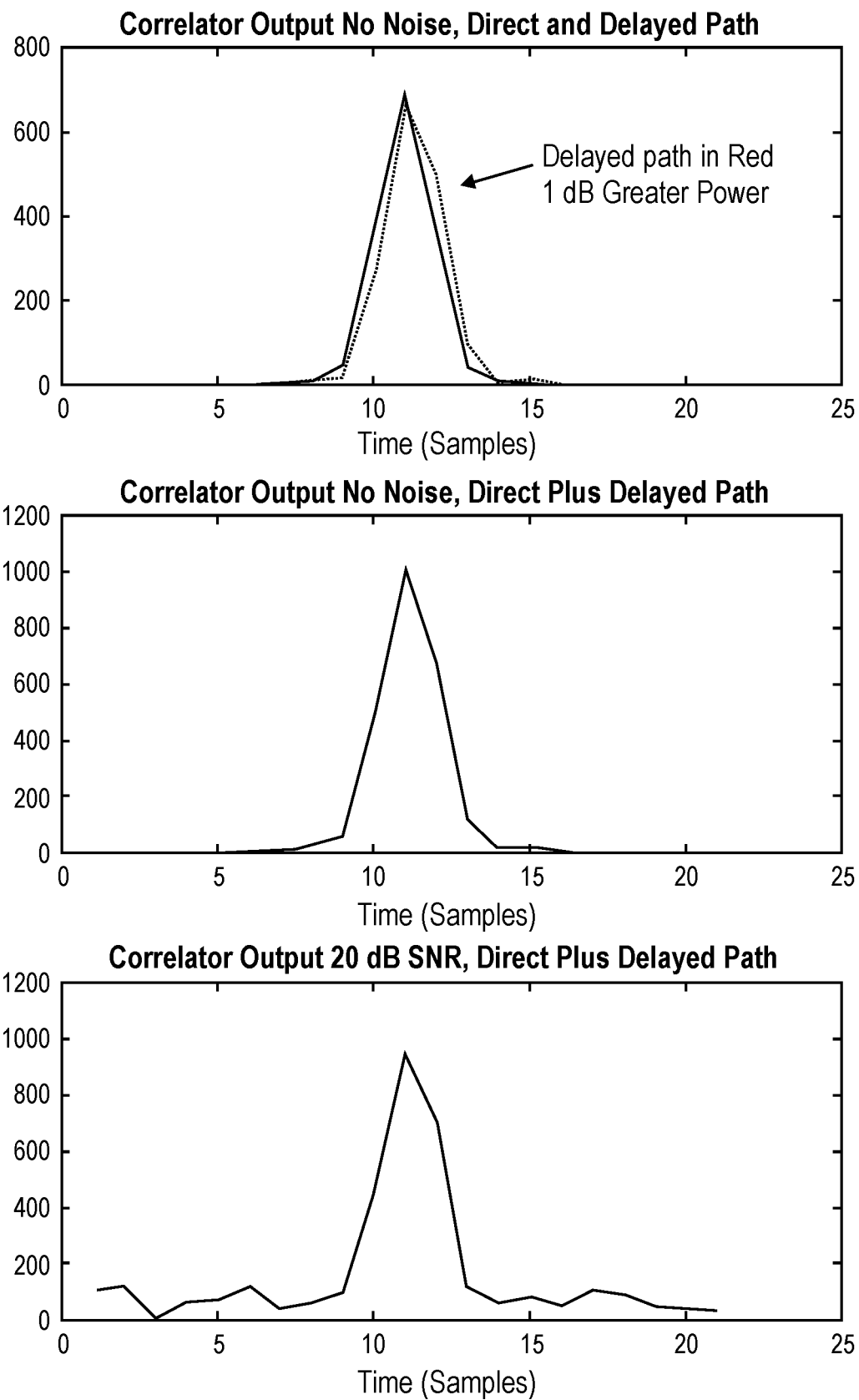
FIG. 10B show time domain envelopes of simulated multipath.
Figure 10C:
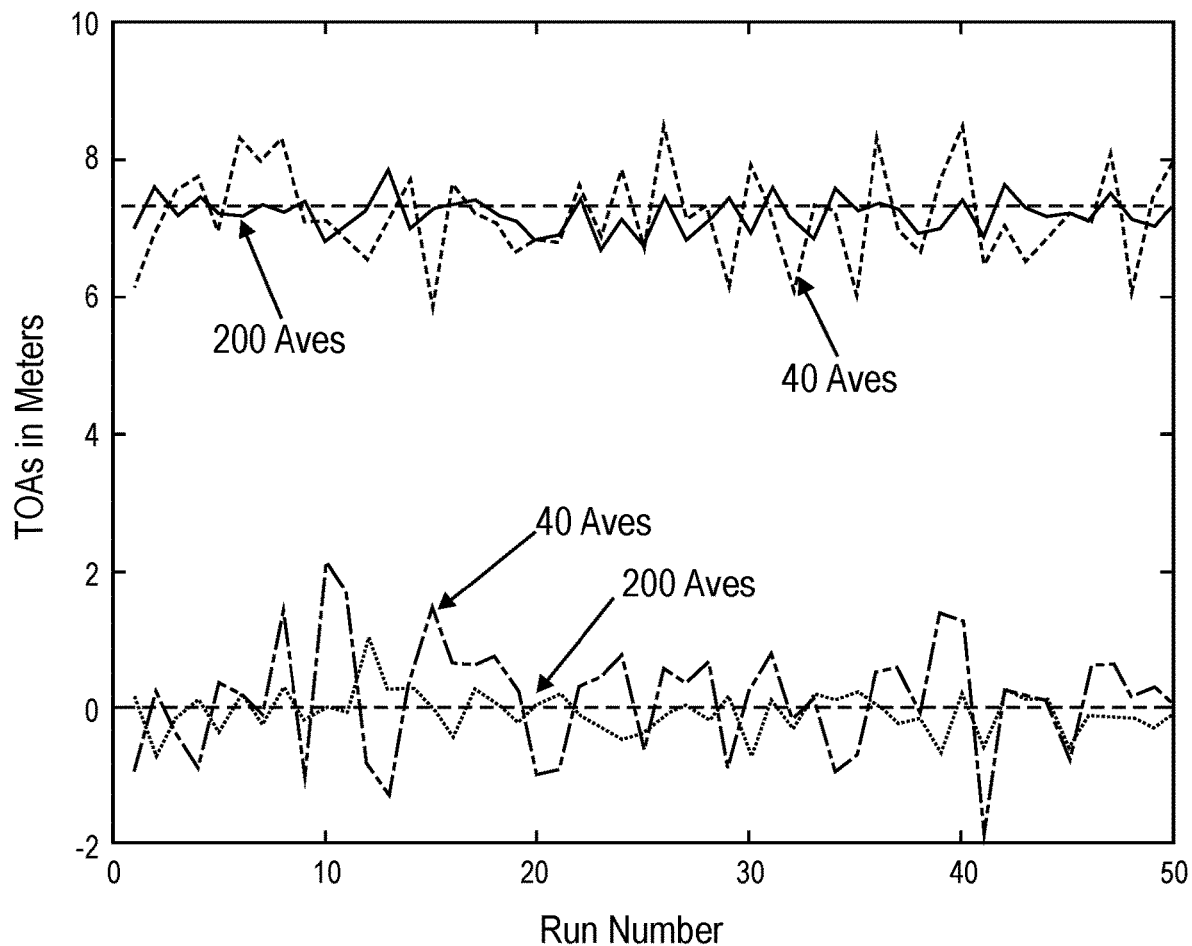
FIG. 10C shows an example of a performance of an embodiment of the superresolution algorithms described herein.
Figure 11A:
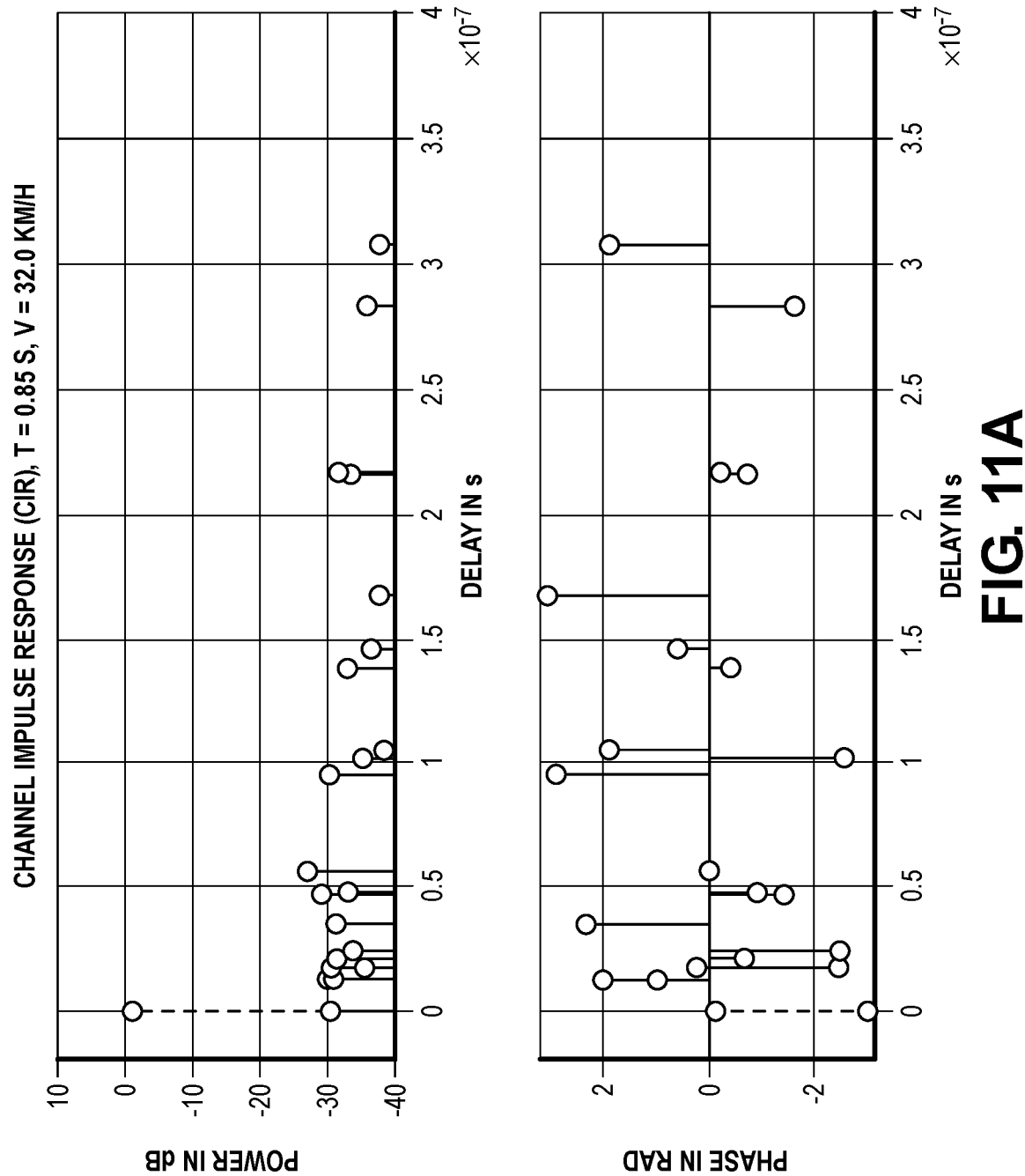
FIGS. 11A-through 11AA are figures that are referred to in the appendix.
Figure 11B:
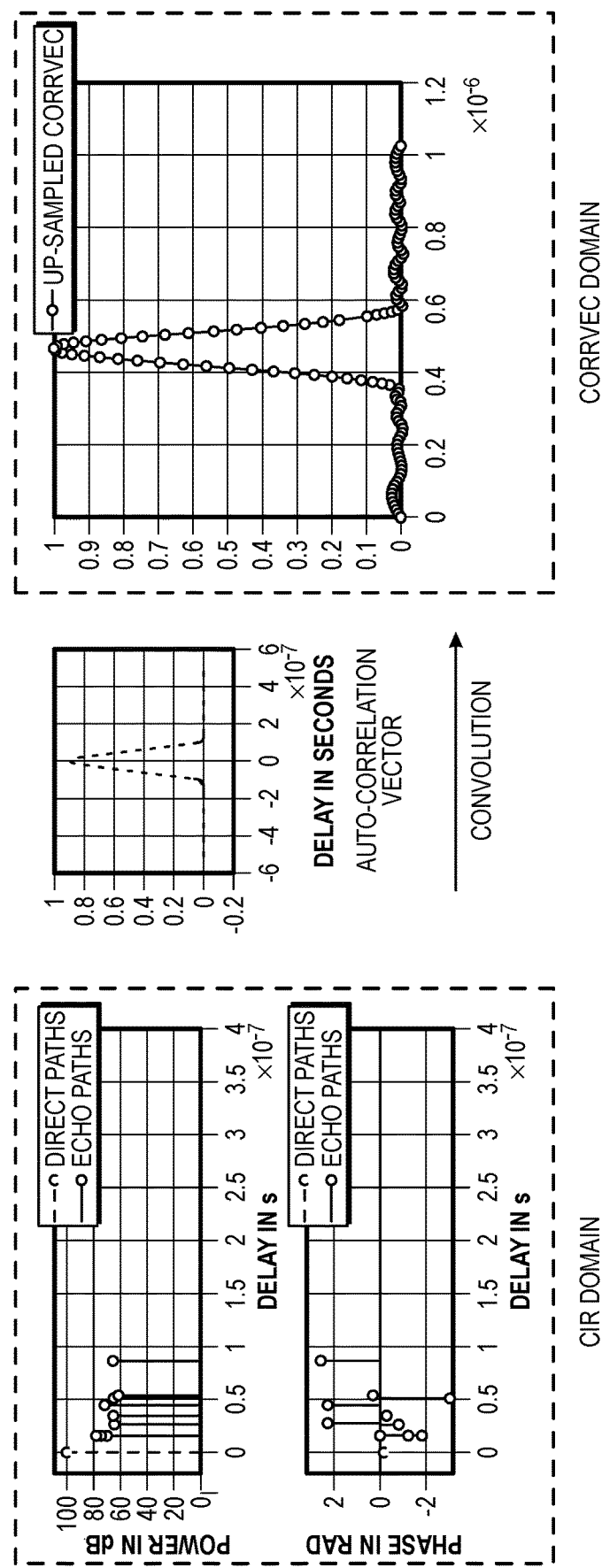
Figure 11C:
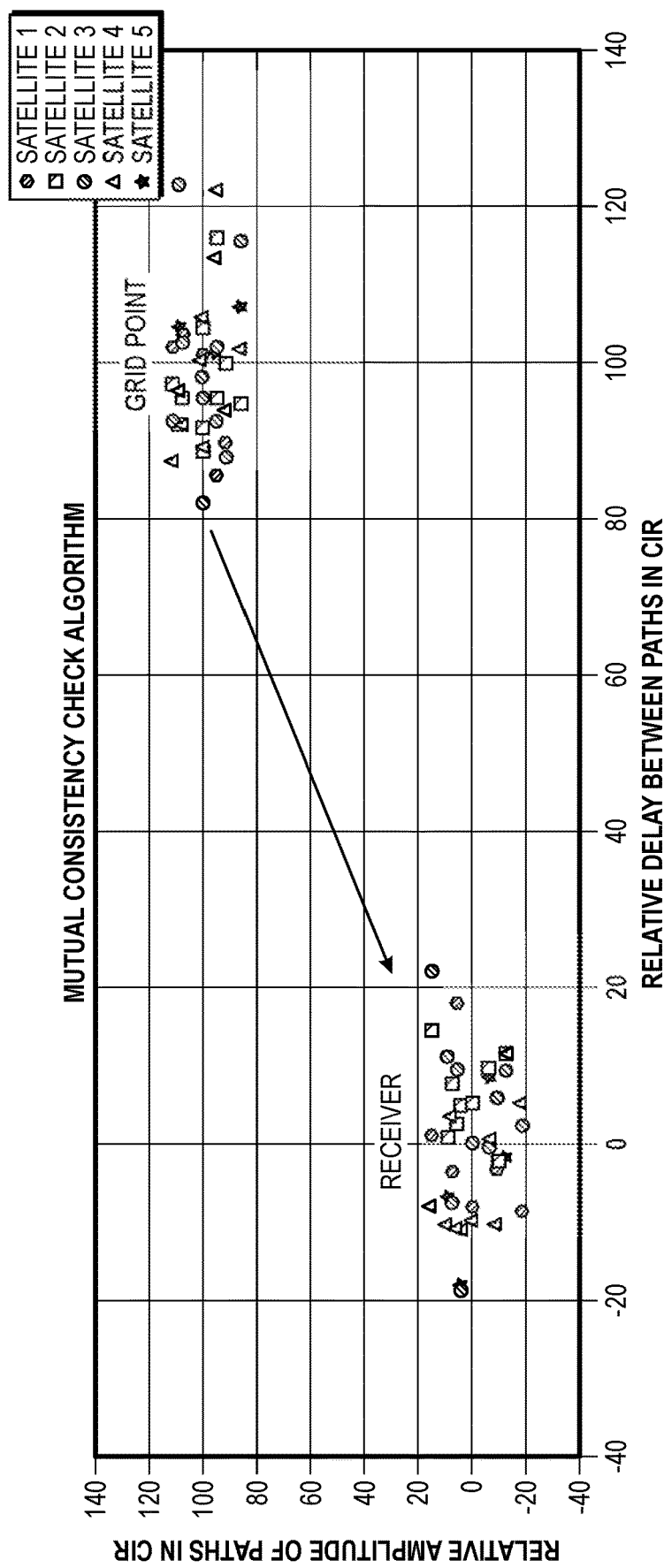
Figure 11D:
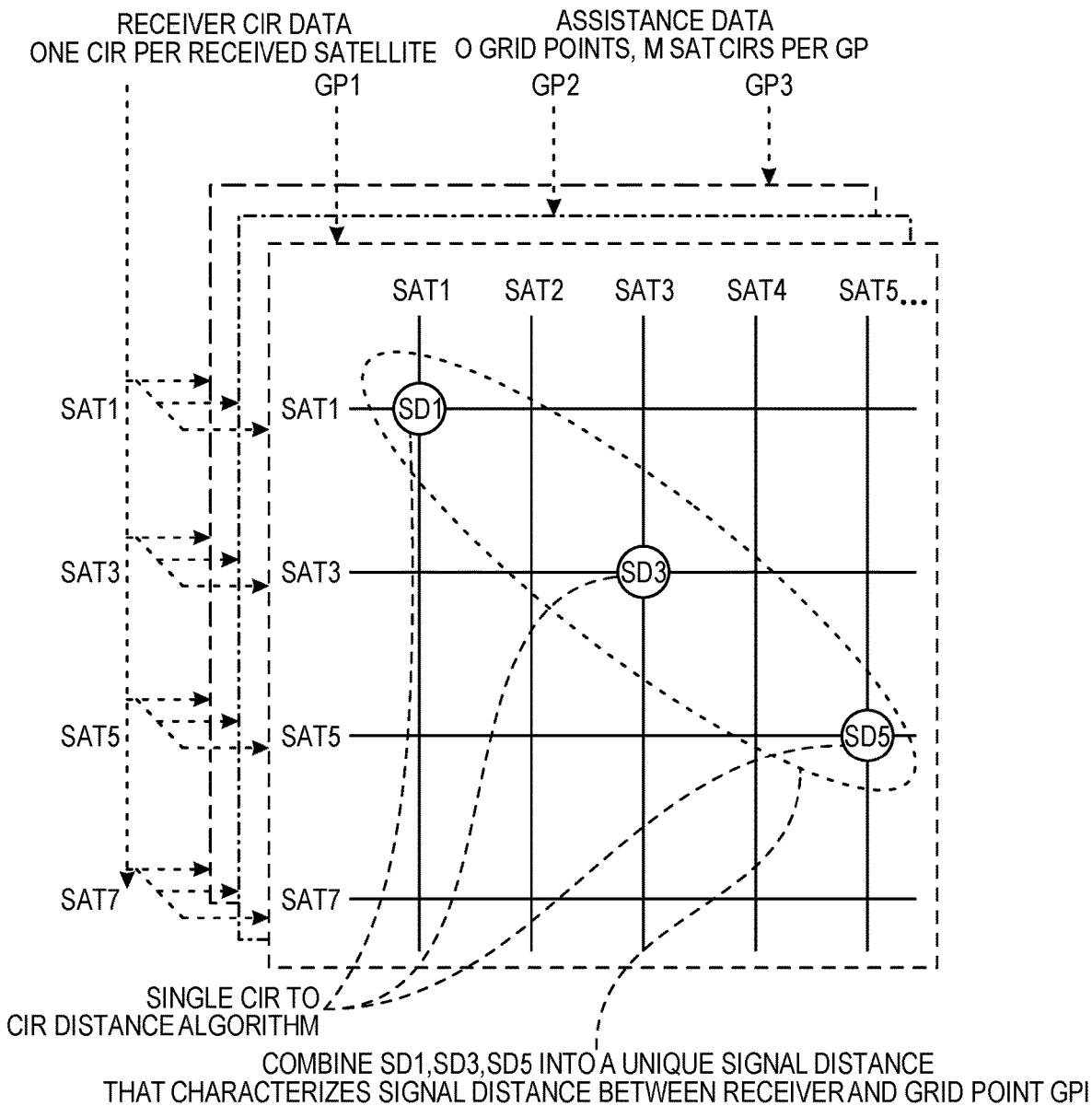
Figure 11E:
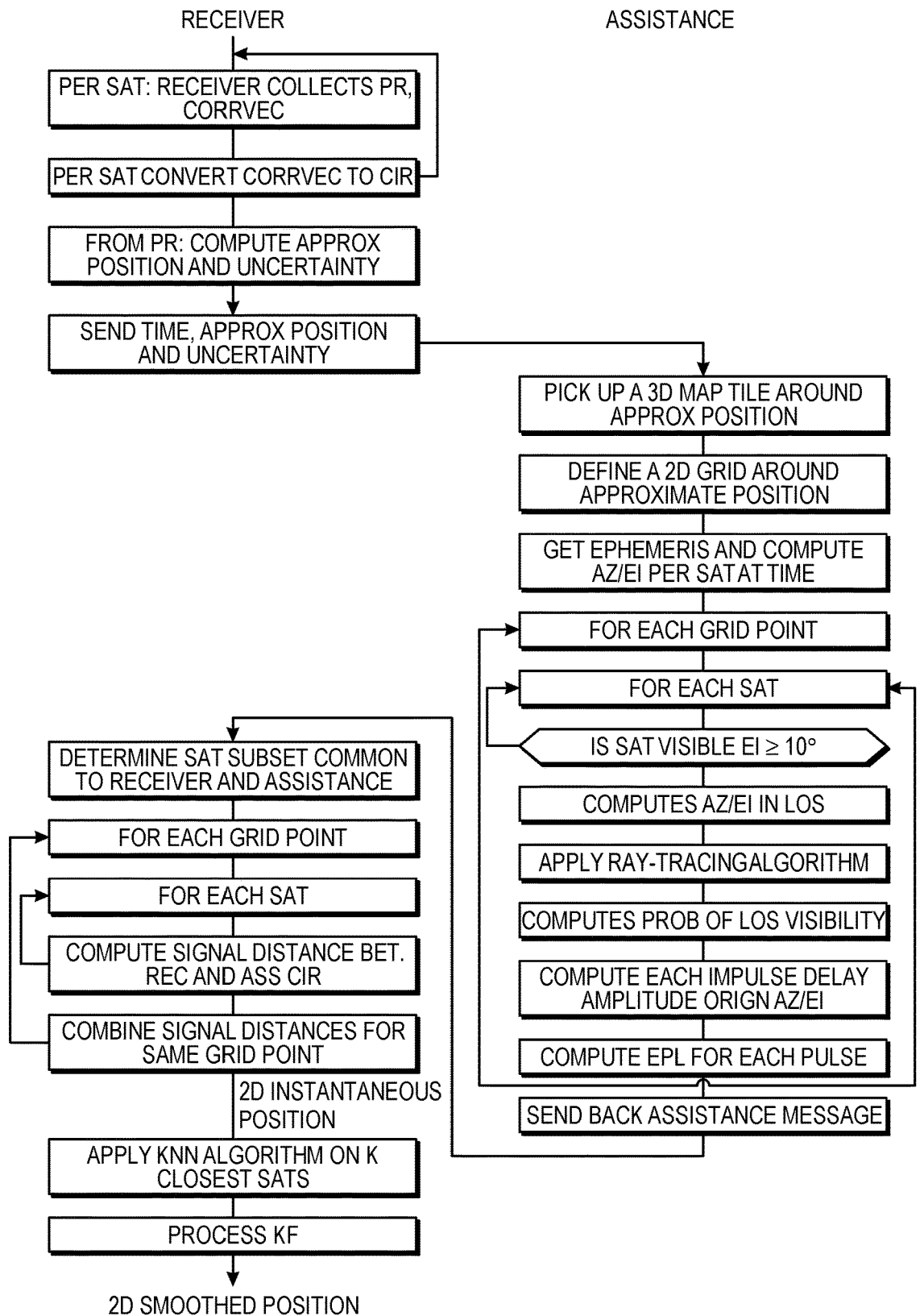
Figure 11F:
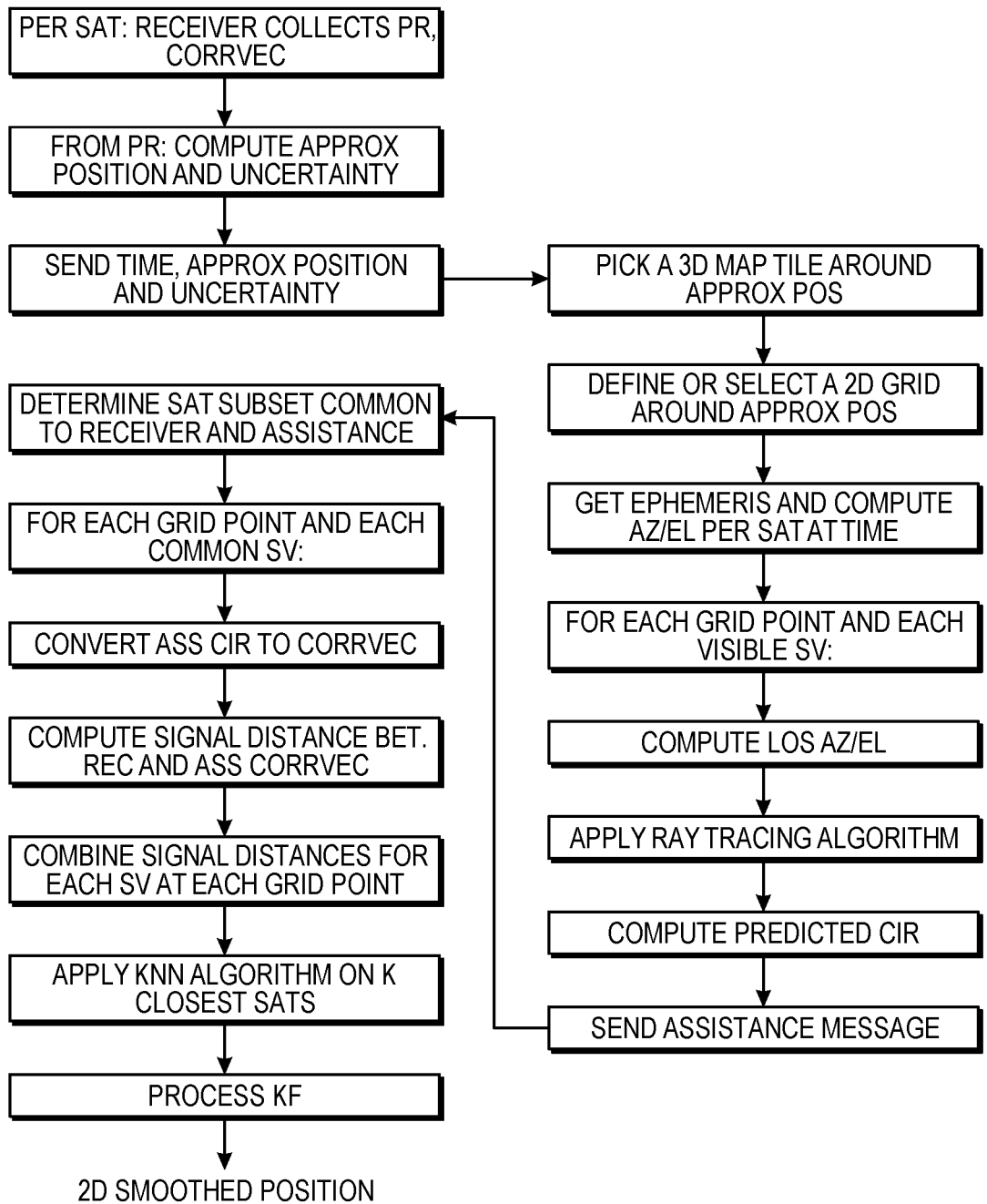
Figure 11G:
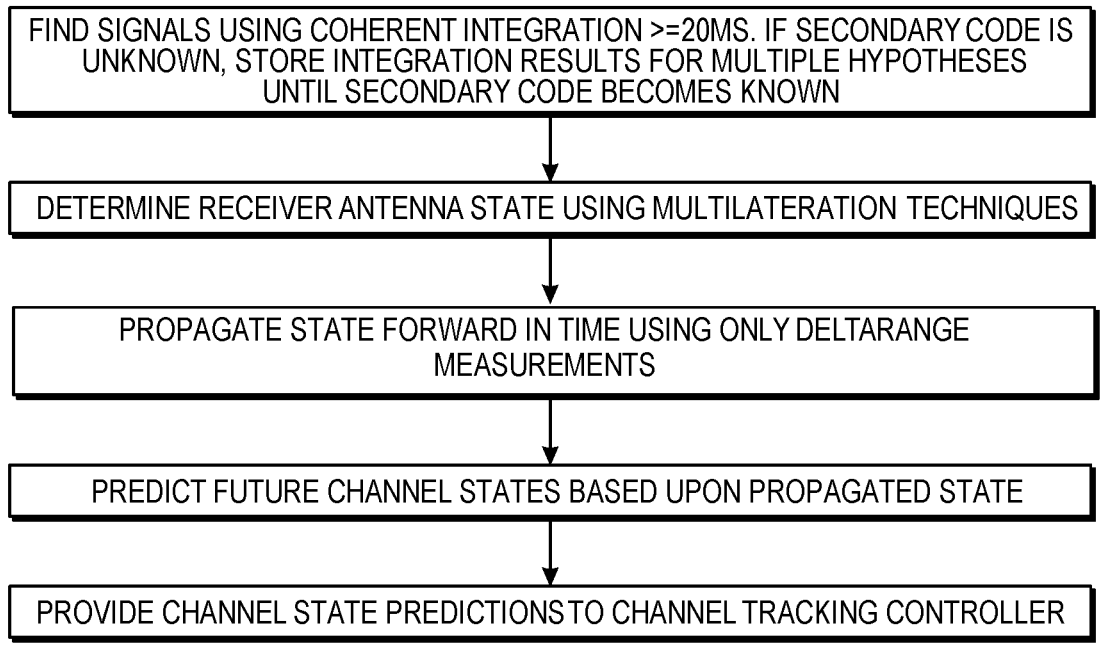
Figure 11H:
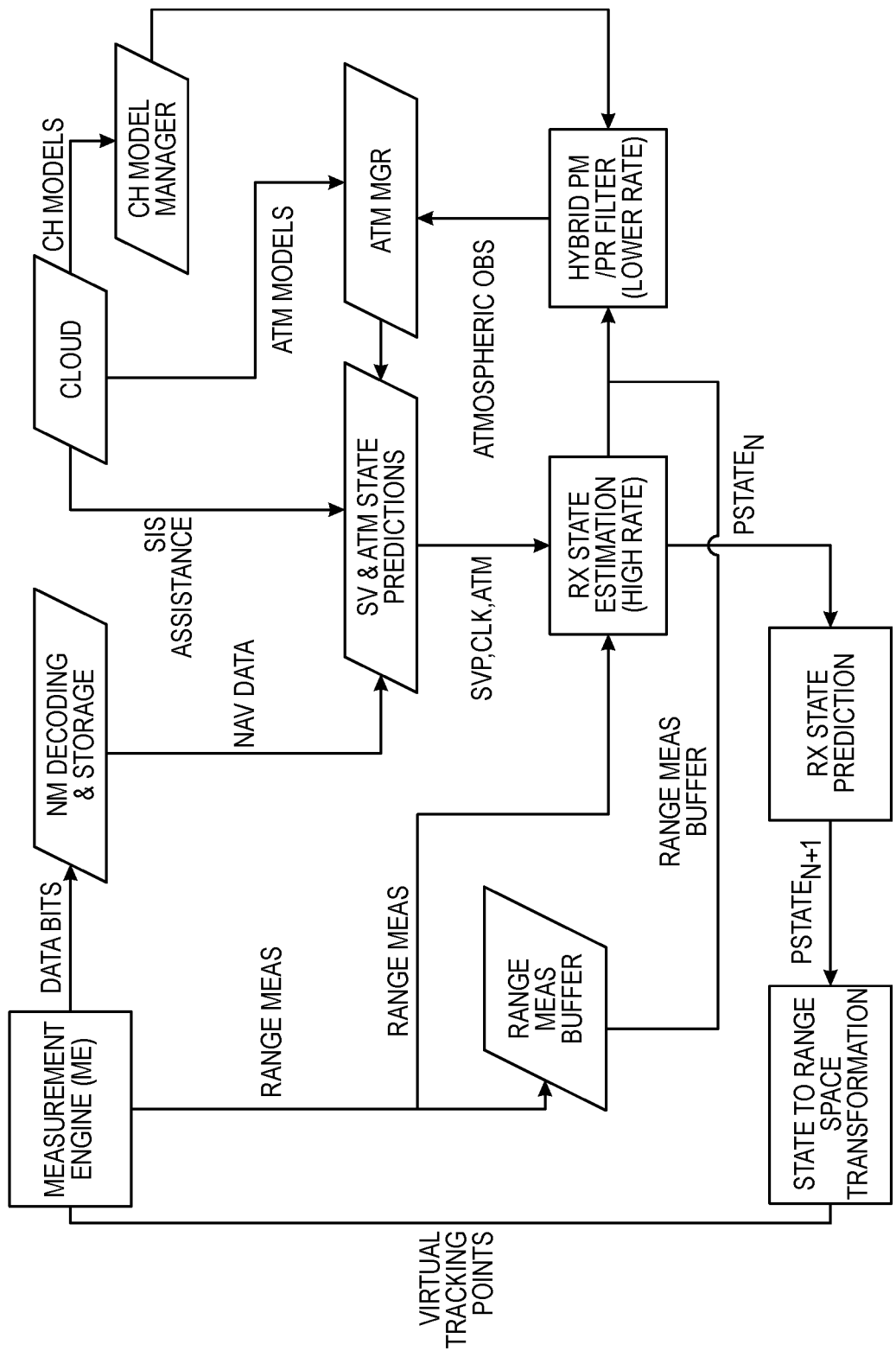
Figure 11I:
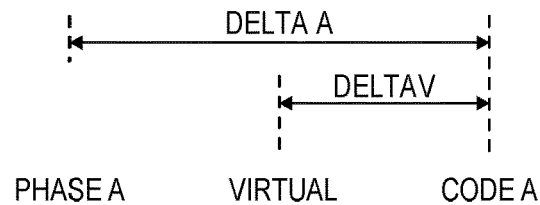
Figure 11J:
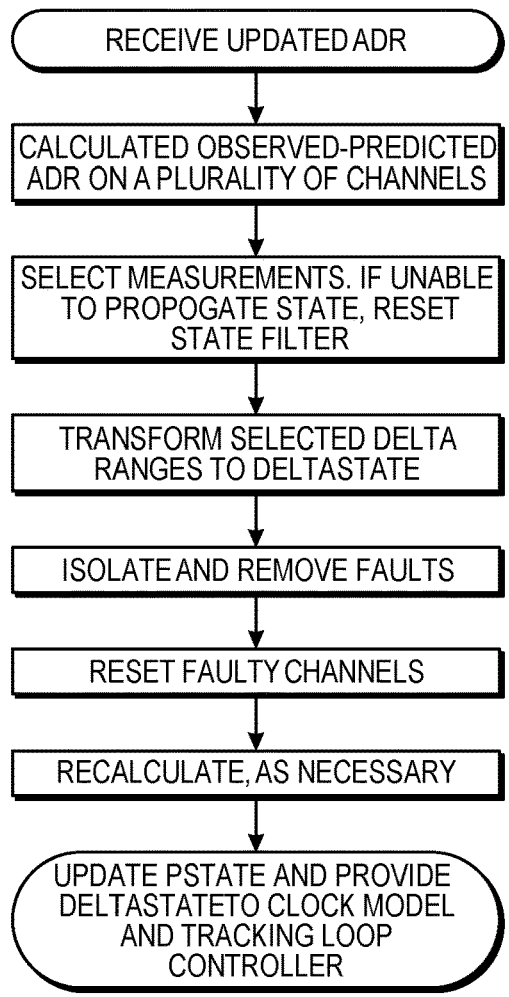
Figure 11K:
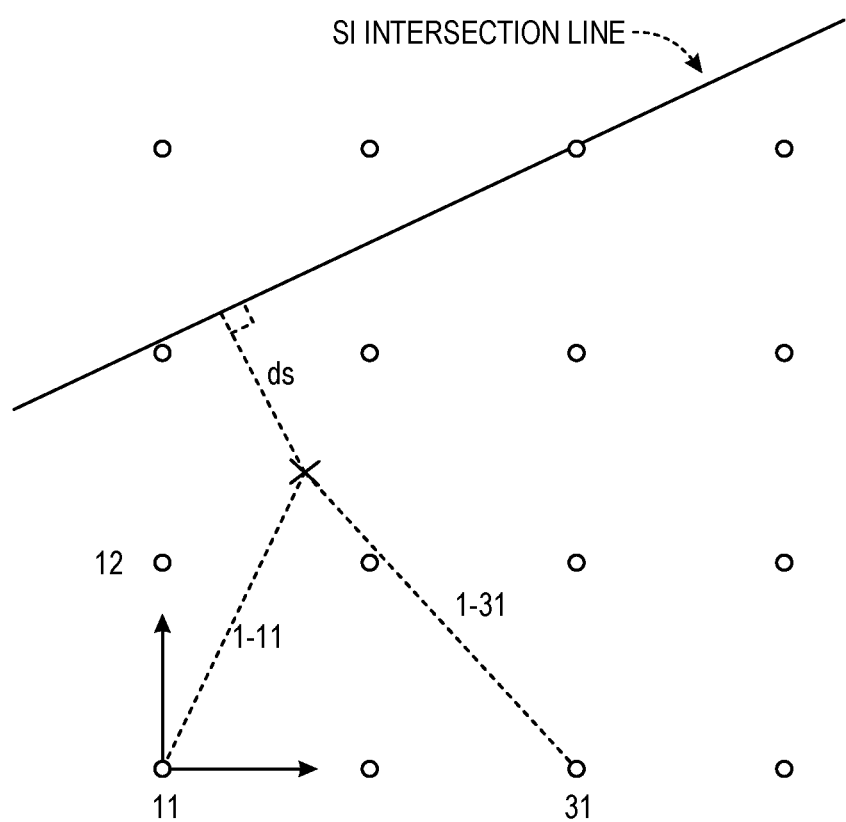
Figure 11M:
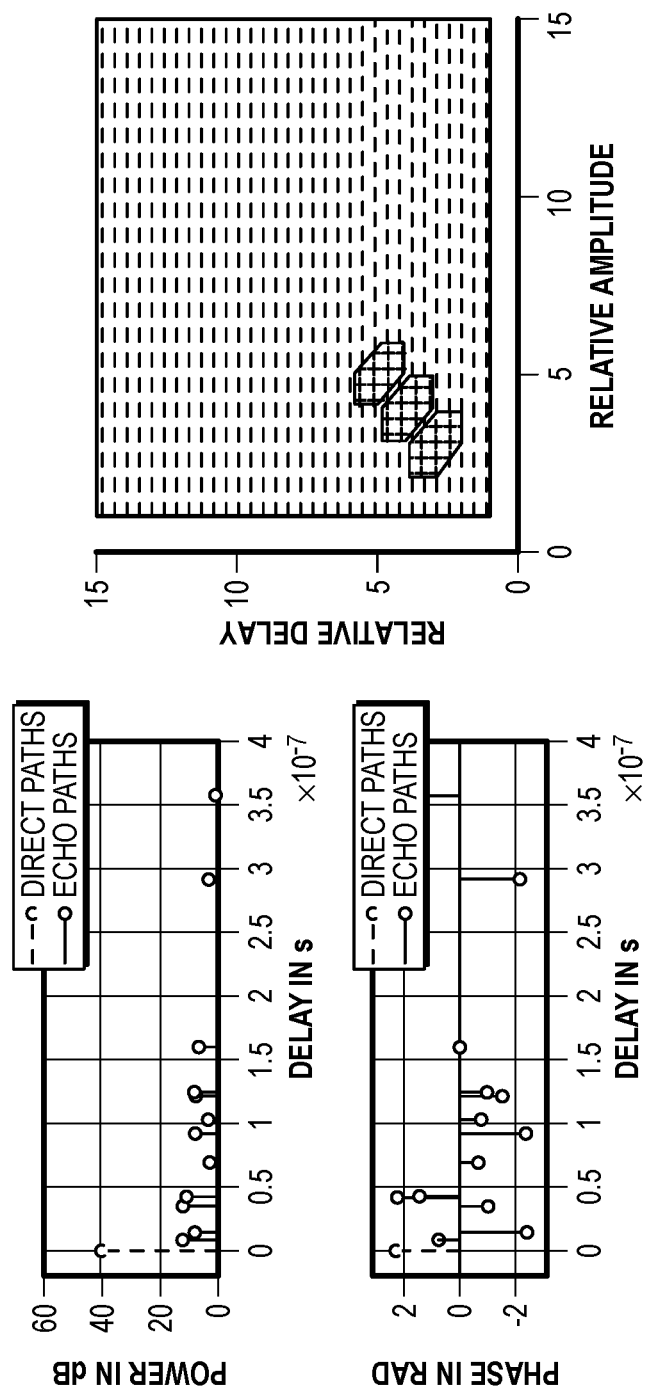
Figure 11N:
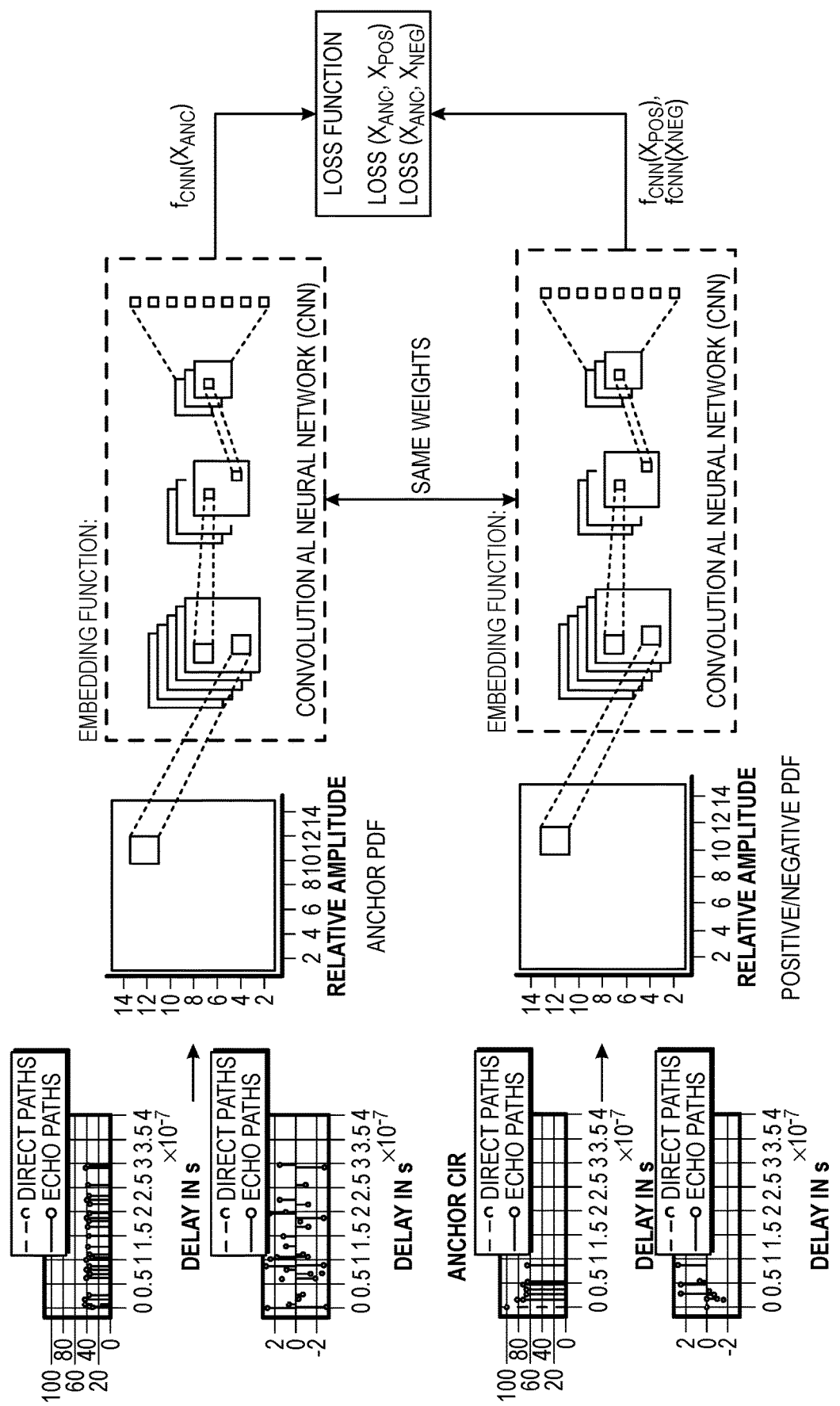
Figure 11O:
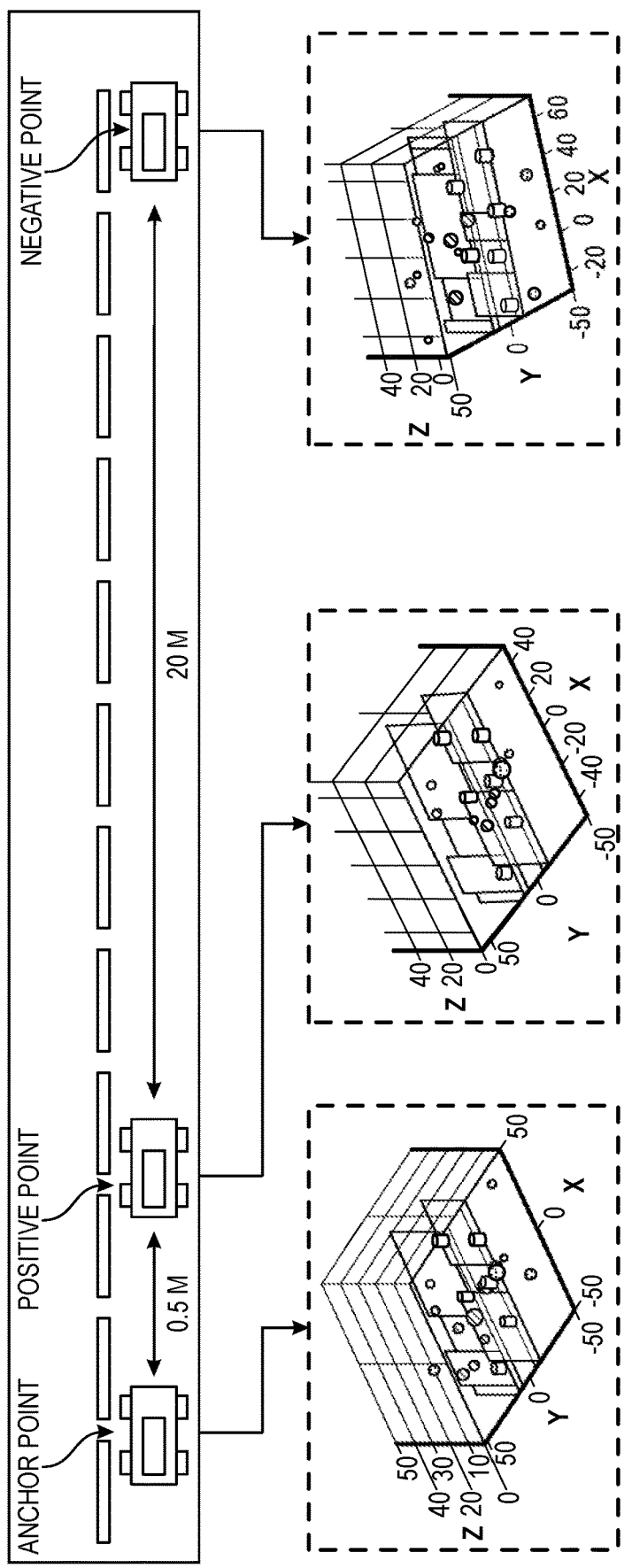
Figure 11P:
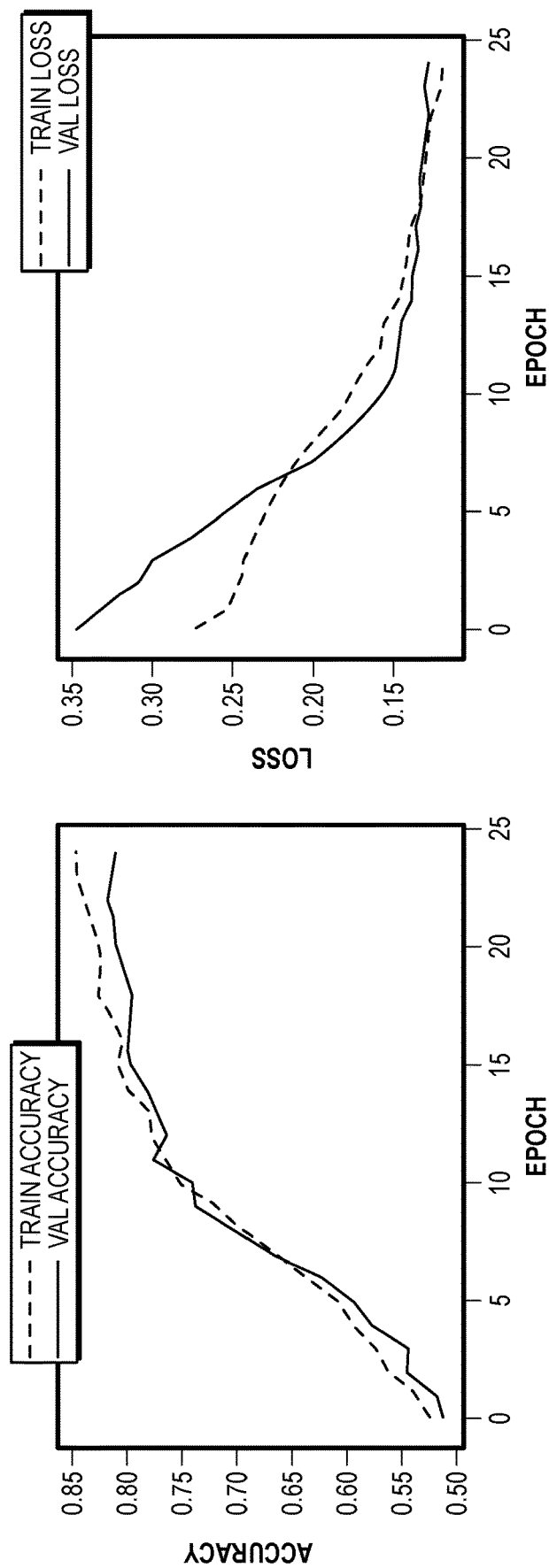
Figure 11Q:
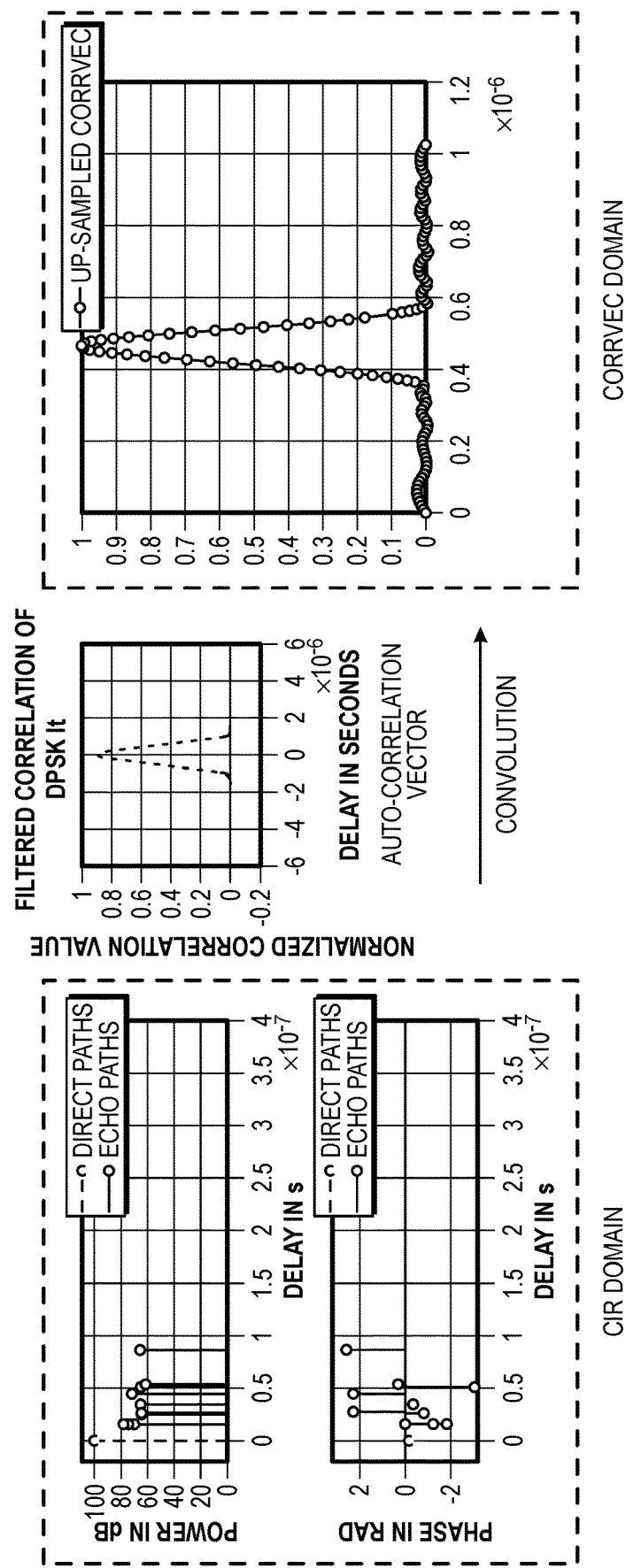
Figure 11R:
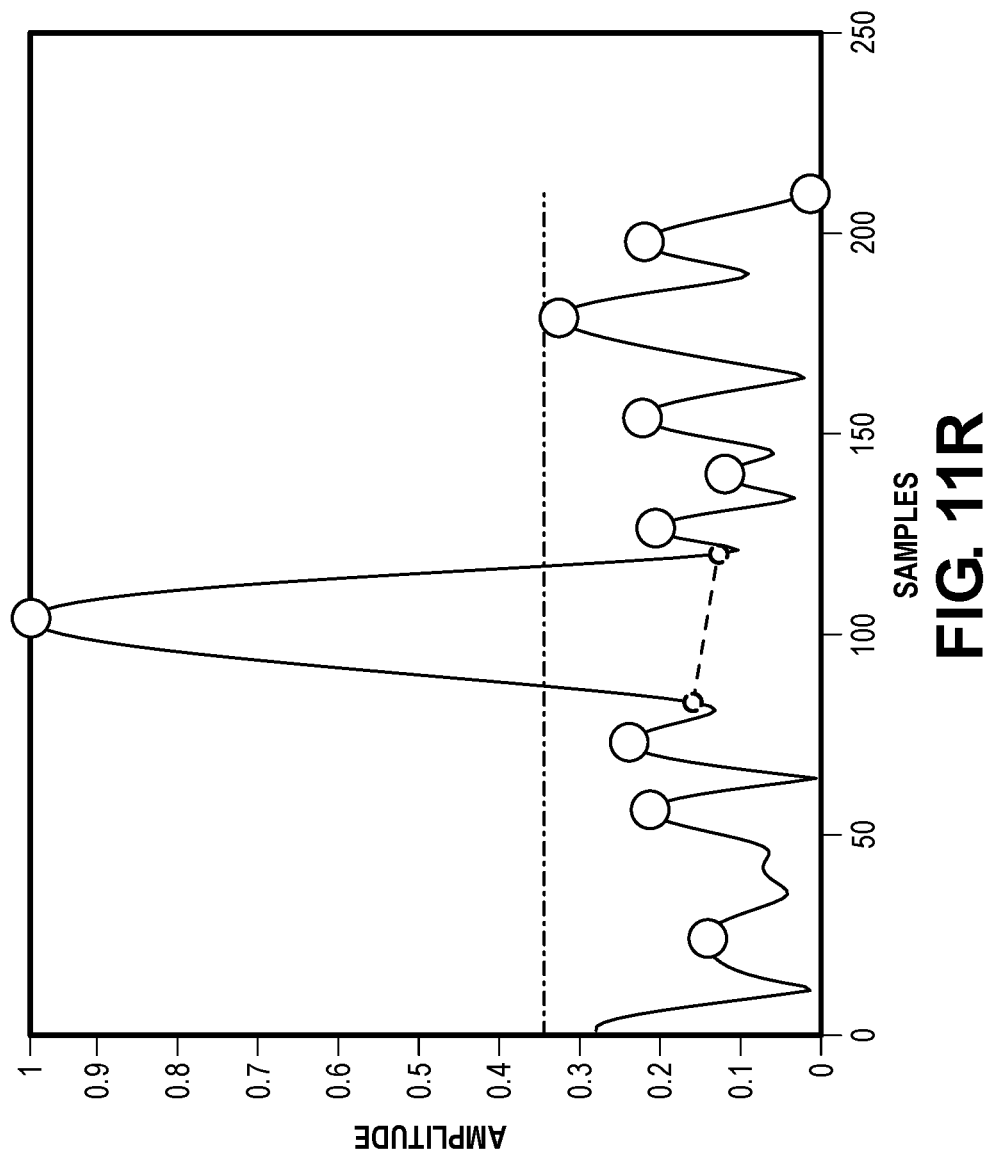
Figure 11S:
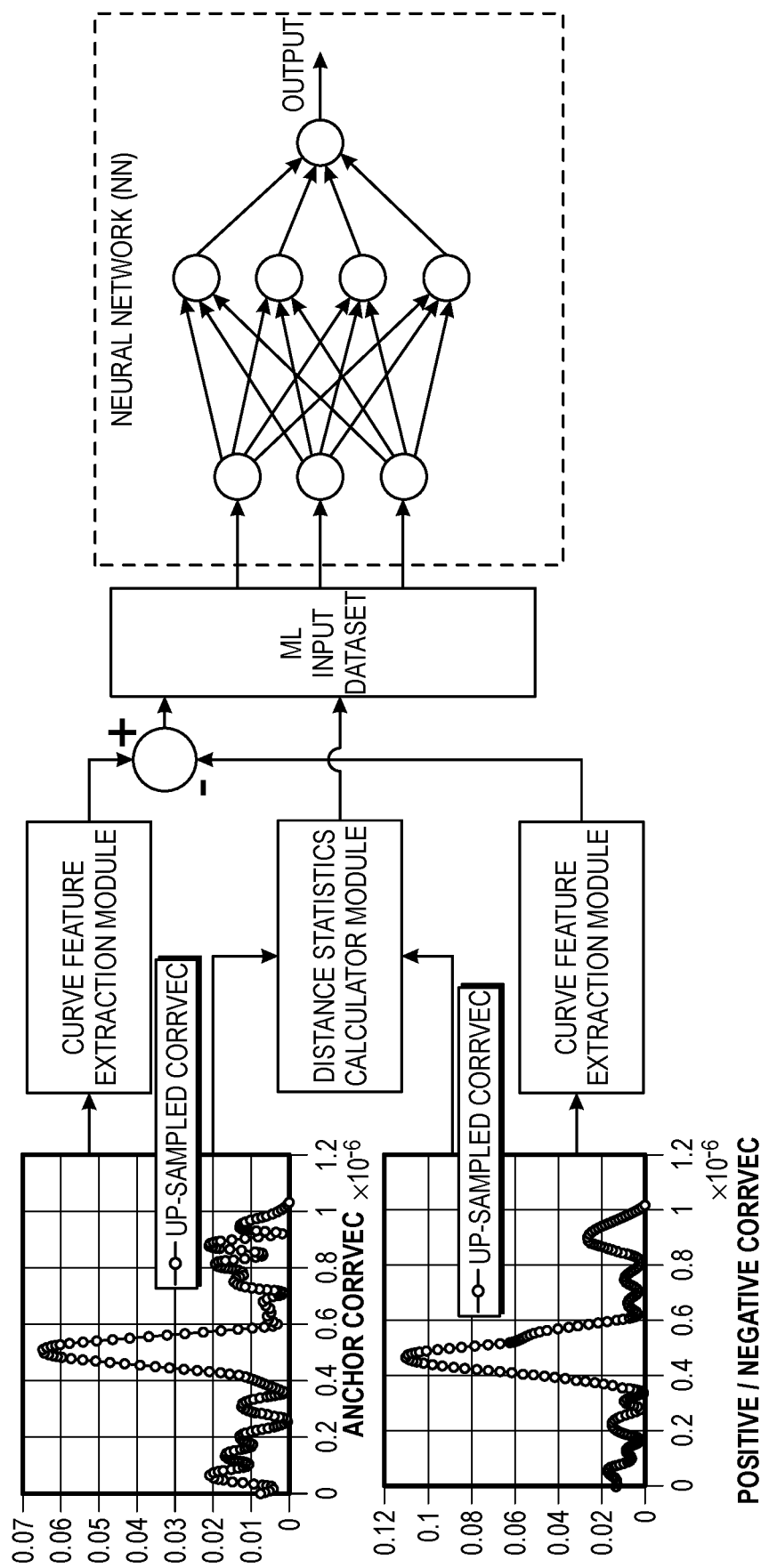
Figure 11T:
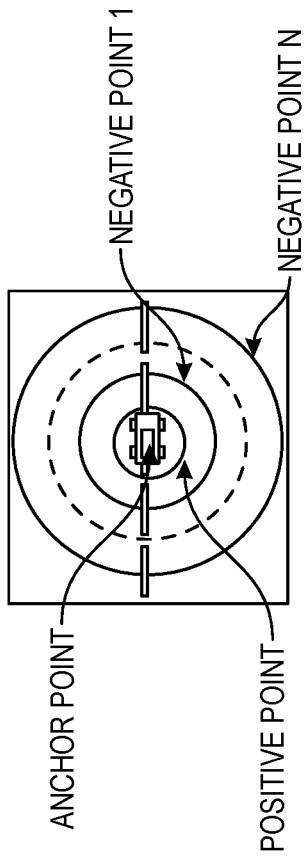
Figure 11U:
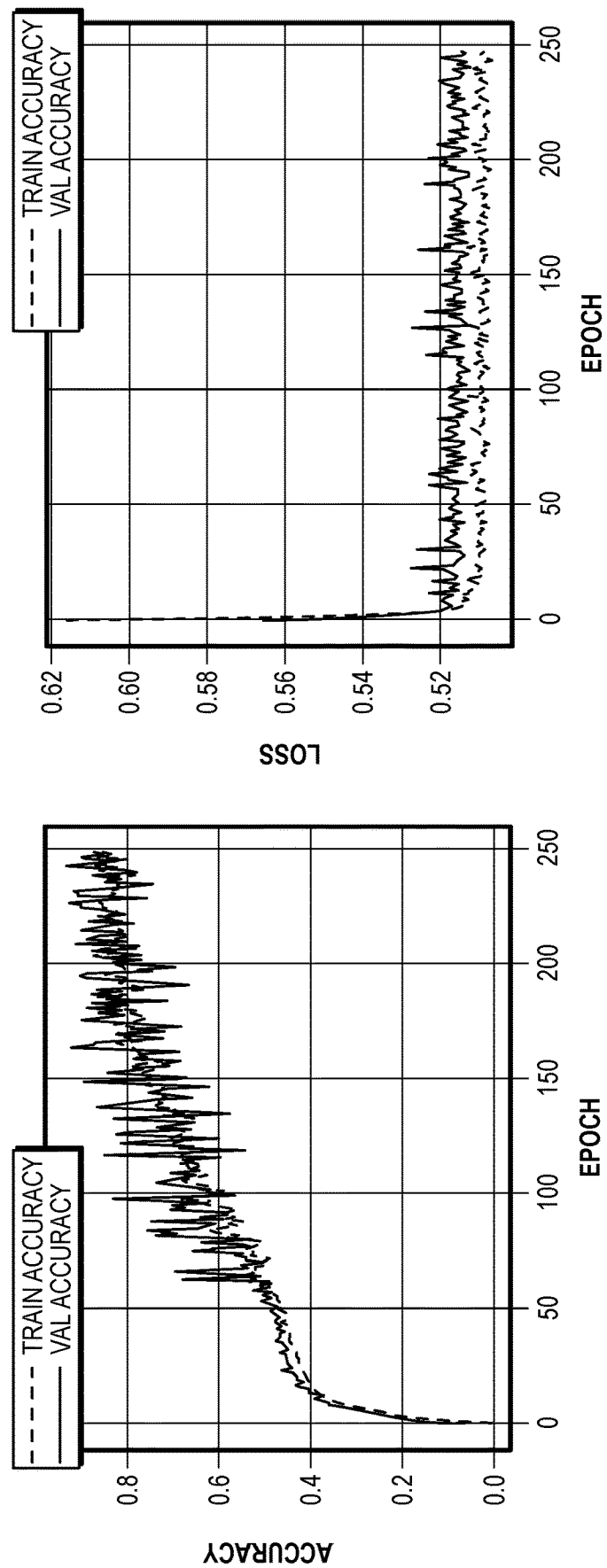
Figure 11W:
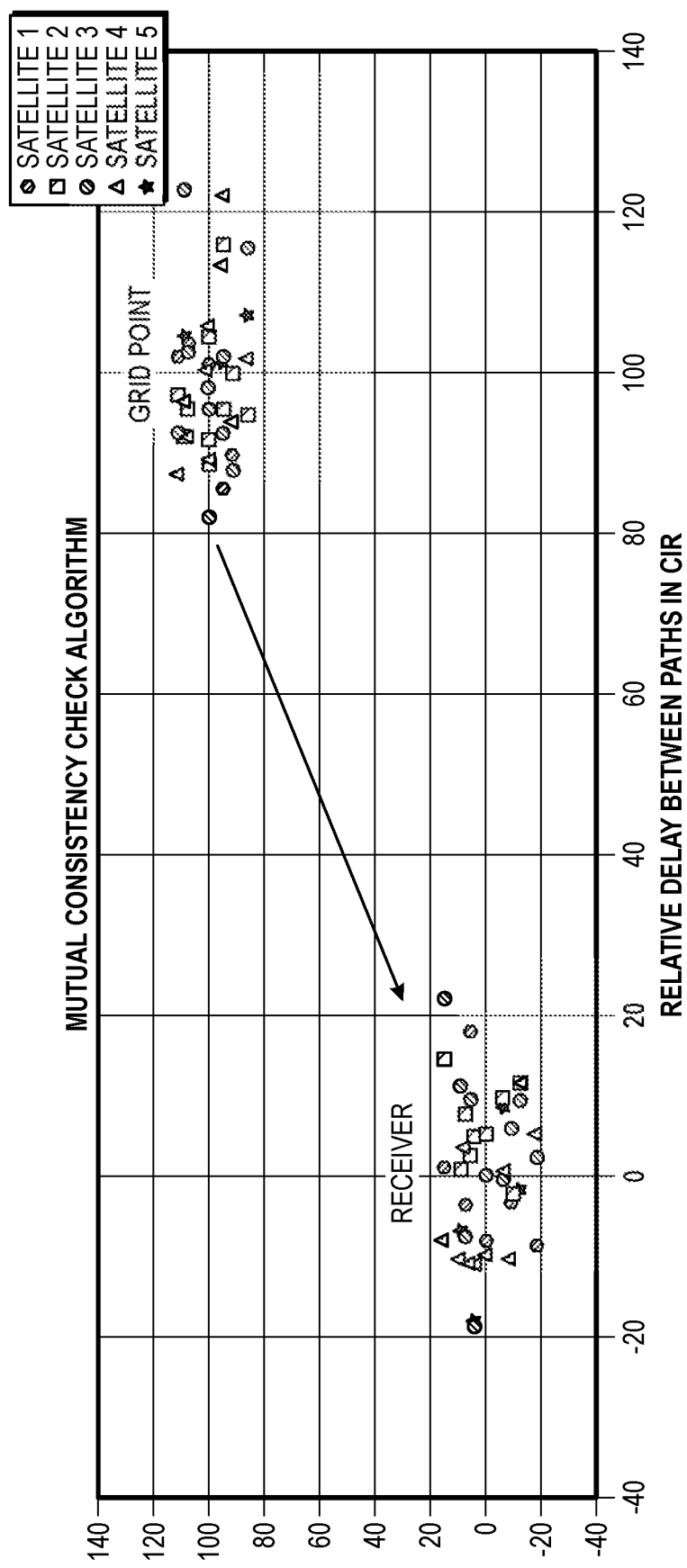
Figure 11X:
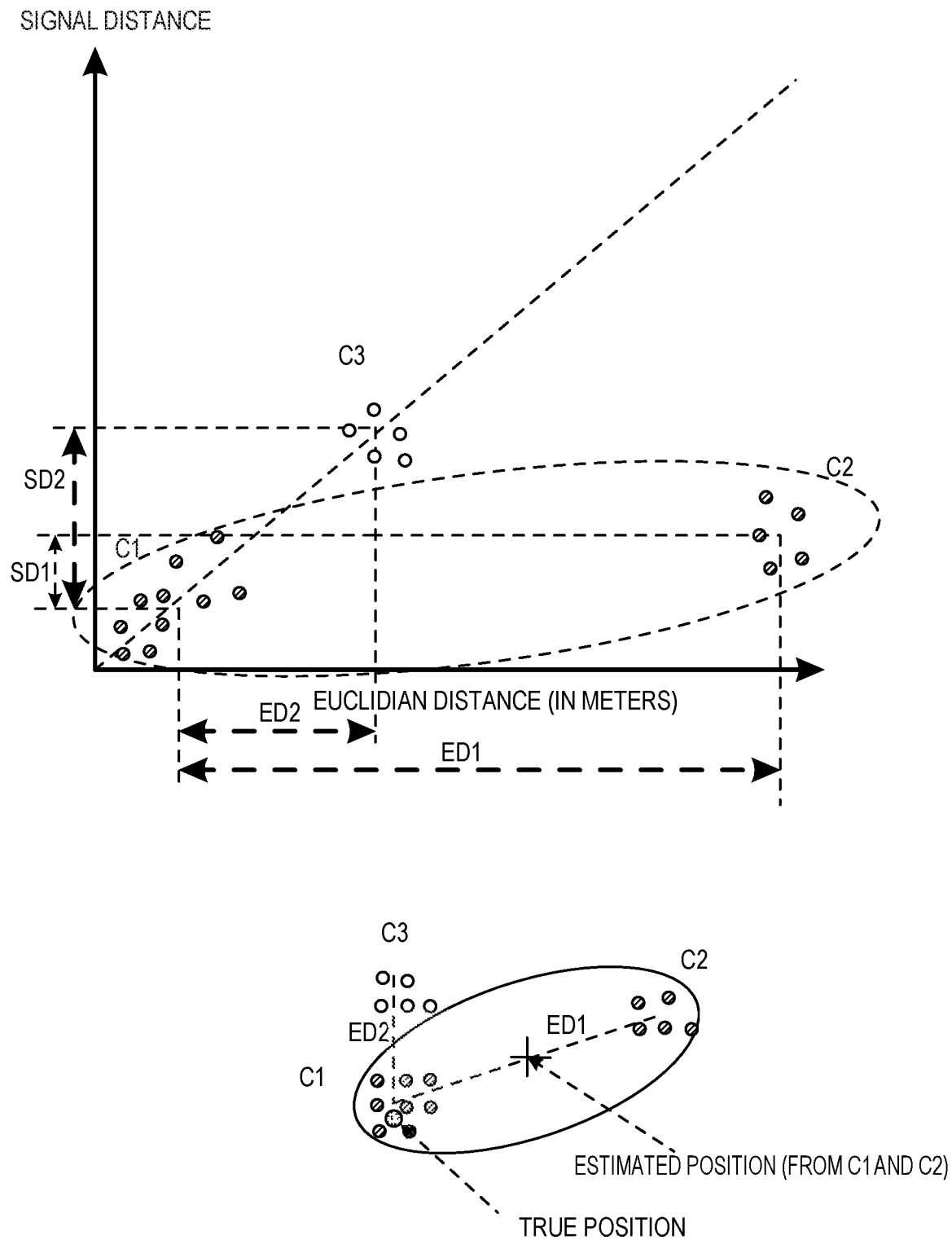
Figure 11Y:
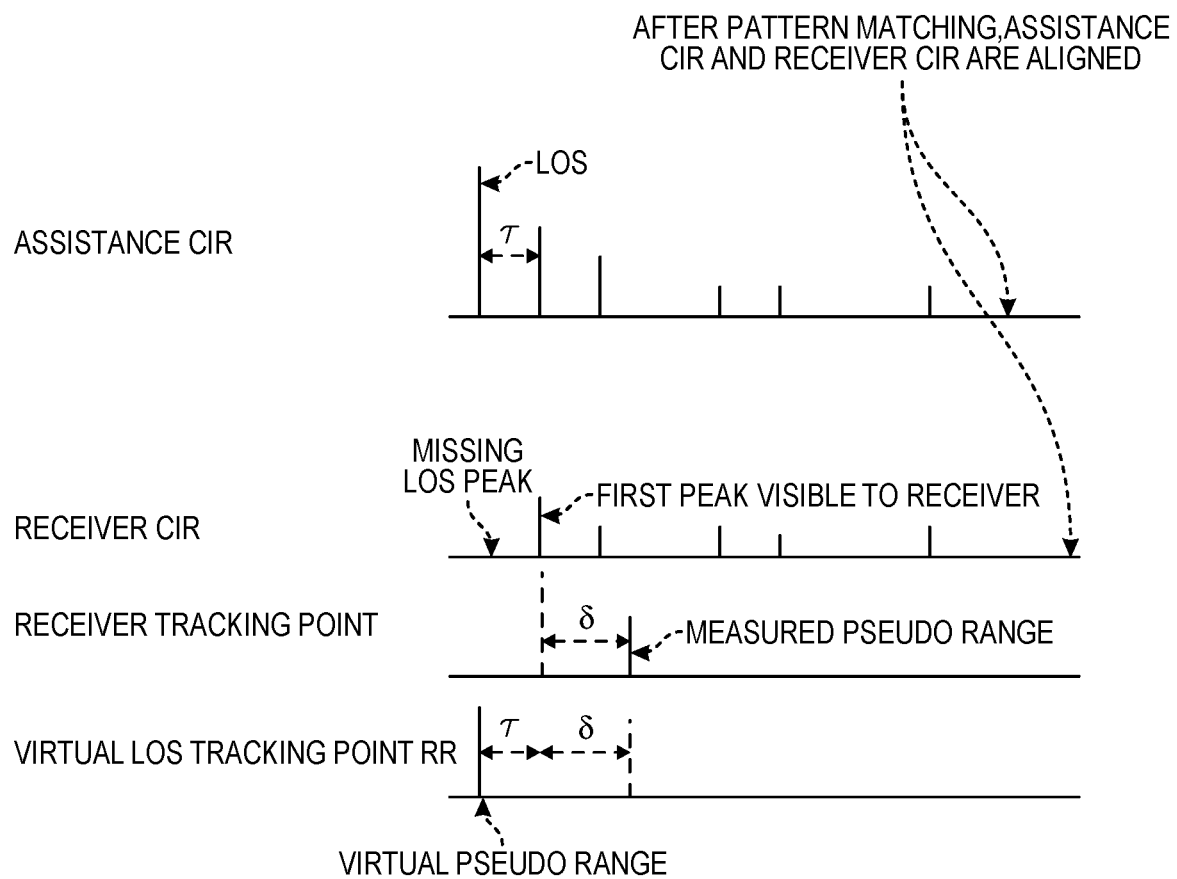
Figure 11Z:
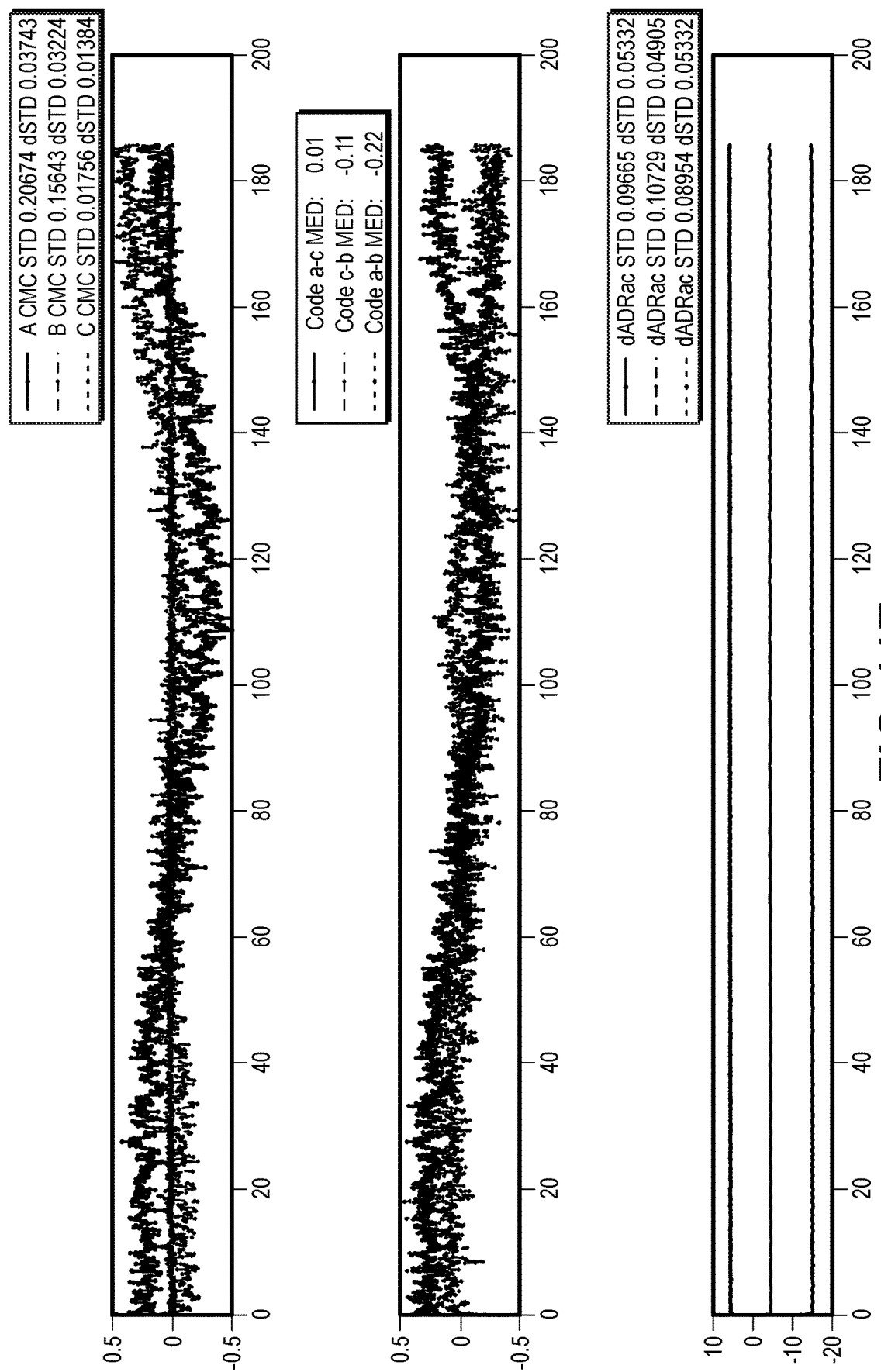
Figure 11Z:
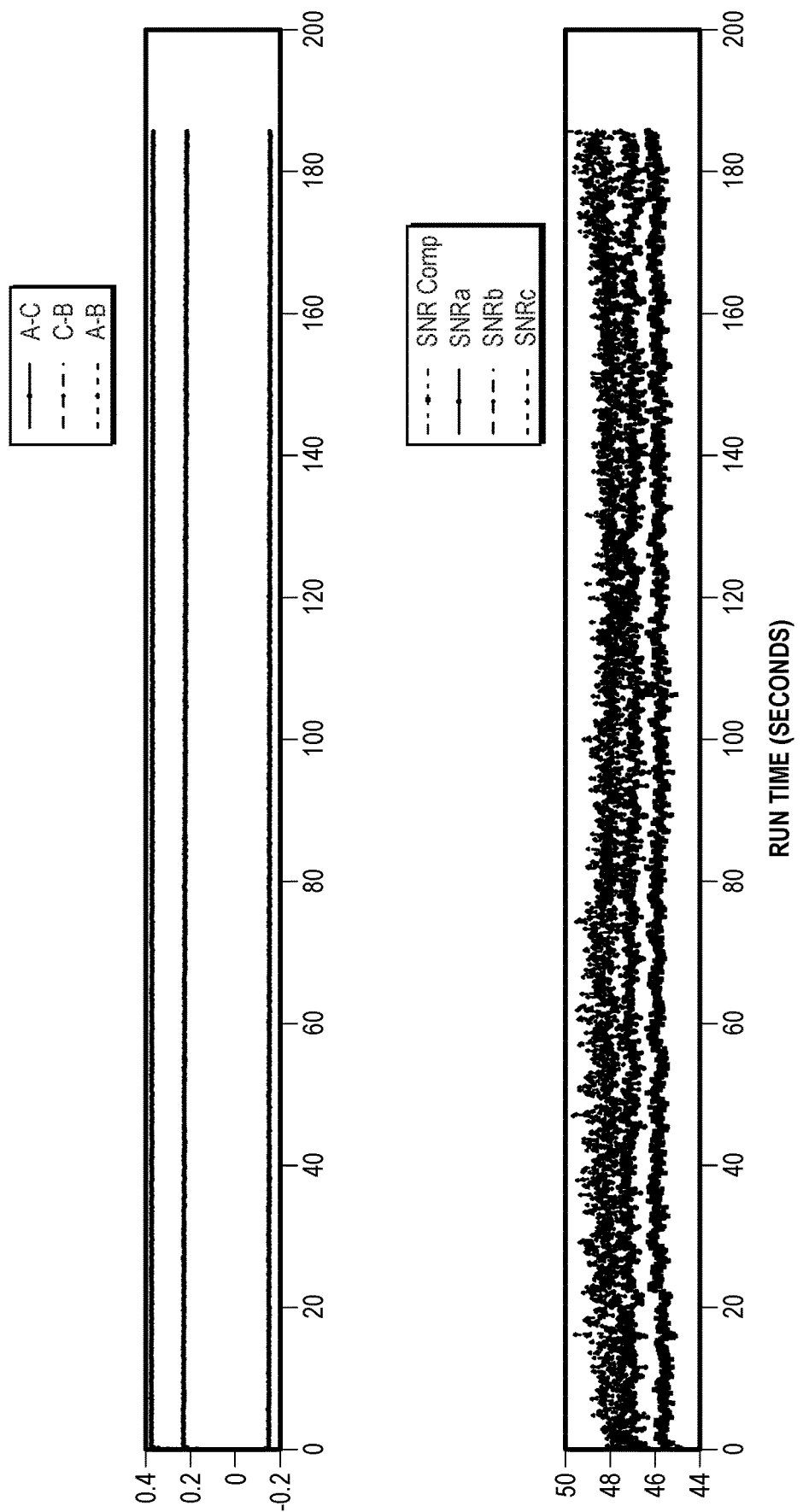
Figure 11A:
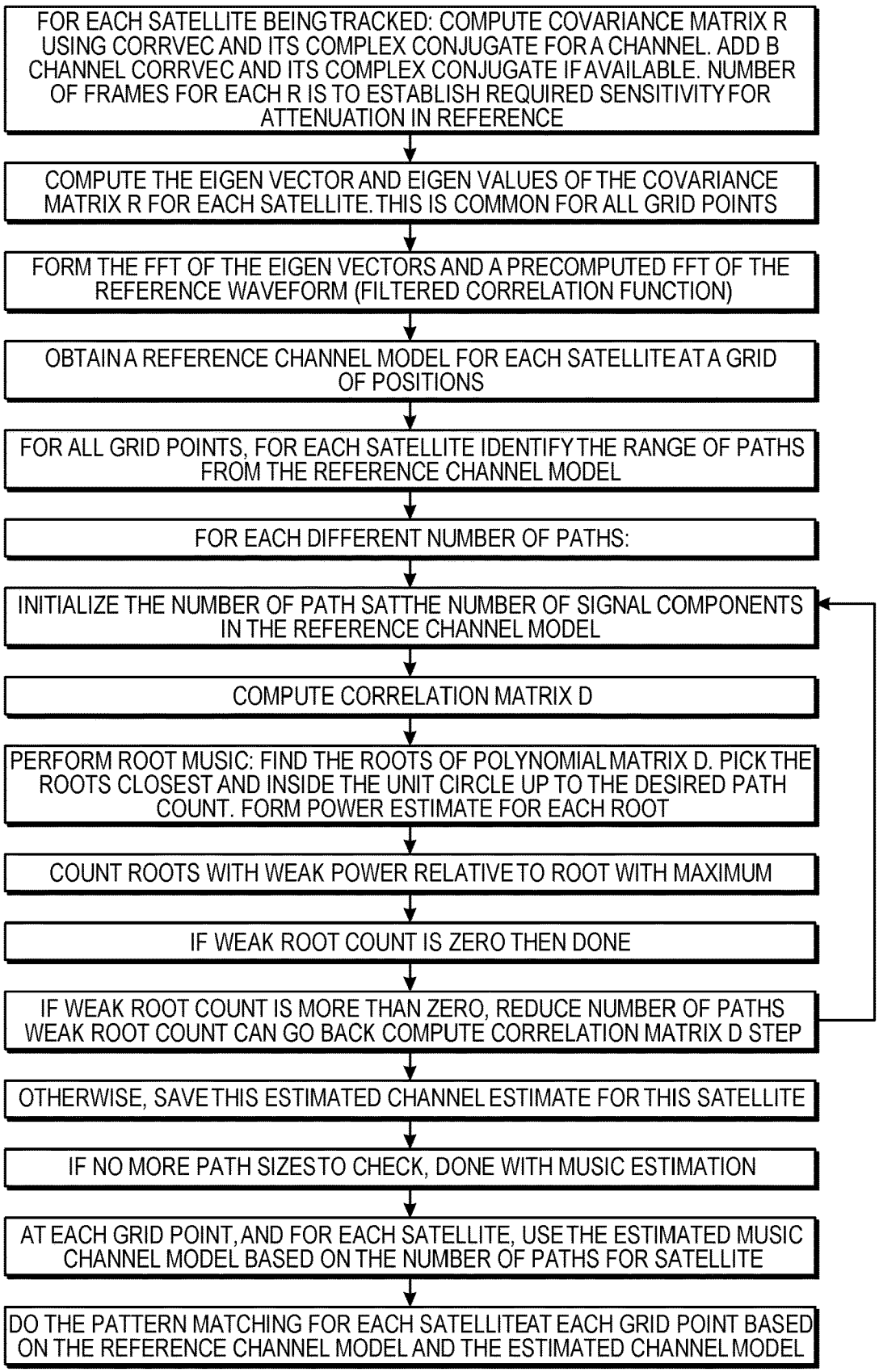

FIG. 11AA shows an example of a method that uses a superresolution method to create a set of one or more CIRs based on received GNSS signals, and each of these CIRs can be compared to an expected channel model (also referred to as reference channel model or pattern matching assistance data or expected SV signal reception data) as described herein (e.g., in the method shown in FIG. 3). The method shown in FIG. 11AA can be performed for each SV being tracked on stored snapshots of received GNSS signals, and this method uses a covariance variance matrix R (i.e., $R(k)=y \; y^*$ described in the appendix in the section about superresolution); the method shown in FIG. 11AA provides more detail on certain operations in FIG. 10A which will now be described.

In operation 425 in FIG. 10A, a GNSS receiver receives GNSS signals from one or more GNSS SVs. In those embodiments that use different frequency bands for each SVs (such as E5a and E5b from Galileo SVs), operation 427 in the method in FIG. 10A can despread the GNSS signal to obtain separate snapshots for each band (where each band is initially treated as a separate channel for the computation of covariance matrices which are then averaged together as described in Method 1 in the appendix in the Superresolution section). In operation 429, the GNSS receiver (or other system such as a server that has received the snapshots from the GNSS receiver) can optionally multiply the correlation vectors by complex exponentials described in the appendix (see discussion of Method 3 in the Superresolution section of the appendix); the output of this multiplication can then be provided to one or both of operation 431 and operation 433 (which uses Method 2 in the Superresolution section of the appendix is used). In operation 431, the GNSS receiver (or other system such as server) can compute a modified covariance matrix for each band from successive snapshots. In operation 433, the GNSS receiver (or other system) can compute a modified covariance matrix for each band from successive conjugated snapshots (using, for example, Method 2 described in the Superresolution section of the appendix). Then in operation 435, the GNSS receiver (or other system) can sum all of the covariance matrices together for further processing which can begin in operation 437. In operation 437, the GNSS receiver (or other system) can compute an eigenvalue decomposition. In operation 439 the GNSS receiver (or other system) can determine a number of paths; in one embodiment this number of paths can be based on the expected number of paths in the expected channel model (e.g., in the pattern matching assistance data). Then in operation 441, the GNSS receiver (or other system) computes the FFT of the noise eigenvectors and signal waveforms. In operation 443, the GNSS receiver (or other system) determines the path delay polynomial and finds the roots of the polynomial (e.g., see Computational Improvement in the Superresolution section in the appendix). Then in operation 445, the GNSS receiver (or other system) determines the power of each path (e.g., the magnitude of each impulse in a CIR for a channel). In operation 447, the GNSS receiver (or other system) produces an output of the time of arrival of each path and its power (e.g., magnitude) which can represent the CIR of the channel such as a CIR of a frequency band of GNSS signals from a GNSS SV.

Another aspect of this disclosure involves the use of linear antennas that have linear polarization (instead of circular polarization) in order to minimize what are deemed distortions in channel responses of received GNSS signals caused by circular polarized antennas. For normal positioning, one prefers an antenna that can attenuate reflections to minimize multipath and reflections which often have a change in polarization from RHCP direct, to LHCP reflected. For positioning in urban canyons, the reflection information can provide additional information on proximity to more surfaces, which can reduce the ambiguity on the excess path length on the measured earliest arrival time. That is when a position from a grid of candidate positions is tested closer to the true position, then estimated reflections will better match the observed reflections. Having more reflections with different spacing and amplitude reduces the ambiguity. An L5 receiver with 10× higher bandwidths make reflections more observable: often non-overlapping and with a long range (large values from the LOS to the NLOS reflections.)

Circular polarized antennas tend to attenuate reflected signals with opposite polarization (e.g., an RHCP (right hand circular polarized) antenna attenuates LHCP (left hand circular polarized) signals resulting from one reflection or an odd number of reflections), the linear polarized antennas will not materially change the magnitude observed in different reflected signals. Linear antennas can be selected to have a minimal polarization to minimize what are deemed to be distortions in the channel responses, and this is shown in FIG. 12C, which shows an example of the difference between NLOS GNSS signals received with different types of antennas and their effect on the channel response (e.g., CIR) of the NLOS GNSS signals.

Figure 12A:
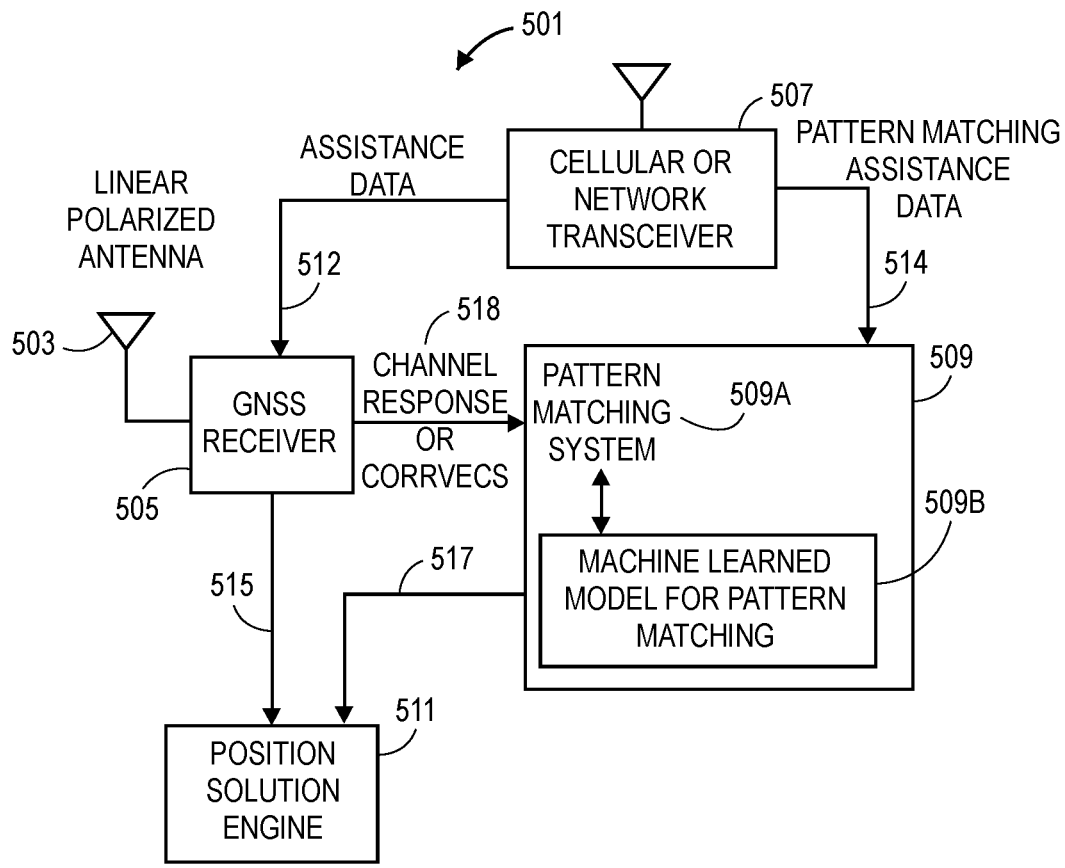
FIG. 12A shows an example of a GNSS system that includes a linear antenna and a GNSS receiver and a pattern matching system.
Figure 12B:
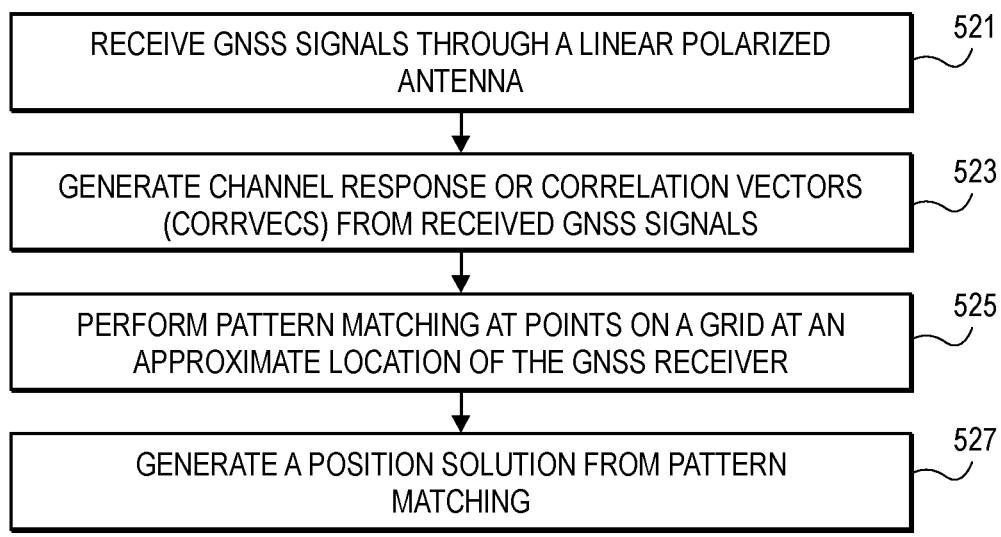
FIG. 12B is a flowchart that shows a method of using a GNSS receiver that uses a linear antenna to receive GNSS signals used are processed in a pattern matching system in one embodiment.
Figure 12C:
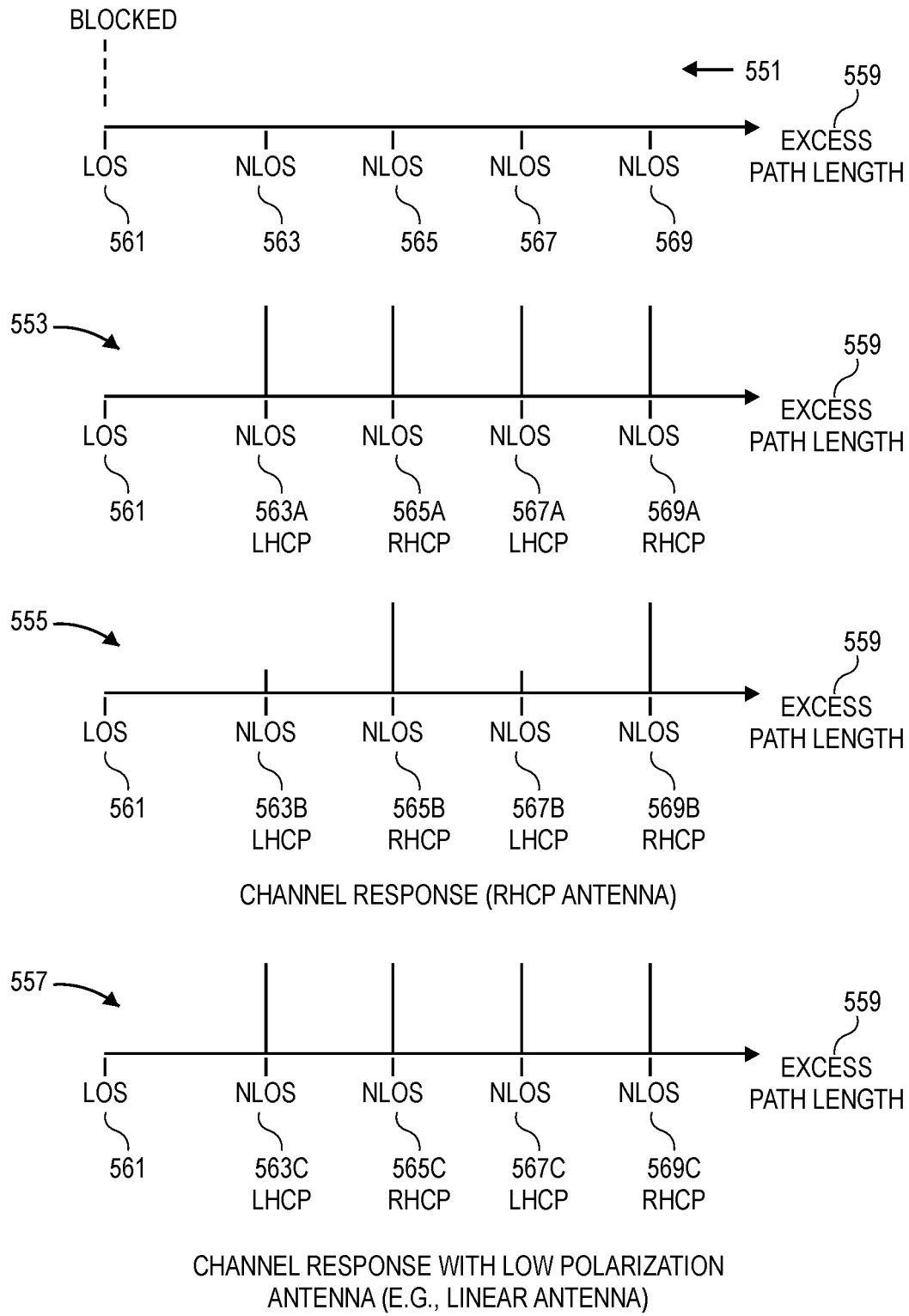
FIG. 12C shows examples of channel responses with different types of antennas.

FIG. 12C shows, in channel response 551, that a GNSS receiver, at a location near a set of buildings in an urban canyon, can receive GNSS signals from a GNSS SV and produce a channel response (for received signals from the GNSS SV) that includes four NLOS responses 563, 565, 567, and 569; the LOS response 561 is blocked because of one or more obstructing structures (e.g., one or more buildings blocking signals from the GNSS SV). In this example, the GNSS receiver receives and produces TOA (time of arrival) responses for only NLOS GNSS signals from a particular GNSS SV (and the LOS signal from the GNSS SV is blocked). These responses are depicted along an excess path length 559 that shows the difference in time between the TOA of the LOS signal and each of the NLOS signals, with each time for NLOS signals representing an excess path length. The LOS signal 561 represents an excess path length of zero, while the excess path length increases from response 563 to response 569. The NLOS signals 563, 565, 567, and 569 can have different numbers of reflections from structures (e.g., buildings) surrounding the GNSS receiver, and these reflections can produce a switch (or reversal) between right hand circular polarization (RHCP) and left hand circular polarization (LHCP) responses. Channel response 553 shows how an ideal GNSS receiver (that can use either a LHCP antenna or a RHCP antenna depending on the received signal) can create a channel response. In this hypothetical channel response 553 (in an "ideal" receiver), each of the responses 563A, 565A, 567A, and 569A can have a magnitude or power that is not attenuated by the type of antenna that is used to receive the GNSS signal from an SV in the environment. This hypothetical channel response 553 can be the pattern matching assistance data for a given point in a grid of points. Thus, the GNSS receiver can use all available signals without attenuation; however, the different number of reflections for each of the different components of the response switch the polarization of some of the responses in an actual GNSS receiver (which cannot produce the result of an idea GNSS receiver with an RHCP antenna). This switch of polarization occurs as a result of reflections off building surfaces; one reflection (or an odd number of reflections) can reverse the polarization of the GNSS signals, and an even number of reflections does not normally reverse the polarization of the GNSS signals. This reversal of some of the reflected GNSS signals produces, in a conventional GNSS receiver with an RHCP antenna, the result shown in channel response 555. The channel response 555 shows that a GNSS receiver with a conventional RHCP antenna (which matches the RHCP signals from a GNSS SV) produces non-attenuated responses 565B and 569B and produces attenuated responses 563B and 567B. If the expected SV signal environment data from the pattern matching assistance data is based on the channel response 553, then the pattern in channel response 553 will not match the pattern in channel response 555. In one embodiment, the GNSS receiver uses a linear antenna that has a low polarization, and the channel response with such an antenna is shown in FIG. 12C as channel response 557. In channel response 557, the responses 563C, 565C, 567C, and 569C have nearly the same magnitude or power with the same delay relative to LOS 561 as channel response 553 which may the expected channel response from the pattern matching assistance data (e.g., expected signal environment data from a pattern matching assistance server). Thus, the use of a linear (or minimal polarization) antenna can produce a channel response that preserves the pattern of all signals regardless of reversals of polarization, and this pattern can better match the expected signal environment data from pattern matching assistance data.

FIG. 12A shows an example of a GNSS receiver 501 that can use a linear (or minimal polarization) antenna to enhance pattern matching operations. The GNSS receiver 501 can be part of a device, such as a smartphone, that includes a cellular transceiver and an application processing system. The linear polarized antenna 503 (which can be selected to have a minimal circular polarization) is coupled to a GNSS receiver 505 that receives GNSS signals (e.g., L5 GNSS signals) from GNSS SVs through the antenna 503; the GNSS receiver 505 can be a GNSS receiver that produces pseudoranges and correlation vectors and channel responses (such as CIRs) as described herein. The channel response or correlation vectors 518 can be provided by the GNSS receiver 505 to the pattern matching system 509 that can include a pattern matching system 509A that can receive pattern matching assistance data 514 from a cellular or network transceiver 507 that includes one or more antennas (such as cellular radio antennas or WiFi antennas or other antennas or combinations of such antennas). The transceiver 507 can receive the pattern matching assistance data from a source of such data, such as the assistance server 55 in FIG. 2; the assistance server 55 can provide the appropriate pattern matching data based upon an approximate location of the GNSS receiver 501. The GNSS receiver 501 can transmit the approximate location to the assistance server 55 which in turn provides the pattern matching assistance for that approximate location as described herein. The GNSS receiver 501 can also receive other assistance data 512 through the transceiver 507, and this other assistance data can include a list of SVs in view, Doppler data about the SVs in view, satellite ephemeris data for the SVs in view and other aiding information known in the art. The pattern matching system 509A can use the pattern matching assistance data 514 to perform pattern matching with the channel response (or correlation vectors) 518 to determine a position; in other words, the pattern matching system 509A can, for example, perform the operations shown in FIG. 4B to produce a location based upon the pattern matching operations. This location can then be provided as location 517 to a position solution engine 511 that can use the location from pattern matching as an input to a position solution algorithm. When the GNSS receiver 501 is not using pattern matching (e.g., when the GNSS receiver has an unobstructed view of the entire sky), the GNSS receiver 505 provides position data 515, such as pseudoranges to GNSS SVs that have been acquired, to the position solution engine 511. The position solution engine can use known position solution algorithms to compute the location of the GNSS receiver 501. The various embodiments described herein can use the GNSS receiver 501, including those embodiments in FIGS. 3, 4A, 4B, 5A, 5B, 7, 8, 9, 10A, and those embodiments described in the appendix.

In another embodiment, the pattern matching system 509A can use a machine learning derived model 509B for pattern matching without getting pattern matching assistance data 514; in this alternative embodiment, the pattern matching can use a trained neural network (which is a form of a machine learned model) that provides a machine learning derived predictive model of channel responses of a plurality of reflected signals (e.g., in the form of a channel response for each channel) based on a 3D building model at a location at points in a grid at the location around the 3D building model. The neural network can be trained with many different urban canyon environments and grid points around each of the environments to produce a set of predicted responses at each point on a grid around a particular environment for which the model was trained. At inference time, the approximate location can provide a particular urban canyon environment (e.g., a 3D building model that includes heights and widths of the buildings and their arrangement in space around an approximate location) and the neural network can generate the predicted model of predicted channel responses at points on the grid around that particular urban canyon environment for which it was trained.

In one embodiment, the GNSS receiver 501 can be integrated into a smartphone or portable computer or tablet computer. In another embodiment, the GNSS receiver can be integrated into a motorized vehicle (e.g., an automobile or truck); in this vehicular embodiment, the GNSS receiver may be coupled to and use two GNSS antennas: a RHCP antenna for times when pattern matching is not used and a linear antenna (e.g. a dipole antenna with a low linear polarization or a patch antenna that has linear polarization and no circular polarization) for times when pattern matching is used by the GNSS receiver 501.

FIG. 12B shows an example of a method that can be performed by the GNSS receiver 501 when using a linear antenna to improve pattern matching. In operation 521, the GNSS receiver 501 can receive GNSS signals through a linear polarized antenna, such as the linear polarized antenna 503. Then in operation 523 the GNSS receiver can generate a channel response or a set of correlation vectors for each channel of received GNSS signals. Pattern matching can then be performed in operation 525 at each of the points on a grid at the approximate location; the patterns being matched can include both LOS and NLOS GNSS responses or signals at each point in the grid. The use of the linear antenna (e.g., a dipole antenna or a patch antenna that has linear polarization and no circular polarization) can improve the sensitivity of the pattern matching by increasing the number of responses or impulses in each channel response; with more responses in each pattern, the chances of finding a good match are increased. In operation 527, the GNSS receiver can generate a position solution from the pattern matching operation.

While this description has focused on GNSS SVs and GNSS signals from GNSS SVs, the embodiments described herein can also be used with GNSS-like signals from terrestrial (e.g., ground based) transmitters of GNSS-like signals, such as pseudolites ("pseudo-satellite"). Thus, the embodiments described herein can be used in systems that use such terrestrial transmitters and receivers designed to receive and process GNSS-like signals from such terrestrial transmitters. The phrase "GNSS signals" will be understood to include such GNSS-like signals, and the phrase "GNSS SVs" will be understood to include such terrestrial transmitters.

Exemplary Embodiments

The following text presents numbered embodiments in claim like format, and it will be understood that these embodiments may be presented as claims in one or more future filings, such as one or more continuation or divisional applications. Although separate embodiments are described in detail below, however, it is appreciated that these embodiments may be combined or modified, in part or in whole. At least some of these numbered embodiments were presented as claims in a prior provisional application. A reference in a dependent embodiment/claim to a prior embodiment/claim within a section of embodiments below is a reference to the prior embodiment/claim in the same section; in other words, a reference in an embodiment/claim to another embodiment/claim is a reference to an embodiment/claim in the same section and not a different section. The sections are marked by headings below.

Pattern Matching

Embodiment 1. A method for processing GNSS signals, the method comprising:
  determining an approximate location of a GNSS receiver;
  determining a set of GNSS satellites (SV) in view of the approximate location;
  receiving or generating, based on three dimensional (3D) data about structures in the vicinity of the approximate location, a set of data describing expected SV signal reception data for the SVs in view, the set of data including, for each point in a model of points near the approximate location, the expected SV signal reception data for each SV in view at each point in the model, the expected SV signals including both line of sight and non-line of sight signals from each SV in the set of SVs in view;
  receiving, at the GNSS receiver, GNSS signals in at least one of the L5 band ("GNSS L5 signals") and the L1 band and determining signal environment data for the received GNSS L5 signals or GNSS signals in the L1 band, the signal environment data including data for both line of sight and non-line of sight signals for each SV transmitting the GNSS L5 signals or the GNSS L1 signals;
  comparing the determined signal environment data to the expected SV signal reception data at each point in the model; and
  determining from the comparing an adjusted approximate location on the model of points based on a match between the determined signal environment data and the expected SV signal reception data.

Embodiment 2. The method as in claim 1 wherein the comparing comprises a pattern matching between the expected SV signal reception data at each point in the model of points and the determined signal environment data.

Embodiment 3. The method as in claim 2 wherein the method further comprises:

storing, in one or more storage systems in a network, the three dimensional (3D) data in association with location data, the three dimensional data describing structures in the vicinity of the determined approximate location;

determining, in one or more server systems in the network, the set of data describing expected SV signal reception data based on the determined 3D data using ray tracing between the set of GNSS SVs in view and the model of points near the approximate location;

transmitting, from the network to a device near the approximate location, the set of data describing expected SV signal reception data based on the determined 3D data; and wherein the device performs the method of claim 1.

Embodiment 4. The method as in claim 2 wherein the GNSS L5 signals are from one or more constellations that transmit modernized GNSS signals, and wherein the determined signal environment data comprises information about an LOS signal and non-LOS signals in an E5a band for a first SV and information about an LOS signal and non-LOS signals in the E5b band for the first SV.

Embodiment 5. The method as in claim 1 wherein the determined signal environment data comprises at least one of: a set of channel impulse response data for the received GNSS signals or a set of correlation vectors (CorrVec) representing multiple correlation outputs from a set of correlators that have processed the received GNSS signals for each GNSS SV.

Embodiment 6. The method as in claim 3 wherein the expected SV signal reception data comprises, for each SV in view, a channel impulse response data.

Embodiment 7. The method as in claim 2, wherein the method is performed by a device that communicates with one or more server systems to receive the expected SV signal reception data, and the device transforms the expected SV signal reception data, which is in a form of a channel impulse response data for each SV, into synthetic correlation vectors for comparison with the determined signal environment data.

Embodiment 8. The method as in claim 2 wherein the model of points includes a two dimensional (2D) grid of points surrounding the approximate location.

Embodiment 9. The method as in claim 2 wherein the adjusted approximate location is provided as an input to a Kalman filter that is configured to provide location outputs.

Embodiment 10. The method as in claim 2, wherein the method further comprises:

determining, in a first signal environment surrounding the GNSS receiver, position data from a set of pseudoranges derived from received GNSS signals, the position data determined without using a comparing of signal environment data and expected SV signal reception data;

determining, in a second signal environment surrounding the GNSS receiver, to discontinue determining position data from the set of pseudoranges and using the comparing of signal environment data and the expected SV signal reception data.

Embodiment 11. The method as in claim 10, wherein, in the second signal environment, pseudoranges are used to provide the approximate location.

Embodiment 12. A method for providing assistance data to a GNSS receiver, the method comprising:

receiving an approximate location from the GNSS receiver;

determining a set of GNSS satellites (SVs) currently in view of the approximate location;

storing, in one or more storage systems in a network, three dimensional (3D) data in association with location data, the three dimensional data describing structures in the vicinity of the received approximate location;

determining, in one or more server systems in the network, a set of data describing expected SV signal reception data based on the 3D data in the vicinity of the received approximate location using ray tracing between the set of GNSS SVs currently in view and the model of points near the approximate location, the expected SV signals in the expected SV signal reception data including both line of sight and non-line of sight signals from each of the set of SVs currently in view;

transmitting, from the network to the GNSS receiver, the set of data describing expected SV signal reception data based on the 3D data.

Embodiment 13. The method as in claim 12 wherein the expected SV signal reception data comprises, for each SV in view, a channel impulse response data.

Embodiment 14. The method as in claim 13 wherein the GNSS receiver requests the set of data as assistance data and wherein the expected SV signal reception data is provided for each point in a model of points near the approximate location and wherein the signal reception data varies among the points in the model of points.

Embodiment 15. The method as in claim 14, wherein the assistance data assists the GNSS receiver in determining on which side of a street the GNSS receiver is located.

Embodiment 16. A method for processing location information, the method comprising:

receiving, at one or more server systems, an approximate location and GNSS signal environment data from a GNSS receiver, the GNSS signal environment data comprising information derived from both line of sight (LOS) and non-line of sight (NLOS) GNSS signals in the form of channel impulse responses or correlation vectors for each received channel of GNSS signals;

receiving or generating, based on three dimensional (3D) data about structures in the vicinity of the approximate location, a set of data describing expected satellite (SV) signal reception data for the SVs in view, the set of data including, for each point in a model of points near the approximate location, the expected SV signal reception data for each SV in view at each point in the model, the expected SV signals including both line of sight and non-line of sight signals from each SV in the set of SVs in view;

comparing, at the one or more server systems, the GNSS signal environment data to the expected SV signal reception data at each point in the model;

determining, from the comparing, a location on the model of points based on a match between the GNSS signal environment data and the expected SV signal reception data.

Embodiment 17. The method as in claim 16, wherein the method further comprises:

transmitting the location to at least one of: (1) the GNSS receiver or (2) a server system that uses the location.

Embodiment 18. The method as in claim 17, wherein the GNSS signal environment data comprises information about an LOS signal and non-LOS signals in an E5a band for a first SV and information about an LOS signal and non-LOS signals in the E5b band for the first SV, and wherein the comparing comprises a pattern matching between the expected SV signal reception data at each point in the model of points and the GNSS signal environment data.

Embodiment 19. The method as in claim 17, wherein the method further comprises:
    storing, in one or more storage systems in a network, the three dimensional (3D) data in association with location data, the three dimensional data describing structures in the vicinity of the approximate location;
    determining, in one or more server systems in the network, the set of data describing expected SV signal reception data based on the determined 3D data using ray tracing between the set of GNSS SVs in view and the model of points near the approximate location.

Embodiment 20. The method as in claim 17, wherein the model of points includes a two dimensional (2D) grid of points surrounding the approximate location.

Embodiment 21. A method for processing location information, the method comprising:
    receiving, at a GNSS receiver, GNSS signals from one or more GNSS satellites (SV);
    determining, at the GNSS receiver from the received GNSS signals, GNSS signal environment data that comprises information derived from both line of sight (LOS) and non-line of sight (NLOS) GNSS signals in the form of channel impulse responses or correlation vectors for each received channel of GNSS signals;
    transmitting a first location of the GNSS receiver to one or more server systems through a network interface;
    receiving, at the GNSS receiver through the network interface, a set of data describing an expected SV signal reception data for the SVs in view of the GNSS receiver, the set of data including, for each point in a model of points near the first location, the expected SV signal reception data for each SV in view at each point in the model, the expected SV signals including both line of sight and non-line of sight signals from each SV in the set of SVs in view;
    comparing, at the GNSS receiver, the GNSS signal environment data to the expected SV signal reception data at each point in the model;
    determining, at the GNSS receiver, a second location based on the comparing.

Embodiment 22. The method as in claim 21, wherein the first location is an approximate location and the set of data is received from the one or more servers that received the first location and used the first location to determine the set of data.

Embodiment 23. The method as in claim 21, wherein the method further comprises:
    transmitting the second location to a server system that uses the second location.

Embodiment 24. The method as in claim 21, wherein the expected SV signal reception data comprises one of channel impulse responses for each expected channel or correlation vectors for each expected channel.

Embodiment 25. The method as in claim 21, wherein the GNSS signal environment data comprises information about an LOS signal and non-LOS signals in an E5a band for a first SV and information about an LOS signal and non-LOS signals in the E5b band for the first SV, and wherein the comparing comprises a pattern matching between the expected SV signal reception data at each point in the model of points and the GNSS signal environment data.

Embodiment 26. A method for processing location information, the method comprising:
    receiving, at a GNSS receiver, GNSS signals from one or more GNSS satellites (SV);
    determining, at the GNSS receiver from the received GNSS signals, GNSS signal environment data that comprises information derived from both line of sight (LOS) and non-line of sight (NLOS) GNSS signals in the form of channel impulse responses or correlation vectors for each received channel of GNSS signals;
    transmitting the GNSS signal environment data and a first location of the GNSS receiver to one or more server systems through a network interface;
    receiving, at the GNSS receiver through the network interface, a second location based on the GNSS signal environment data.

Embodiment 27. The method as in claim 26, wherein the first location is an approximate location and the second location was determined by comparing the GNSS signal environment data to an expected SV reception data determined by the one or more server systems.

Embodiment 28. The method as in claim 27, wherein the expected SV signal reception data comprises one of channel impulse responses for each expected channel or correlation vectors for each expected channel.

Embodiment 29. The method as in claim 26, wherein the GNSS signal environment data comprises information about an LOS signal and non-LOS signals in an E5a band for a first SV and information about an LOS signal and non-LOS signals in the E5b band for the first SV.

Mixing PR & PM Measurements

Embodiment 1. A method of operating a GNSS receiver, the method comprising:
    determining whether pattern matching assistance data is available for use by the GNSS receiver;
    determining one or more position solutions, when pattern matching assistance data is not available for use by the GNSS receiver, based on pseudorange measurements without using pattern matching measurements;
    determining one or more position solutions, when pattern matching assistance data is available, based on pattern matching measurements and based on pseudorange measurements that are converted into pattern matching measurements.

Embodiment 2. The method as in claim 1 wherein the pattern matching assistance data comprises a channel model that includes a channel impulse response (CIR) for a channel of GNSS signals.

Embodiment 3. The method as in claim 2 wherein the pattern matching measurements are based on matching, for each channel, the channel model in the pattern matching assistance data to a receiver channel model, derived from one or more correlation vectors, through a superresolution algorithm, the superresolution algorithm converting the one or more correlation vectors to the receiver channel model.

Embodiment 4. The method as in claim 1 wherein the pattern matching assistance data is based on a position solution indicating a position of the GNSS receiver or an approximate location of the GNSS receiver.

Embodiment 5. The method as in claim 4, wherein the pattern matching assistance data is not available in an open sky environment and is available in at least a set of urban environments in which the GNSS receiver receives a plurality of NLOS GNSS signals.

Embodiment 6. The method as in claim 1, wherein the method further comprises:

determining whether a grid map used for pattern matching is registered to a map used for navigation;

requesting a map registration accuracy estimate in response to determining the grid map is not registered to the map used for navigation.

Embodiment 7. The method as in claim 6, wherein the method further comprises:

receiving the map registration accuracy estimate and using the map registration accuracy estimate to align locations on the grid map to locations on the map used for navigation.

Embodiment 8. The method as in claim 1, wherein the one or more position solutions, when pattern matching assistance data is available, are computed in the pattern matching measurement domain.

Embodiment 9. The method as in claim 1, wherein the method further comprises:

determining a surface on which a pseudorange measurement is constrained, the surface derived from the pattern matching assistance data;

determining one or more intersections between the surface and positions associated with the pseudorange measurement;

determining one or more time parameters associated with the one or more intersections.

Embodiment 10. The method as in claim 9, wherein the one or more intersections define a curve or line on the surface.

Embodiment 11. A method of operating a GNSS receiver, the method comprising:

determining a location of the GNSS receiver;

determining, based on the location, whether the GNSS receiver is in a first environment in which pattern matching measurements will not be used to compute location and computing one or more position solutions based on pseudorange measurements if the GNSS receiver is determined to be in the first environment;

determining, based on the location, whether the GNSS receiver is in a second environment in which pattern matching measurements can be used to compute location;

while the GNSS receiver is in the second environment, computing one or more position solutions based on a combination of pseudorange measurements and pattern matching measurements by performing one of the following:

(a) independently computing a pseudorange based position solution using pseudorange measurements without using pattern matching measurements and independently computing a pattern matching based position solution using pattern matching measurements without using pseudorange measurements and then combining weighted representations of the pseudorange based position solution and the pattern matching based position solution to derive a position solution based on a combination of the pseudorange based position solution and the pattern matching based position solution; or (b) computing a pattern matching based position solution using pattern matching measurements and virtual pattern matching measurements derived from pseudorange measurements; or (c) computing a pseudorange based position solution using pseudorange measurements and virtual pseudorange measurements derived from pattern matching measurements.

Embodiment 12. The method as in claim 11 wherein the first environment is an open sky environment in which a majority of all GNSS signal reception is line of sight reception from GNSS satellites and wherein the location is an approximate location.

Embodiment 13. The method as in claim 12 wherein the second environment is a suburban or urban canyon environment in which the GNSS receiver is receiving non-line of sight GNSS signals from one or more GNSS satellites.

Embodiment 14. The method as in claim 13, wherein the method further comprises:

identifying a first set of satellites (SVs) that can be processed using pseudorange (PR) measurements and determining the number of SVs in the first set of SVs;

identifying a second set of SVs that can be processed using pattern matching (PM) measurements and determining the number of SVs in the second set of SVs;

using the independent computation of PR based position solution and independent computation of PM based position solution if the number of SVs in the first set of SVs exceed a first threshold value and the number of SVs in the second set of SVs exceed a second threshold value.

Embodiment 15. The method as in claim 11, wherein the method further comprises:

determining whether a grid map used for pattern matching is registered to a map used for navigation;

requesting a map registration accuracy estimate in response to determining the grid map is not registered to the map used for navigation.

Embodiment 16. The method as in claim 15 wherein the method further comprises:

receiving the map registration accuracy estimate and using the map registration accuracy estimate to align locations on the grid map to locations on the map used for navigation.

Superresolution Methods and Pattern Matching

Embodiment 1. An improved method of determining the times-of-arrival of signals received from a Global Navigation Satellite System (GNSS) receiver said method including:

receiving in a GNSS receiver a GNSS signal emanating from a GNSS satellite;

processing said signal to create a set of snapshots of data, wherein each snapshot is a vector of signal samples;

using a superresolution algorithm to process the set of snapshots, wherein the superresolution algorithm is any algorithm that constructs a covariance matrix for each of a multiplicity of such snapshots and combines such covariance matrices into an overall covariance matrix and further processing said overall covariance matrix to determine times-of-arrival of signals and delayed versions thereof;

computing the overall covariance matrix for each of two different frequency bands in which said GNSS satellite transmits, and further combining the overall covariance of each of the frequency bands into one covariance matrix prior to computing the times-of-arrival of the received signals.

Embodiment 2. An improved method of determining the times-of-arrival of signals received from a Global Navigation Satellite System (GNSS) receiver said method including:

receiving in a GNSS receiver a GNSS signal emanating from a GNSS satellite;

processing the GNSS signal to create a set of snapshots of data, wherein each snapshot is a vector of signal samples;

using a superresolution algorithm to process said set of snapshots, wherein said superresolution algorithm is any algorithm that constructs a covariance matrix for each of a multiplicity of such snapshots and combines such covariance matrices into an overall covariance matrix and further processing said overall covariance matrix to determine times-of-arrival of signals and delayed versions thereof;

wherein the overall covariance matrix is computed for each of two different frequency bands in which each covariance matrix is formed by constructing a covariance matrix for the data corresponding to a snapshot, and constructing a covariance matrix for the complex conjugate of the snapshot and averaging these together.

Embodiment 3. An improved method of determining the times-of-arrival of signals received from a Global Navigation Satellite System (GNSS) receiver said method including:

receiving in a GNSS receiver a GNSS signal emanating from a GNSS satellite;

processing said signal to create a set of snapshots of data, wherein each snapshot is a vector of signal samples;

using a superresolution algorithm to process said set of snapshots, wherein said superresolution algorithm is any algorithm that constructs a modified covariance matrix for each of a multiplicity of such snapshots and combines such modified covariance matrices into an overall modified covariance matrix and further processing said overall covariance matrix to determine times-of-arrival of signals and delayed versions thereof;

wherein said modified covariance matrix is formed from snapshot data on two successive frames in which a column vector of data from one frame is multiplied by the conjugated row vector corresponding to the next frame.

Embodiment 4. An improved method of determining the times-of-arrival of signals received from a Global Navigation Satellite System (GNSS) receiver said method including:

receiving in a GNSS receiver a GNSS signal emanating from a GNSS satellite;

processing said signal to create a set of snapshots of data, wherein each snapshot is a vector of signal samples;

using a superresolution algorithm to process said set of snapshots, wherein said superresolution algorithm is any algorithm that constructs a modified covariance matrix for each of a multiplicity of such snapshots and combines such modified covariance matrices into an overall modified covariance matrix and further processing said overall covariance matrix to determine times-of-arrival of signals and delayed versions thereof, wherein an eigenvalue decomposition of said overall covariance matrix is performed, wherein a Fourier transform of a subset of the eigenvectors of such decomposition is determined, wherein the Fourier transform of a noise free reference signal is determined, and wherein said Fourier transforms are utilized to compute the times-of-arrival of said signals utilizing a polynomial root finding algorithm.

Embodiment 5. The method as in any one of claims 1 through 4, wherein the method is used to transform a set of one or more correlation vectors measured from a GNSS signal into a channel impulse response for the GNSS signal.

Embodiment 6. A method of operating a GNSS receiver, the method comprising:

receiving in a GNSS receiver a GNSS signal emanating from a GNSS satellite;

processing said received GNSS signal to create a set of snapshots of data, wherein each snapshot is a vector of signal samples;

constructing a modified covariance matrix for each of a plurality of snapshots in the set of snapshots and combining a plurality of constructed and modified covariance matrices into an overall modified covariance matrix;

processing the overall modified covariance matrix to determine times of arrival of GNSS signals and delayed versions of those signals to provide a channel model for use in matching the channel model to pattern matching assistance data.

Embodiment 7. The method as in claim 6, wherein the pattern matching assistance data is provided when the GNSS receiver is in an urban canyon, and the pattern matching assistance data comprises, for each channel visible to the GNSS receiver, channel impulse response data that included LOS and NLOS GNSS signals.

Reprocessing of Stored Correlation Vector (Corrvec) Data

Embodiment 1. A method of operating a GNSS receiver, the method comprising:

receiving GNSS signals from a plurality of GNSS SVs;

storing a plurality of complex correlation vectors that have been recently computed and used for position solutions;

determining accumulated delta range (ADR) measurements of carrier phase for at least a subset of the received GNSS signals;

generating a set of one or more virtual tracking points for code phase measurements of a first set of one or more or GNSS signals from the plurality of GNSS SVs;

determining that the GNSS receiver cannot maintain a position solution based on the ADR measurements;

reprocessing the stored plurality of complex correlation vectors to adjust the virtual tracking points.

Embodiment 2. The method as in claim 1 wherein the reprocessing uses an updated Doppler derived from a series, over time, of Doppler measurements for a GNSS signal to reprocess each correlation peak for the GNSS signal in the stored complex correlation vectors corresponding to the GNSS signal.

Embodiment 3. The method as in claim 2 wherein the updated Doppler is a weighted average of the series, over time, of Doppler measurements.

Embodiment 4. The method as in claim 1 wherein the reprocessing comprises one of:

selecting an output with a highest correlation peak; or interpolating between the two highest peaks in the stored complex correlation vectors.

Steering

Embodiment 1. A method of operating a GNSS receiver, the method comprising:

receiving GNSS signals from a plurality of GNSS satellites (SVs);

determining code phase measurements from the received GNSS signals;

determining accumulated delta range (ADR) measurements of carrier phase for at least a subset of the received GNSS signals;

determining an initial position solution from the code phase measurements based on at least a first set of GNSS signals received from a first set of GNSS SVs in the plurality of GNSS SVs;

generating a set of one or more virtual tracking points for code phase measurements on a second set of one or more GNSS signals from a second set of one or more GNSS SVs in the plurality of GNSS SVs or the first set of GNSS SVs, the set of one or more virtual tracking points derived from the ADR measurements;

steering a set of the one or more tracking points for code phase measurements for each GNSS signal in the second set of one or more GNSS signals, the steering based on the generated set of one or more virtual tracking points.

Embodiment 2. The method as in claim 1, wherein the GNSS receiver has not maintained a phase lock on the code phase measurements of the second set of one or more GNSS signals.

Embodiment 3. The method as in claim 1, wherein the steering provides additional impulses, in a channel impulse response model, for non-line-of-sight (NLOS) GNSS signals in the second set of one or more GNSS signals and wherein the steering comprises moving a virtual tracking point for code phase measurements on a GNSS signal in the second set of one or more GNSS signals.

Embodiment 4. The method as in claim 3, wherein the first set of GNSS signals includes one or more line-of-sight (LOS) GNSS signals and the second set of one or more GNSS signals includes one or more NLOS GNSS signals.

Embodiment 5. The method as in claim 4, wherein the additional impulses in the channel impulse response model are used in pattern matching at points in a model of points around an estimated location of the GNSS receiver.

Embodiment 6. The method as in claim 1, wherein the method further comprises:

verifying a quality of the ADR measurements, wherein the verifying comprises confirming at least one tracking point, for code phase measurements of at least one of the first set of GNSS signals, is based on a LOS GNSS signal.

Embodiment 7. The method as in claim 6, wherein the confirming comprises:

examining the correlation vectors used for the code phase measurements on the LOS GNSS signal.

Embodiment 8. The method as in claim 5, wherein the additional impulses reduce ambiguity in matching patterns in the pattern matching.

Embodiment 9. The method as in claim 6 wherein the confirming comprises: receiving a cloud provided prediction of the at least one tracking point.

Embodiment 10. The method as in claim 6 wherein the confirming comprises:

comparing change of position values derived from the ADR measurements, over time, on the first set of GNSS signals.

Embodiment 11. The method as in claim 1, wherein the set of one or more virtual tracking points is based on carrier phase measurements and is not based on code phase measurements.

Embodiment 12. The method as in claim 1, wherein a virtual tracking point in the set of one or more virtual tracking points is provided by a GNSS signal in a first frequency band from a first GNSS SV and is used as the tracking point for a GNSS signal in a second frequency band from the first GNSS SV.

Embodiment 13. The method as in claim 5 wherein the GNSS receiver operates in a first mode using pseudorange measurements, without pattern matching measurements, to determine position solutions and operates in a second mode using both pseudorange and pattern matching measurements to determine position solutions, and wherein in the second mode a measurement engine of the GNSS receiver generates measurements, including pseudorange measurements at a second rate which is greater than a first rate at which pseudorange measurements are generated when the GNSS is operating in the first mode.

Embodiment 14. The method as in claim 6, wherein the verifying comprises:

determining a consistency, over time, of changes in position along a trajectory of the GNSS receiver based on the ADR measurements.

Embodiment 15. The method as in claim 14, wherein the verifying comprises:

maintaining state information that comprises position information over time and clock bias information over time and rates of change of both, and the state information is derived from the ADR measurements and not from code phase measurements.

Embodiment 16. The method as in claim 1, wherein the method comprises:

generating, over time, the set of virtual tracking points at a first rate from a set of ADR measurements, the first rate exceeding a second rate at which code phase measurements, or position solutions based on code phase measurements, are generated.

Embodiment 17. The method as in claim 16 wherein the first rate is adaptively changed over time based on a number of pattern matching measurements being used to compute position solutions, such that the first rate is increased as the number of pattern matching measurements increase.

Embodiment 18. The method as in claim 16 wherein the first rate is at least twice the second rate.

Linear Antenna and Pattern Matching

Embodiment 1. A method of operating a GNSS receiver, the method comprising:

receiving GNSS signals through a linear antenna;

generating a set of responses for each channel of received GNSS signals;

performing a set of pattern matching operations for each channel of received GNSS signals, the pattern matching using both LOS and NLOS signals for each channel;

generating a position solution based on the performed pattern matching operations, the position solution providing a location for the GNSS receiver.

Embodiment 2. The method as in claim 1, the method further comprising:

receiving pattern matching assistance data, wherein the pattern matching operations use the received pattern matching assistance data to match the set of responses for each channel with patterns of responses in the pattern matching assistance data.

Embodiment 3. The method as in claim 2, wherein the pattern matching assistance data is received through a network transceiver that is coupled to the GNSS receiver and is received from a server system in a network operatively coupled to the network transceiver.

Embodiment 4. The method as in claim 3, wherein the method resolves an excess path of a reflected GNSS signal in an urban canyon by comparing the predicted arrival time and envelope of a plurality of reflected signals based on a 3D building model (from which the pattern matching assistance data is derived) to a measurement of arrival time and envelop for a plurality of reflected signals using the linear antenna to minimize polarization-based distortion on the measured envelopes.

Embodiment 5. The method as in claim 1, wherein the method further comprises:
storing a machine learning derived predictive model that can produce a channel response of a plurality of reflected signals based on a 3D building model at points on a grid at a location of the 3D building model; and
comparing, as part of performing the set of pattern matching operations, a channel response from the machine learning derived predictive model to the generated set of responses for each channel of received GNSS signals.

Embodiment 6. The method as in claim 5, wherein the machine learning derived predictive model comprises a trained convolutional neural network that, given the 3D building model at the location, generates channel responses at the location.

Embodiment 7. The method as in claim 6, wherein the 3D building model includes heights and widths of buildings at the location and their respective positions around the location.

Embodiment 8. The method as in claim 4, wherein the linear antenna has linear polarization and no appreciable circular polarization and the linear polarization does not discriminate between RHCP GNSS signals and LHCP GNSS signals.

Embodiment 9. A GNSS receiver comprising:
a linear antenna;
an RF frontend coupled to the linear antenna;
a digital GNSS processing system that receives digitized GNSS signals and processes them to derive pseudoranges to GNSS SVs and to derive a set of channel responses for each channel of received GNSS signals, the digital GNSS processing system coupled to the RF frontend;
a pattern matching system coupled to the digital GNSS processing system to receive the set of channel responses and to perform pattern matching operations by comparing the set of channel responses to an expected set of channel responses at an approximate location, the pattern matching using both LOS and NLOS signals for each channel.

Embodiment 10. The GNSS receiver as in claim 9, the receiver further comprising:
a RHCP antenna coupled to the RF frontend, the GNSS receiver to switch between (1) use of the RHCP antenna when pattern matching operations are not used to determine position solutions and (2) use of the linear antenna when pattern matching operations are used to determine position solutions.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A method for processing GNSS signals, the method comprising:
determining an approximate location of a GNSS receiver;
determining a set of GNSS satellites (SV) in view of the approximate location;
receiving or generating, based on three dimensional (3D) data about structures in a vicinity of the approximate location, a set of data describing expected SV signal reception data for the set of SVs in view, the set of data including, for each point in a model of points near the approximate location, the expected SV signal reception data for each SV in the set of SVs in view at each point in the model, the expected SV signal reception data including, at each point in the model of points, both line of sight and a plurality of non-line of sight signals from each SV in the set of SVs in view, wherein the expected SV signal reception data is derived from ray tracing in the vicinity of the approximate location;
receiving, at the GNSS receiver, GNSS signals in at least one of an L5 band ("GNSS L5 signals") and an L1 band and determining signal environment data for the received GNSS L5 signals or GNSS signals in the L1 band, the signal environment data including data for both line of sight and a plurality of non-line of sight signals for each SV in the set of SVs transmitting the GNSS L5 signals or the GNSS L1 signals;
comparing the determined signal environment data to the expected SV signal reception data at each point in the model, wherein the comparing comprises a comparison, for each SV in the set of SVs, of the plurality of non-line of sight signals in the expected SV signal reception data to the plurality of non-line of sight signals in the signal environment data; and
determining from the comparing an adjusted approximate location on the model of points based on a match between the determined signal environment data and the expected SV signal reception data.

2. The method as in claim 1 wherein the comparing comprises a pattern matching between the expected SV signal reception data at each point in the model of points and the determined signal environment data.

3. The method as in claim 2 wherein the method further comprises:
storing, in one or more storage systems in a network, the three dimensional (3D) data in association with location data, the three dimensional data describing structures in the vicinity of the determined approximate location;
determining, in one or more server systems in the network, the set of data describing expected SV signal reception data based on the 3D data using ray tracing between the set of GNSS SVs in view and the model of points near the approximate location;
transmitting, from the network to a device near the approximate location, the set of data describing expected SV signal reception data based on the 3D data; and
wherein the device performs the method.

4. The method as in claim 3 wherein the expected SV signal reception data comprises, for each SV in view, a channel impulse response data.

5. The method as in claim 2 wherein the GNSS L5 signals are from one or more constellations that transmit modernized GNSS signals, and wherein the determined signal environment data comprises information about an LOS signal and a plurality of non-LOS signals in an E5a band for a first SV and information about an LOS signal and a plurality of non-LOS signals in an E5b band for the first SV.

6. The method as in claim 1 wherein the determined signal environment data comprises at least one of: a set of channel impulse response data for the received GNSS signals or a set of correlation vectors (CorrVec) representing multiple correlation outputs from a set of correlators that have processed the received GNSS signals for each GNSS SV.

7. The method as in claim 2, wherein the method is performed by a device that communicates with one or more server systems to receive the expected SV signal reception data, and the device transforms the expected SV signal reception data, which is in a form of a channel impulse response data for each SV, into synthetic correlation vectors for comparison with the determined signal environment data.

8. The method as in claim 2 wherein the model of points includes a two dimensional (2D) grid of points surrounding the approximate location.

9. The method as in claim 2 wherein the adjusted approximate location is provided as an input to a Kalman filter that is configured to provide location outputs.

10. The method as in claim 2, wherein the method further comprises:
determining, in a first signal environment surrounding the GNSS receiver, position data from a set of pseudoranges derived from received GNSS signals, the position data determined without using a comparing of signal environment data and expected SV signal reception data;
determining, in a second signal environment surrounding the GNSS receiver, to discontinue determining position data from the set of pseudoranges and using the comparing of signal environment data and the expected SV signal reception data.

11. The method as in claim 10, wherein, in the second signal environment, pseudoranges are used to provide the approximate location.

12. A method for providing assistance data to a GNSS receiver, the method comprising:
receiving an approximate location from the GNSS receiver;
determining a set of GNSS satellites (SVs) currently in view of the approximate location;
storing, in one or more storage systems in a network, three dimensional (3D) data in association with location data, the three dimensional data describing structures in a vicinity of the received approximate location;
determining, in one or more server systems in the network, a set of data describing expected SV signal reception data based on the 3D data in the vicinity of the received approximate location using ray tracing between the set of GNSS SVs currently in view and a model of points near the approximate location, the expected SV signals in the expected SV signal reception data including, at each point in the model of points, both line of sight and a plurality of non-line of sight signals from each SV in the set of SVs currently in view;
transmitting, from the network to the GNSS receiver, the set of data describing expected SV signal reception data based on the 3D data and the ray tracing to enable the GNSS receiver to compare, for each SV in the set of SVs in view, the plurality of non-line of sight signals in the expected SV signal reception data to a plurality of non-line of sight signals in a determined signal environment data.

13. The method as in claim 12 wherein the expected SV signal reception data comprises, for each SV in view, a channel impulse response data.

14. The method as in claim 13 wherein the GNSS receiver requests the set of data as assistance data and wherein the expected SV signal reception data is provided for each point in a model of points near the approximate location and wherein the expected SV signal reception data varies among the points in the model of points.

15. The method as in claim 14, wherein the assistance data assists the GNSS receiver in determining on which side of a street the GNSS receiver is located.

16. A method for processing location information, the method comprising:
receiving, at one or more server systems, an approximate location and GNSS signal environment data from a GNSS receiver, the GNSS signal environment data comprising information derived from both line of sight (LOS) and a plurality of non-line of sight (NLOS) GNSS signals in the form of channel impulse responses or correlation vectors for each received channel of GNSS signals from a set of satellites in view of the GNSS receiver;
receiving or generating, based on three dimensional (3D) data about structures in the vicinity of the approximate location, a set of data describing expected satellite (SV) signal reception data for a set of SVs in view, the set of data including, for each point in a model of points near the approximate location, the expected SV signal reception data for each SV in the set of SVs in view at each point in the model, the expected SV signal reception data including, at each point in the model of points, both line of sight and a plurality of non-line of sight signals from each SV in the set of SVs in view, wherein the expected SV signal reception data is derived from ray tracing in a vicinity of the approximate location;
comparing, at the one or more server systems, the GNSS signal environment data to the expected SV signal reception data at each point in the model, wherein the comparing comprises a comparison, for each SV in the set of SVs in view, of the plurality of non-line of sight signals in the expected SV signal reception data to the plurality of non-line of sight signals in the signal environment data;
determining, from the comparing, a location on the model of points based on a match between the GNSS signal environment data and the expected SV signal reception data.

17. The method as in claim 16, wherein the method further comprises:
transmitting the location to at least one of: (1) the GNSS receiver or (2) a server system that uses the location.

18. The method as in claim 17, wherein the GNSS signal environment data comprises information about an LOS signal and a plurality of non-LOS signals in an E5a band for a first SV and information about an LOS signal and a plurality of non-LOS signals in an E5b band for the first SV, and wherein the comparing comprises a pattern matching between the expected SV signal reception data at each point in the model of points and the GNSS signal environment data.

19. The method as in claim 17, wherein the method further comprises:
storing, in one or more storage systems in a network, the three dimensional (3D) data in association with location data, the three dimensional data describing structures in the vicinity of the approximate location;
determining, in one or more server systems in the network, the set of data describing expected SV signal reception data based on the 3D data using ray tracing between the set of GNSS SVs in view and the model of points near the approximate location.

20. The method as in claim 17, wherein the model of points includes a two dimensional (2D) grid of points surrounding the approximate location.

21. A method for processing location information, the method comprising:
receiving, at a GNSS receiver, GNSS signals from one or more GNSS satellites (SV);
determining, at the GNSS receiver from the received GNSS signals, GNSS signal environment data that comprises information derived from both line of sight (LOS) and a plurality of non-line of sight (NLOS) GNSS signals in the form of channel impulse responses or correlation vectors for each received channel of GNSS signals from a set of SVs in view of the GNSS receiver;
transmitting a first location of the GNSS receiver to one or more server systems through a network interface;
receiving, at the GNSS receiver through the network interface, a set of data describing an expected SV signal reception data for the set of SVs in view of the GNSS receiver, the set of data including, for each point in a model of points near the first location, the expected SV signal reception data for each SV in the set of SVs in view at each point in the model, the expected SV signal reception data including, at each point in the model of points, both line of sight and a plurality of non-line of sight signals from each SV in the set of SVs in view, wherein the expected SV signal reception data is derived from ray tracing in a vicinity of the first location;
comparing, at the GNSS receiver, the GNSS signal environment data to the expected SV signal reception data at each point in the model, wherein the comparing comprises a comparison, for each SV in the set of SVs, of the plurality of non-line of sight signals in the expected SV signal reception data to the plurality of non-line of sight signals in the signal environment data;
determining, at the GNSS receiver, a second location based on the comparing.

22. The method as in claim 21, wherein the first location is an approximate location and the set of data is received from the one or more servers that received the first location and used the first location to determine the set of data.

23. The method as in claim 21, wherein the method further comprises:
transmitting the second location to a server system that uses the second location.

24. The method as in claim 21, wherein the expected SV signal reception data comprises one of channel impulse responses for each expected channel or correlation vectors for each expected channel.

25. The method as in claim 21, wherein the GNSS signal environment data comprises information about an LOS signal and a plurality of non-LOS signals in an E5a band for a first SV and information about an LOS signal and a plurality of non-LOS signals in an E5b band for the first SV, and wherein the comparing comprises a pattern matching between the expected SV signal reception data at each point in the model of points and the GNSS signal environment data.

26. A method for processing location information, the method comprising:
receiving, at a GNSS receiver, GNSS signals from one or more GNSS satellites (SV);
determining, at the GNSS receiver from the received GNSS signals, GNSS signal environment data that comprises, for each SV in a set of SVs, information derived from both line of sight (LOS) and a plurality of non-line of sight (NLOS) GNSS signals in a form of channel impulse responses or correlation vectors for each received channel of GNSS signals;
transmitting the GNSS signal environment data and a first location of the GNSS receiver to one or more server systems through a network interface;
receiving, at the GNSS receiver through the network interface, a second location based on a comparison between the GNSS signal environment data and an expected SV reception data which includes, at each point in a model of points near the first location, both LOS and a plurality of NLOS signals from each SV in the set of SVs in view of the first location, wherein the expected SV reception data is derived from ray tracing in a vicinity of the first location, wherein the comparison comprises a comparison, for each SV in the set of SVs, of the plurality of NLOS signals in the expected SV reception data to the plurality of NLOS signals in the GNSS signal environment data.

27. The method as in claim 26, wherein the first location is an approximate location.

28. The method as in claim 27, wherein the expected SV signal reception data comprises one of channel impulse responses for each expected channel or correlation vectors for each expected channel.

29. The method as in claim 26, wherein the GNSS signal environment data comprises information about an LOS signal and a plurality of non-LOS signals in an E5a band for a first SV and information about an LOS signal and a plurality of non-LOS signals in an E5b band for the first SV.

30. A method for processing GNSS signals, the method comprising:
determining an approximate location of a GNSS receiver;
determining a set of GNSS satellites (SV) in view of the approximate location;
receiving or generating, based on three dimensional (3D) data about structures in a vicinity of the approximate location, a set of data describing expected SV signal reception data for the set of SVs in view, the set of data including, for each point in a model of points near the approximate location, the expected SV signal reception data for each SV in the set of SVs in view at each point in the model, the expected SV signal reception data including, at each point in the model of points, a plurality of non-line of sight signals from each SV in the set of SVs in view, wherein the expected SV signal reception data is derived from ray tracing in the vicinity of the approximate location;
receiving, at the GNSS receiver, GNSS signals in at least one of an L5 band ("GNSS L5 signals") and an L1 band and determining signal environment data for the received GNSS L5 signals or GNSS signals in the L1 band, the signal environment data including a plurality of non-line of sight signals for each SV in the set of SVs transmitting the GNSS L5 signals or the GNSS L1 signals;
comparing the determined signal environment data to the expected SV signal reception data at each point in the model, wherein the comparing comprises a comparison, for each SV in the set of SVs, of the plurality of non-line of sight signals in the expected SV signal reception data to the plurality of non-line of sight signals in the signal environment data; and
determining from the comparing an adjusted approximate location on the model of points based on a match between the determined signal environment data and the expected SV signal reception data.

31. The method as in claim 30, wherein the determined signal environment data comprises at least one of: a set of channel impulse response data for the received GNSS signals or a set of correlation vectors (CorrVec) representing multiple correlation outputs from a set of correlators that have processed the received GNSS signals for each GNSS SV, and wherein the comparing comprises a pattern matching.

32. The method as in claim 30, wherein the method is performed by a device that communicates with one or more server systems to receive the expected SV signal reception data, and the device transforms the expected SV signal reception data, which is in a form of a channel impulse response data for each SV, into synthetic correlation vectors for comparison with the determined signal environment data.

* * * * *